(12) United States Patent
Yazganarikan

(10) Patent No.: US 11,734,228 B2
(45) Date of Patent: Aug. 22, 2023

(54) VISUAL FILE MANAGER

(71) Applicant: Yildirim Yazganarikan, Mill Valley, CA (US)

(72) Inventor: Yildirim Yazganarikan, Mill Valley, CA (US)

(*) Notice: Subject to any disclaimer, the term of this patent is extended or adjusted under 35 U.S.C. 154(b) by 192 days.

(21) Appl. No.: 17/443,442

(22) Filed: Jul. 26, 2021

(65) Prior Publication Data

US 2021/0357367 A1 Nov. 18, 2021

Related U.S. Application Data

(63) Continuation-in-part of application No. 15/630,051, filed on Jun. 22, 2017, now Pat. No. 11,074,219.

(60) Provisional application No. 62/354,189, filed on Jun. 24, 2016.

(51) Int. Cl.
*G06F 16/16* (2019.01)
*G06F 3/04845* (2022.01)
*G06F 3/0482* (2013.01)

(52) U.S. Cl.
CPC .......... *G06F 16/168* (2019.01); *G06F 3/0482* (2013.01); *G06F 3/04845* (2013.01); *G06F 2203/04806* (2013.01)

(58) Field of Classification Search
CPC .. G06F 3/0446; G06F 16/9577; G06F 3/0481; G06F 1/16; G06F 3/0482
See application file for complete search history.

(56) References Cited

U.S. PATENT DOCUMENTS

| | | |
|---|---|---|
| 6,195,094 B1 | 2/2001 | Celebiler |
| 8,423,553 B2 | 4/2013 | Haenel et al. |
| 8,432,400 B1 | 4/2013 | Weskamp |
| 8,819,593 B2 | 8/2014 | Hoogerwerf et al. |
| 8,836,711 B2 | 9/2014 | Hsieh |
| 8,892,679 B1 | 11/2014 | Destagnol et al. |
| 8,947,375 B2 | 2/2015 | Miyazaki et al. |
| 9,069,455 B2 | 6/2015 | Sripada |
| 9,098,516 B2 | 8/2015 | Jones |
| 9,164,653 B2 | 10/2015 | Keondjian et al. |
| 9,183,006 B2 | 11/2015 | Turcotte et al. |

(Continued)

OTHER PUBLICATIONS

European Search Report corresponding to European Application No. EP17816269, dated Jan. 27, 2020.

(Continued)

*Primary Examiner* — Justin S Lee
(74) *Attorney, Agent, or Firm* — ArentFox Schiff LLP

(57) ABSTRACT

Methods, systems, and computer-readable medium for a visual file manager are described. For example, operation of a visual file manager on a graphical user interface (GUI) of a computer system is described in which folder(s) in a folder hierarchy of the computer system is/are graphically represented by master panel(s) of the visual file manager, and contents of the folder(s) being configured to be individually and graphically modified within the master panel(s) as a plurality of icons. For example, the visual file manager may receive and execute a request to configure a layout of the plurality of icons in a panel, and subsequently receive and execute a request to adjust a size of the panel. The visual file manager may execute the request to adjust the size of the panel by adjusting a grid system of the panel such that the layout of the plurality of icons is not changed.

20 Claims, 54 Drawing Sheets

(56) References Cited

U.S. PATENT DOCUMENTS

| | | |
|---|---|---|
| 10,048,839 B2 | 8/2018 | Boshoff |
| 10,630,935 B2* | 4/2020 | Lin .................... H04N 7/0122 |
| 10,884,575 B2* | 1/2021 | Rubinstein ............ G06F 3/0482 |
| 11,003,422 B2* | 5/2021 | Penland .................... G06F 8/34 |
| 11,151,314 B2* | 10/2021 | Seel ...................... G06F 40/154 |
| 2002/0113816 A1 | 8/2002 | Mitchell et al. |
| 2003/0009411 A1* | 1/2003 | Ram ...................... G06Q 40/06 |
| | | 705/37 |
| 2006/0036568 A1 | 2/2006 | Moore et al. |
| 2007/0101294 A1 | 5/2007 | Fong et al. |
| 2009/0113350 A1 | 4/2009 | Hibino et al. |
| 2010/0333017 A1 | 12/2010 | Ortiz |
| 2011/0167367 A1 | 7/2011 | Sharma |
| 2013/0212485 A1 | 8/2013 | Yankovich et al. |
| 2014/0173499 A1* | 6/2014 | Wicks .................. G06F 3/0482 |
| | | 715/781 |
| 2015/0186460 A1 | 7/2015 | Fuse et al. |
| 2015/0339307 A1 | 11/2015 | Hultgren et al. |
| 2016/0028796 A1 | 1/2016 | Garcia et al. |
| 2016/0034153 A1 | 2/2016 | Lejeune et al. |
| 2017/0102927 A1* | 4/2017 | Gunther, Jr. .............. G06F 8/38 |
| 2017/0242836 A1* | 8/2017 | Marez ................. H04L 67/1097 |
| 2021/0263644 A1* | 8/2021 | Robinson ............. G06F 3/0485 |

OTHER PUBLICATIONS

International Search Report and Written Opinion issued in PCT/US2017/038948 dated Aug. 14, 2017.

* cited by examiner

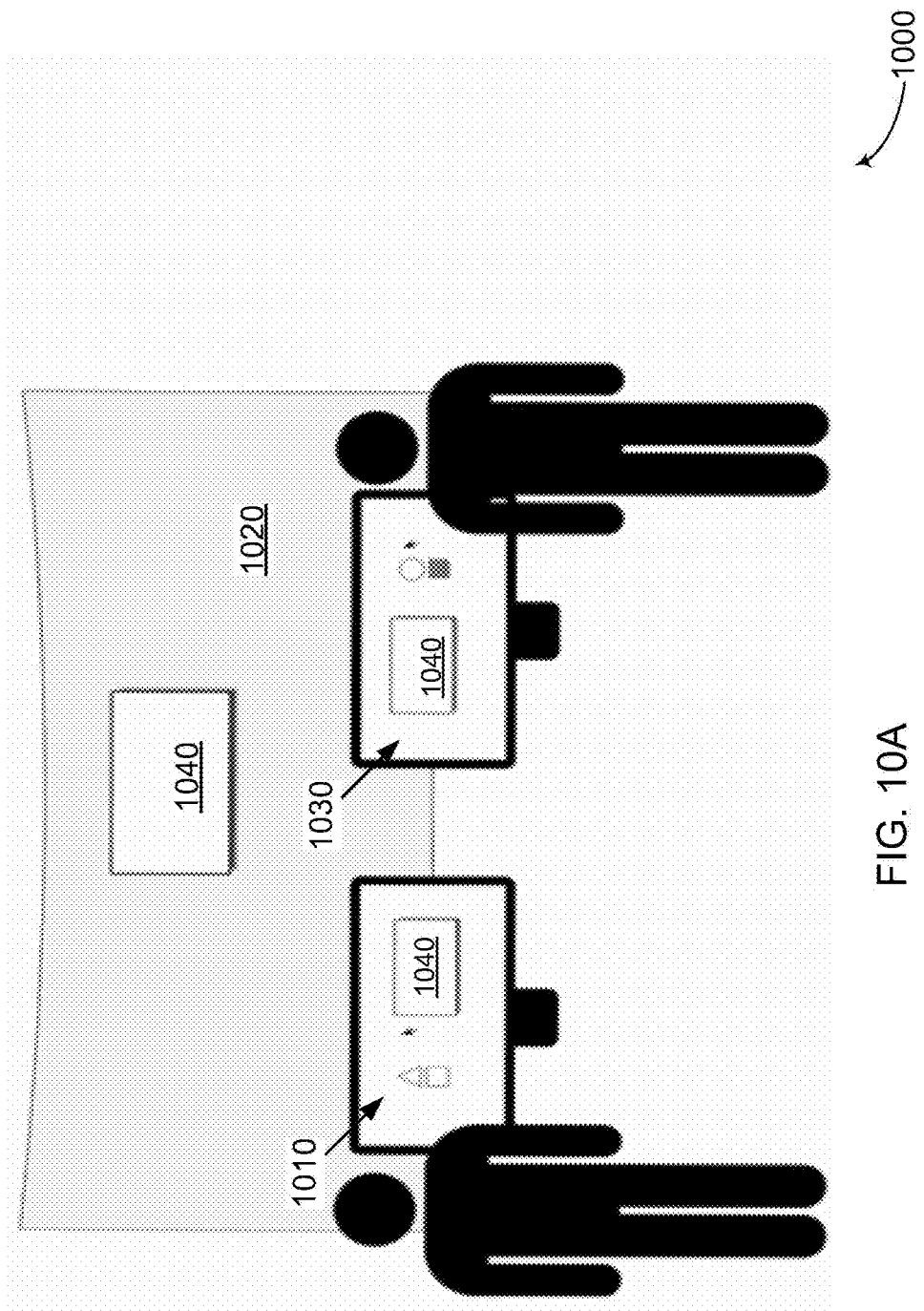

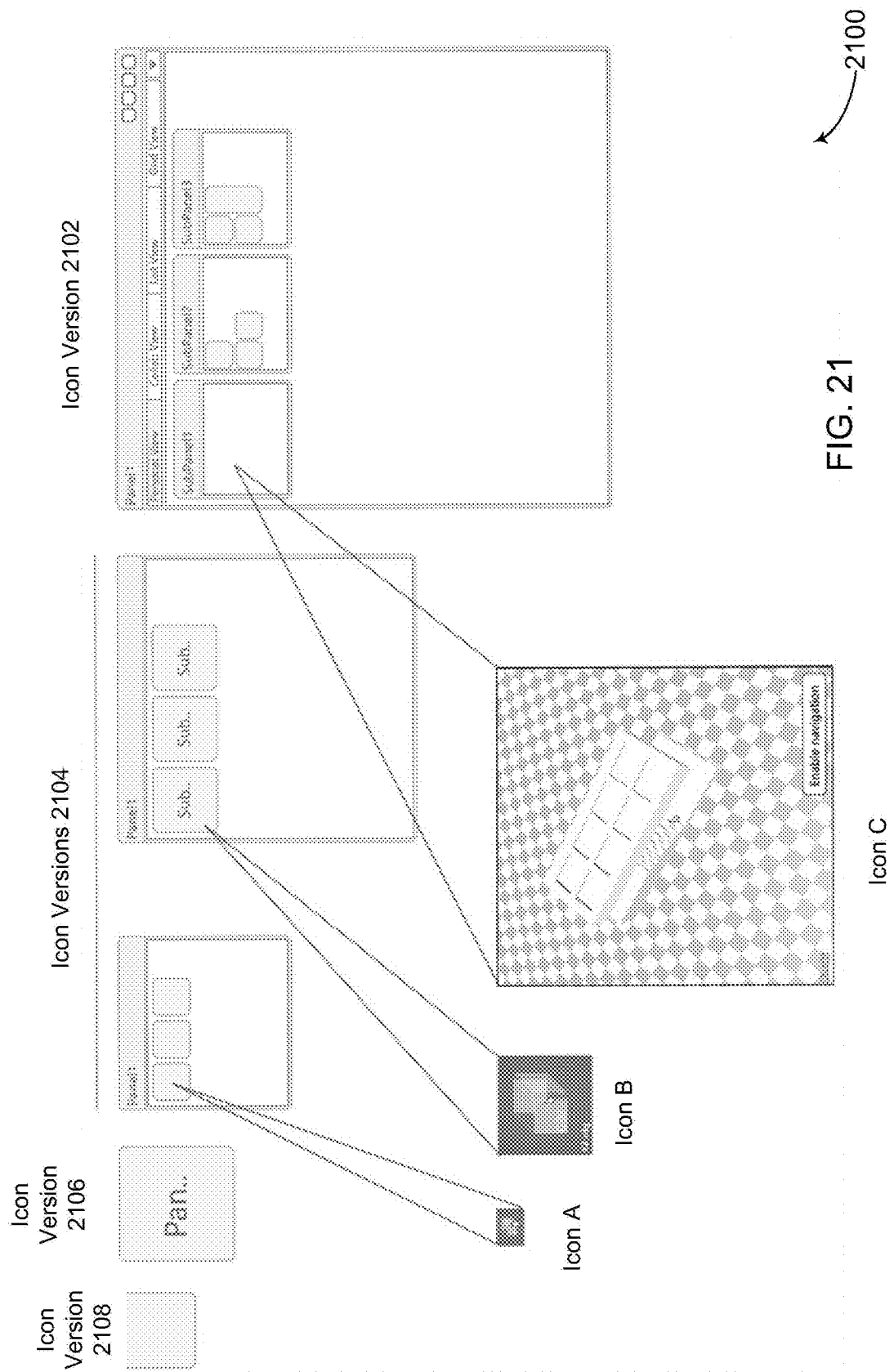

VISUAL FILE MANAGER

CROSS REFERENCE TO RELATED APPLICATIONS

The present application is a continuation-in-part of U.S. Non-Provisional application Ser. No. 15/630,051, filed Jun. 22, 2017, and which claims priority to U.S. Provisional Application No. 62/354,189 filed on Jun. 24, 2016, the entire contents of each of which are incorporated herein by reference.

BACKGROUND

Aspects of the present disclosure relate generally to information management, and more particularly, to techniques for a visual file manager.

Organizing files is an integral part of a work process for many computer users. Currently, computer users are mostly relying on and using default file managers that typically come pre-installed with the operating systems. The basic principles of file managers have not changed since they were first introduced. That's why, computer users see and organize their files more or less the same way, regardless of the file manager being used. In a way, working with current file managers is similar to working with old file cabinets. However, whether it is personal or within a collaborative group, file organization can become confusing, messy, and unpleasant especially when a project gets more complex with many files under many different folders. Current file managers are rigid, inefficient, and not intuitive. They do not present or organize information in a manner that is consistent with how people work, particularly how people work in teams and projects. That is, there are some limitations in the way documents are organized and how computer users access those documents in current file managers.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, methods, apparatus, and computer-readable medium for handling information in a computer system, comprising: operating, by one or more processors, a visual file manager that graphically organizes and displays assets (e.g., folders, files), the visual file manager being configured to perform one or more of: generating or constructing diagrams, linking a directory, tabbing, transferring files, enabling a file basket, broadcasting a panel as a website, enabling a locator, generating, managing, and interacting with panels, interacting with assets, managing a relationship between a panels and an asset, generating a grid for a master panel, managing a relationship between an asset, a name, and a grid, managing appearances of assets, converting panel types, generating and managing a toolbar, enabling collaboration between two or more computer users, or performing one or more of a right click menu, a hold function, a hide function, a record process, a search, an undo, a full screen, a print screen, a link, a sound recording, a panel market, a tool market, a tag, or a profile.

In another aspect, methods, apparatus, and computer-readable medium are described for graphically and dynamically representing a file system (e.g., at least a portion of a file system hierarchy) via a graphic method (e.g., a recursive panel system) through a zooming user interface with large zooming capabilities. For example, folders can be represented by rectangles (e.g., rectangular panels) and structure. In some instances, one folder can exist inside another folder by having recursive or nested rectangles (e.g., one rectangular panel inside another rectangular panel). Changes that may occur in this recursive panel system can be reflected to the file system, while changes in the file system can be reflected in the recursive panel system. In an aspect, the recursive panel system can be referred to as a visual file manager. The zoom level graphics in the recursive panel system can reveal the original resolution representation of items as the user zooms in a master panel of the recursive panel system. This concept can be applied to all files and folders equally. Files and folders can have different representations or different visible sizes at different zoom levels.

In another aspect, a method for operating a visual file manager on a graphical user interface (GUI) of a computer system is described that includes graphically representing on the GUI (1) a first folder in a folder hierarchy of the computer system by a first master panel of the visual file manager, (2) at least one file in the first folder by at least one icon on the first master panel, and (3) a nested folder in the first folder by a first panel on the first master panel, wherein contents of the master panel is organized in a first grid system and contents of the first panel is organized in a second grid system, wherein a unit size indicative of a smallest size possible for an icon in the first grid system is different than a unit size of the second grid system. The method further includes receiving and executing a request to configure a layout of a plurality of icons in the first panel, wherein the request indicates a relative size and position for each of the plurality of icons in the layout. The method further includes receiving and executing a request to adjust a size of the first panel, wherein executing the request to adjust the size of the first panel comprises changing a grid system of the first panel to a third grid system such that the layout of the plurality of icons is not changed.

In yet another aspect, a computer system for operating a visual file manager on a GUI is described that includes a memory (e.g., a computer-readable medium) storing instructions; and one or more processors (e.g., a central processing unit or processor (CPU) and a graphics processing unit or graphics processor (GPU)) coupled to the memory, wherein the one or more processors and the memory are configured to execute the instructions to graphically represent on the GUI (1) a first folder in a folder hierarchy of the computer system by a first master panel master panel of the visual file manager, (2) at least one file in the first folder by at least one icon on the first master panel master panel, and (3) a nested folder in the first folder by a first panel on the first master panel master panel, wherein contents of the master panel master panel is organized in a first grid system and contents of the first panel is organized in a second grid system, wherein a unit size indicative of a smallest size possible for an icon in the first grid system is different than a unit size of the second grid system. The one or more processors are further configured to execute instructions to receive and execute a request to configure a layout of a plurality of icons in the first panel, wherein the request indicates a relative size and position for each of the plurality of icons in the layout. The one or more processors are further configured to execute instructions to receive and execute a request to adjust a size of the first panel, wherein executing the request to adjust the size of the first panel comprises changing a grid system of the first panel to a third grid system such that the layout of the plurality of icons is not changed.

In another aspect, a computer-readable medium storing computer executable code for operating a visual file manager on a GUI of a computer system is described that includes code for graphically representing on the GUI (1) a first folder in a folder hierarchy of the computer system by a first master panel of the visual file manager, (2) at least one file in the first folder by at least one icon on the first master panel, and (3) a nested folder in the first folder by a first panel on the first master panel, wherein contents of the master panel is organized in a first grid system and contents of the first panel is organized in a second grid system, wherein a unit size indicative of a smallest size possible for an icon in the first grid system is different than a unit size of the second grid system. The computer-readable medium further includes code for receiving and executing a request to configure a layout of a plurality of icons in the first panel, wherein the request indicates a relative size and position for each of the plurality of icons in the layout. The computer-readable medium further includes code for receiving and executing a request to adjust a size of the first panel, wherein executing the request to adjust the size of the first panel comprises changing a grid system of the first panel to a third grid system such that the layout of the plurality of icons is not changed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIGS. 10A and 10B are diagrams illustrating another example of collaboration by multiple users of the visual file manager.

FIG. 21 is a diagram illustrating an example of resizing and changing panel icons and file icons in a canvas.

DETAILED DESCRIPTION

Figure 1:
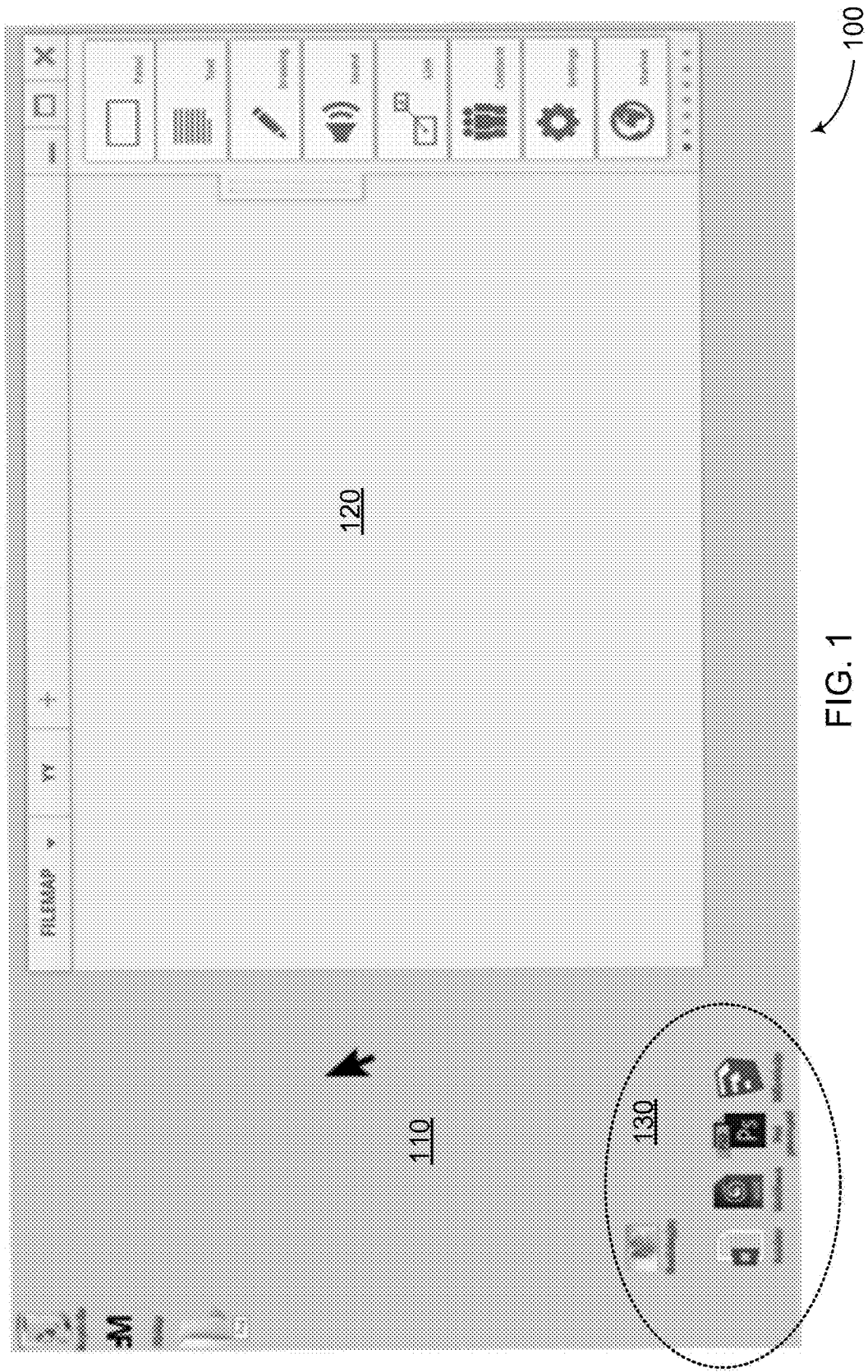
FIG. 1 is a diagram illustrating a visual file manager on a graphical user interface (GUI) of a computer system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As described above, whether it is personal or within a collaborative group, file organization can become confusing, messy, and unpleasant especially when a project gets more complex with many files under many different folders. Current file managers are rigid, inefficient, and not intuitive. They do not present or organize information in a manner that is consistent with how people work, particularly how people work in teams and projects. That is, there are some limitations in the way documents are organized and how computer users access those documents in current file managers.

The present disclosure describes a novel, visual file manager generally referred to as FileMap. Aspects of FileMap may be designed to address the pain points that come with default file managers; that is, FileMap can improve the way computer users see, organize, and collaborate with a file system. As used in this disclosure, the terms "visual file manager" and "FileMap" may be used interchangeably.

FileMap provides a solution that allows for visual or graphical interaction, enables the management or organization of files and folders, and allows for a collaborative environment as well. Other solutions currently available do not provide the comprehensive and flexible platform that FileMap makes available to users. For example, other software such as Mural, Conceptboard, Prezi, Mezzanine from Oblong Industries, and Canvas for OneNote are suitable only for cloud-based collaborative environments. Deon allows such cloud-based collaborative environments and some file linking capability. EagleMode, Raskin for MAC, and Bump Top are simply alternative file viewers/file managers. And solutions such as Seadragon and Google Earth have zooming capabilities. These solutions are limited in that they do not provide a system that allows to graphically and dynamically represent a file system via a graphic method through a zooming user interface with a wide zooming range.

FileMap is a visual, flexible, and intuitive file manager that introduces a new way to interact with a file system. FileMap is inspired by and based on the way designers and visual thinkers work on whiteboards. Attaching assets such as images, texts, and physical models on whiteboards help designers to see the big picture of their work. They can play with the organization, demonstrate processes, find new connections, and new ideas. Seeing everything in one place helps them think in ways which may not be possible just by looking at every item one by one. FileMap uses this approach as the basis of how to display and organize files and folders on a canvas (used interchangeably with "workspace") that is zoomable. That is, aspects of the canvas can be enlarged, magnified, expanded, amplified, reduced, scaled, or shrunk, for example. By implementing features described in connection with FileMap, the file system can be transformed from a routine and limited environment into a creative space and helps people organize, think, brainstorm, and collaborate visually. If current file managers are like old file cabinets, the features of FileMap make it akin to a whiteboard.

FileMap's Connection with the File System

FileMap may implemented and operated separately from other file managers. However, the operations or functions of FileMap may be reflected in other file managers supported by a system. Once a folder is linked to FileMap, for example, it may represent the folder as the empty master panel and its sub-folders as panels that are part of the master panel. Files are shown in panels based on their location in the file system. This way both content and structure, which are provided by the operations of FileMap, can be seen and manipulated inside the same graphical layout.

In this system, FileMap allows for the position and size of any item or element (e.g., any representation of a sub-folder or file) to be changed and the visual layout to be reorganized. Since file structure is represented and controlled via panels, if the position of an item is changed in a way that affects the panel or file containment, the new organization will be reflected to the file structure. After this organization, if a computer user opens the linked folder via a default file manager instead of FileMap, the computer user will be able to see that the file system is changed and updated based on the graphical layout in FileMap.

Any file or panel in FileMap may act as a link. For example, if a computer user double clicks a file, it may be opened via the related viewer or software; if a computer user double clicks a panel, the linked folder may open via the default file manager.

FileMap Features

As described above, FileMap is a visual file management and collaboration suite that can be implemented in software. Aspects or features of FileMap include, but need not be limited to:

Displays files, folders, and other assets on a zoomable canvas or workspace.

Allows users to organize files and folders freely by changing their position, scale, and appearance.

Provides the flexibility to visually organize projects, express ideas, and processes by using assets.

Allows users to manipulate the file structure by using panels inside the zoomable canvas.

Provides users the ability to collaborate in this visual interface by using third party cloud storage software infrastructure.

Provides tools and functions to enhance productivity such as recording, rewinding, and re-playing graphical layout changes and creating presentations based on zooming and panning to different locations in the master panel.

Provides a basis for further plug-ins, tools, and applications to be added for enhancements, alternative use cases, and workflows.

Problem-Solution (Existing File Managers and FileMap)

As described above, there may be many limitations of existing file managers and FileMap may introduce solutions to those limitations.

In a first example of a problem, existing file managers may have limited content visibility. While a folder is open, the user has a limited visual access to other files and folders. FileMap may provide a solution in which there is content visibility. Since all files and folders are represented and viewed on a single zoomable canvas, representations of neighboring files and folders can be seen within the same screen space.

In another example of a problem, existing file managers may have limited sense of context. While the user drills deep through a folder hierarchy (opening a folder, observing the content, deciding how to proceed, and opening a sub folder until the desired file or folder is found), the visual indicators for creating a mental map for the higher and lower branches of the hierarchy are often absent or regulated with generic ordering principles (such as an expandable dropdown list or a directory path). Usually, the only visible aspect is the content of a single folder; in other words, the user cannot really get the sense of his-her position in the file system. FileMap may provide a solution in which there is a sense of context. The user creates a mental map based on the visual layout. The brain will register patterns and shapes created by the organization. This will help to find files by zooming to locations and gradually narrowing the focus. This process resembles navigating a map; the user doesn't need to remember the position and the location of every mountain, building, or street. The overall layout of elements and the visual complexity help the user pinpoint specific locations on the map.

In another example of a problem, existing file managers may have generic ordering principles. All content in a folder may be arrayed with a single principle; (such as grid, list or the like), ordered sequentially based on a single meta-data (such as name, date, type, and the like), and all icons have the same scale at all times; they all scale up and down together. Icons may be used interchangeably with items. FileMap may provide a solution in which the position and scale of any element can be changed within the canvas, this gives the user the ability to organize content freely. Even if the hierarchy is represented graphically, it is not one of the major influences for creating a visual organization like in regular file managers, on the contrary, it is another element to be used for creating and customizing graphical organization. Flexibility and organizational freedom are two principles of FileMap.

In another example of a problem, existing file managers may have limited choice of visual representation. Files and folders may be represented by icons and names. The offered customization options don't go beyond a certain level of flexibility. FileMap may provide a solution in which there is visual representation of content. As used in this disclosure, the terms "visual representation" and "graphical representation" may be used interchangeably. In FileMap, the appearance of any individual or particular content can be changed. This gives the opportunity to express any file with any kind of representation. This increases the speed and accuracy for finding and understanding items since visual recognition is faster than the process of sorting elements which has mostly generic visual features. Additionally, the appearance of an element (including a panel) can be changed based on the zoom level and/or screen size. This allows fine tuning the content representation for different zoom levels.

In another example of a problem, existing file managers may require drilling back and forth the folder hierarchy. Navigating through the folders requires double-clicking to enter a folder and clicking backward to go back one folder at a time. FileMap may provide a solution in which it is possible to much more easily navigate the folder hierarchy. Navigating the folder hierarchy is achieved by zooming and panning. Since the user doesn't need to click to go forward or backward, it saves time and prevents distraction.

In another example of a problem, existing file managers may make inefficient use of screen space. When a folder is open, and if the number of elements displayed at that given moment is just a few, a large portion of the screen area will not be used. FileMap may provide a solution in which use of screen space is more efficient and effective. Since there are no constraints for organizing assets and panels on the canvas, one can optimize the visual layout based on his-her preference. The algorithms for translating the file manager to FileMap will optimize asset and panel layout for optimal space use.

Problem-Solution (Existing Creative Visual Collaboration Software and FileMap)

As described above, in addition to the limitations of existing file managers, there are also limitations of existing creative visual collaboration and project management software that can be addressed by the solutions introduced by FileMap.

In a first example of a problem, the file system and the creative visual canvas space are separate. The concept of visualizing ideas freely in a large canvas spaces lays in the core of several software (e.g., Deon, Mural, Conceptboard). However, in these software, zoomable canvases are mostly designed for brainstorming or ideation, not for file management. The user has to upload files to work, collaborate, and if making the new content a part of the actual file system is necessary he-she has to download the files to local hard drives. The work is divided between the actual file system and the canvas. Creating a unity between these two spaces is hard. The "creative space" acts as a supplement, not as an integral part of the actual project workflow. FileMap may provide a solution in which FileMap, the file manager, is also the creative canvas, thus brainstorming, organization, project management, and file management happen in one single, integrated visual space.

In another example of a problem, there may be limitations in file type support. For example, only some file types are accepted in creative software such as jpeg, pdf, video files, web links, and word documents. The limitation may demonstrate the intention of the software as only being a visual creative environment to brainstorm and not necessarily to manage files. FileMap may provide a solution to these limitations as any type of file is shown in FileMap. For example, some files are actively rendered with viewers such as videos, images, and texts; and some files are shown as icons. Mostly the ones that need more complex software are to be displayed, such as computer-aided design (CAD) files, for example.

In another example of a problem, there may be limitations in structured workflows in existing collaboration and project management software. These types of software often impose a meta-structure for content organization. This ends up influencing and regulating how people behave, think, collaborate, see, and work. These structures are often linear in the sense that files are added sequentially like a newsfeed; or structured under main categories such as chats, files, tasks, and schedules . . . etc., which visually segregate content; similarly, the file managers visually segregate files. FileMap may provide a solution to these limitations as it imposes almost no restrictions for visual organization and representation of assets. Any type of organizational structure or concept can be utilized to organize assets and to show workflow.

Various Aspects and Concepts on Organization and Visualization

Influencing and being influenced by stimuli: objects, buildings, pictures, people, and, any visible artifact have the potential to influence how we think. The influence works both in conscious and sub conscious level. So, simply making an idea visual can help people have a more in depth connection with the subject, see new connections, and generate new ideas.

The negative aspects of categorizing with default file managers: project files are often distributed in different folders in order to be categorized. Categorization creates a strict visual segregation of files. Each added element adds a mental burden to us since we partially have to remember the file locations and the status of a project. Another aspect is about the "meaning" of a file: a file may not fit under two categories at the same time or some files may fit to more than one. A file may have various parameters such as content, role, type, and value purpose; and categorizing it based on superficial organization rules can diminish its value since it will not be highlighted enough or will be identified inaccurately. So, the influence of folder names and categories doesn't always really make sense and can become distracting, misleading, and time consuming in the work process. When a folder structure is created, it has the potential to represent the project, change the work process, and affect the user's mental image about the project. It can become the conceptual summary of a project; in this case, it should not disproportionally dominate the workflow. Visually organizing the content, based on the essence of the project, would probably be a better way than obeying a system based on a highly mechanical method used to store files in the computer.

In creative professions such as architecture, design, and engineering; brainstorming and collaboration are often enhanced by placing assets such as drawings, pictures, post-its, and physical models on white boards and pin-walls. This enables to see the big picture, brainstorm, see new connections, and come up with new ideas. This layout helps people better understand their subjects, collaborate, and ideate in a visual way. FileMap is configured to make the interaction with digital files and folders similar to the interaction with whiteboards or pin-walls. Transforming how we interact with files closer the way we like to think can fundamentally improve how we create work organize and manage any kind of project.

Many CAD software provide a zoomable user interface to navigate through complex projects. For example: with these tools one can see both the smallest detail of a building and the building's situation in the larger urban context. Understanding and mental reconstruction improve when the tool enables the user to see the part to whole relationship. These tools exist; however they are about the "subject" not the context. FileMap will enable a computer user to see the larger context by providing a space for any kind of digital asset to coexist on. This way we will not only be able to see the subject but will also be able see how they are related within the larger context.

FIG. 1 is a diagram 100 illustrating a visual file manager 120 on a graphical user interface (GUI) 110 of a computer system, which in this example is shown as a desktop of a computer system. As shown in FIG. 1, the visual file manager 120 includes a canvas or workspace that is open and allows for the creation and manipulation of various items such as panels representative of sub-folders and icons representative of files. Also shown in FIG. 1 are several files 130 represented by icons displayed on the desktop of the computer system.

Figure 2A:
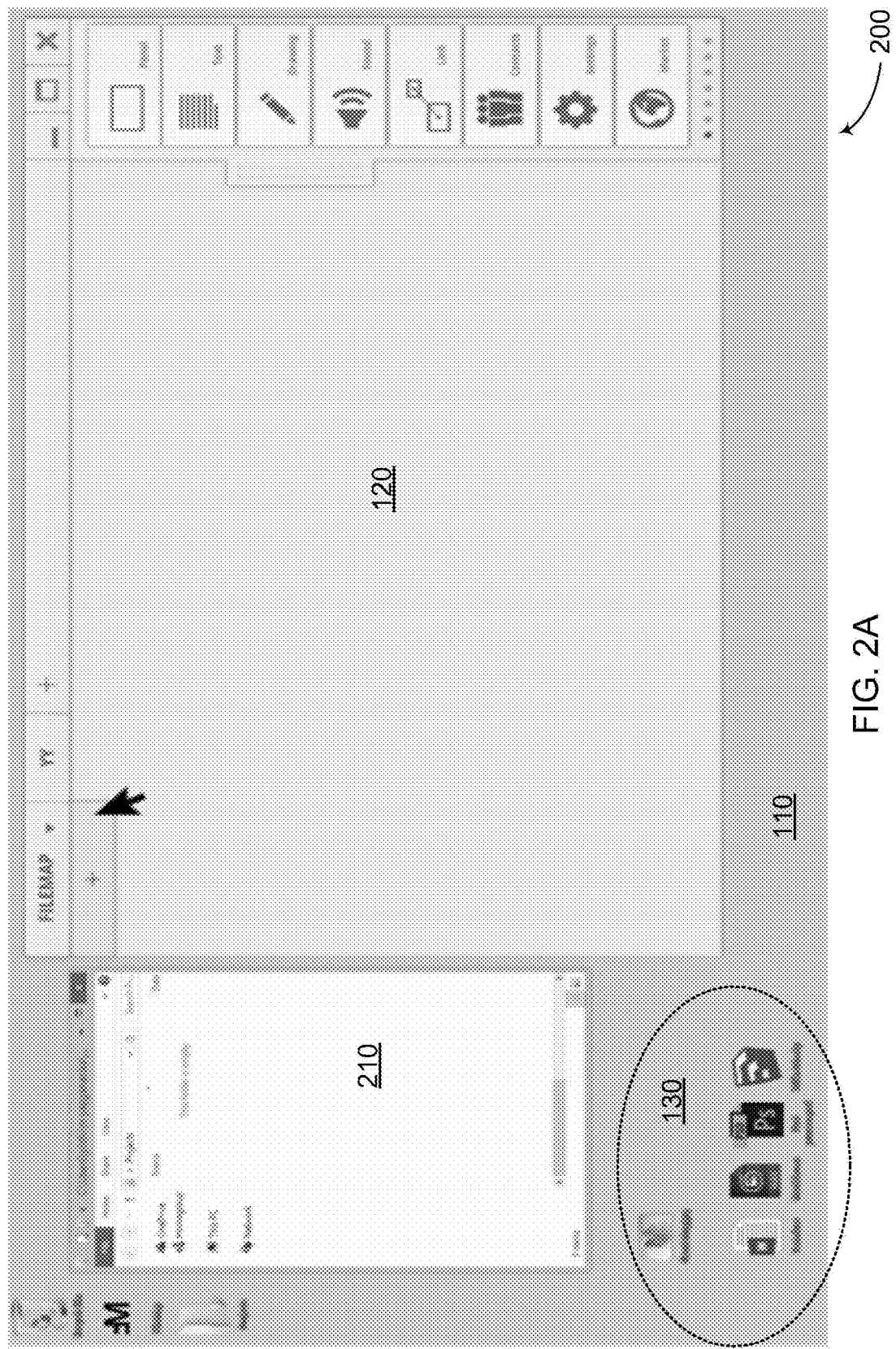
FIGS. 2A-2D are diagrams illustrating linking of folders to the visual file manager.

FIGS. 2A-2D are diagrams illustrating linking of folders to the visual file manager 120. FIG. 2A shows a diagram 200 in which the visual file system 120 is linked to a folder 210. Accordingly, the master panel of the visual file manager 120 is a graphical representation of the linked folder 210.

Figure 2B:
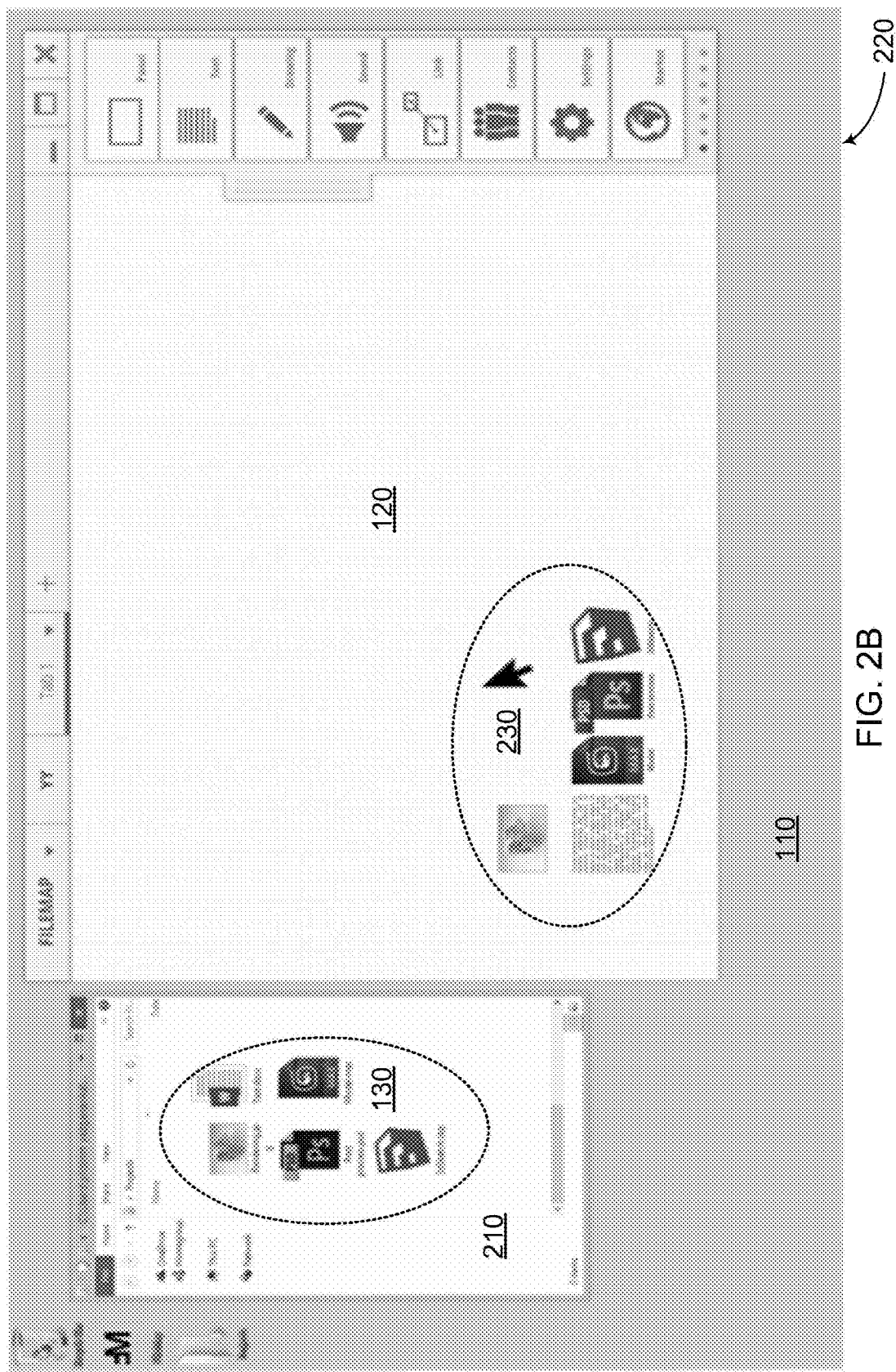

FIG. 2B shows a diagram 220 in which a user can move the files 130 from the desktop to the canvas or workspace of the visual file system 120. In this instance, the files are indicated as icons or images 230 on the master panel, while the files 130 have been automatically moved to the folder 210 and are shown as contents of the folder 210. That is, the files 130 were effectively moved from the desktop to the folder 210 by moving or placing them to the canvas of the visual file system 120. Once moved, the files 130 are now represented by icons 230 on the canvas.

Figure 2C:
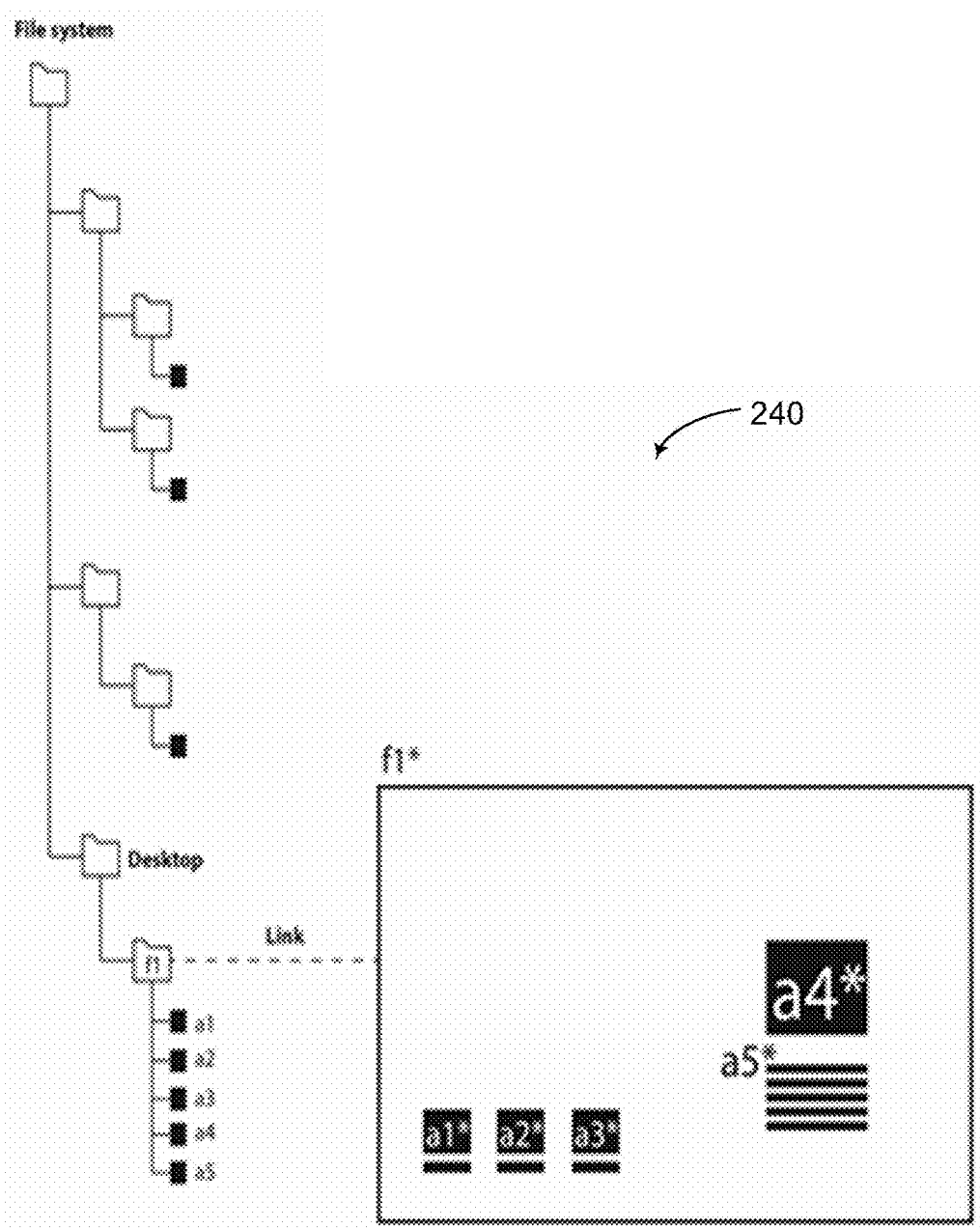

FIG. 2C shows a diagram 240 that illustrates an example of the linking of folders as described above in connection with FIGS. 2A and 2B. In this example, a linked folder "f1" is visually/graphically represented as a canvas space "f1*" in the visual file manager 120. The files in folder "f1", which include files "a1", "a2", "a3", "a4", and "a5" are visually/graphically represented as icons "a1*", "a2*", "a3*", "a4*", and "a5*" on the canvas space "f1*". The icons may be an exact representation of a least a portion of the contents of each file. For example, icon "a4*" may show at least a portion of an image contained inside the corresponding file "a4". Similarly, icon "a5*" may show at least a portion of text contained inside the corresponding file "a5".

Figure 2D:
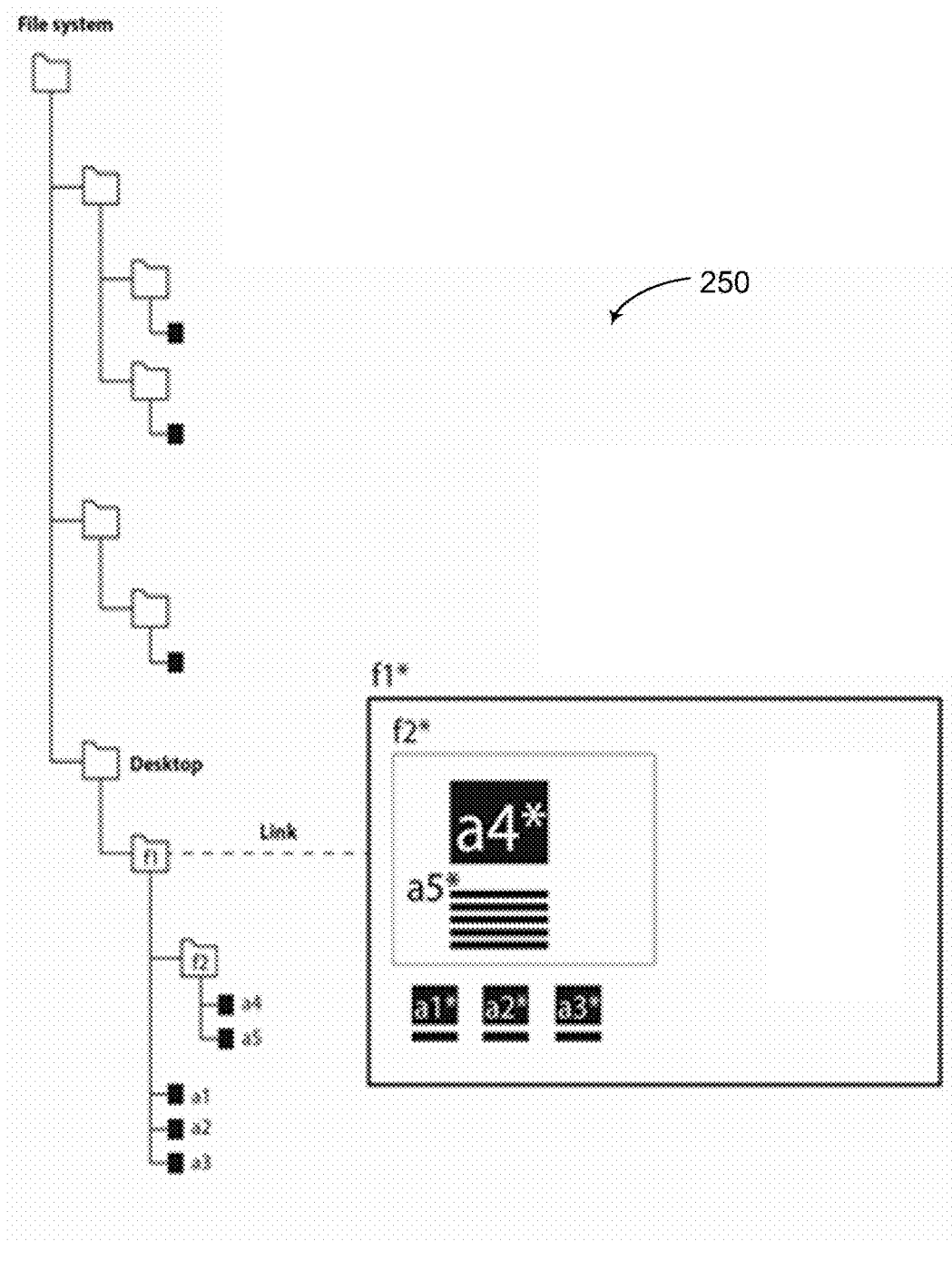

FIG. 2D shows a diagram 250 that illustrates another example of the linking of folders as described above in connection with FIGS. 2A and 2B. In this example, a linked folder "f1" is visually/graphically represented as a canvas space "f1*" in the visual file manager 120. The files in folder "f1", which include files "a1", "a2", and "a3" are visually/graphically represented as icons "a1*", "a2*", and "a3*" on the canvas space "f1*". The linked folder "f1" also includes a sub-folder "f2" having files "a4" and "a5". The sub-folder "f2" is visually/graphically represented as panel "f2*" within the canvas space "f1*" and files "a4" and "a5" are visually/graphically represented as icons "a4*" and "a5*" within the panel "f2*".

Figure 3A:
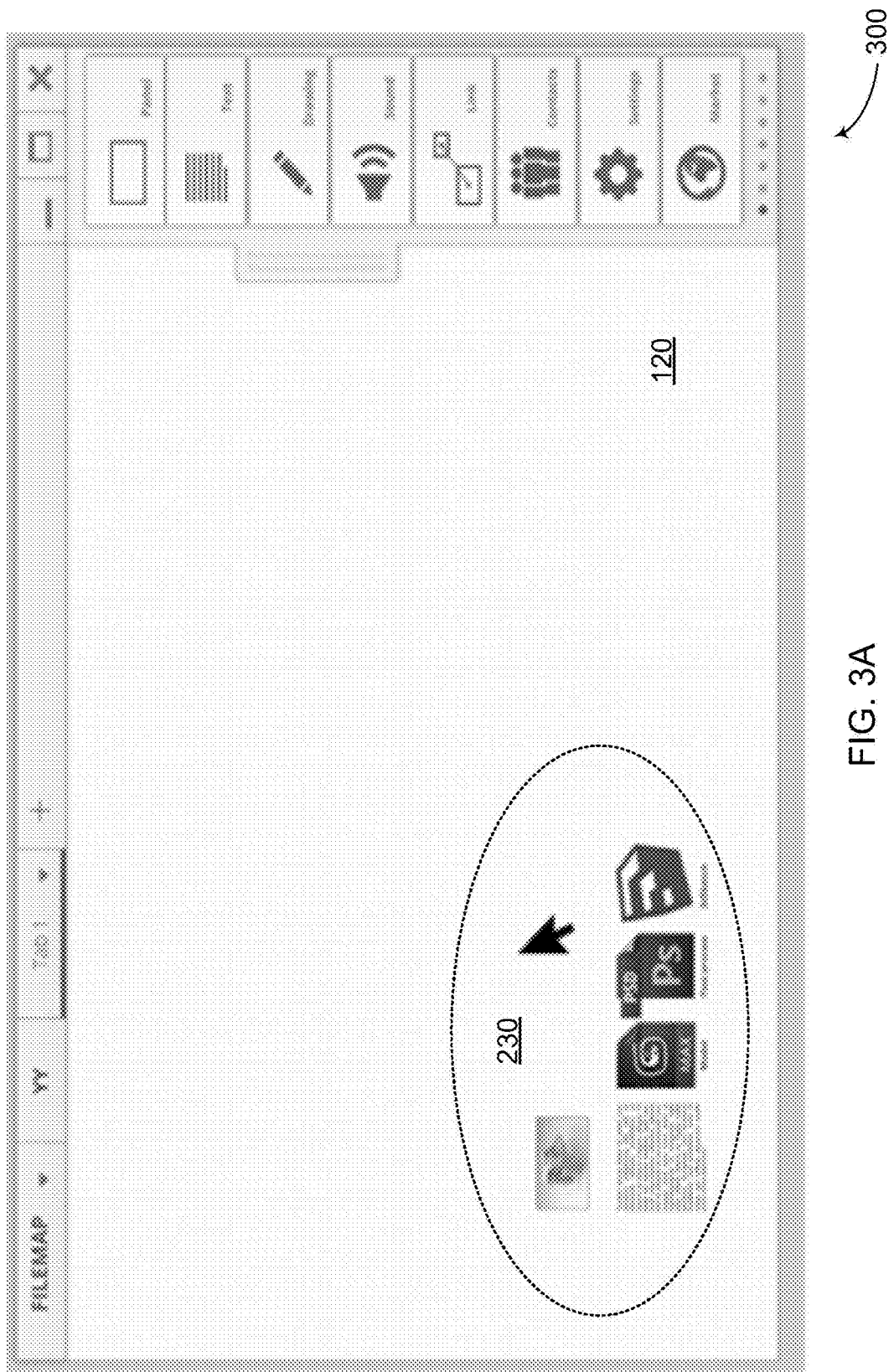
FIGS. 3A-3F are diagrams illustrating file/layout operations within the workspace of the visual file manager.

FIGS. 3A-3F are diagrams illustrating file operations within the canvas of the visual file manager 120. FIG. 3A shows a diagram 300 in which icons 230 representing files 130 inside folder 210 are displayed on the canvas or working space of the visual file manager 120. One of the capabilities of the visual file manager 120 is its ability to manipulate, modify, organize, and/or arrange icons (e.g., representations of files) as well as panels (e.g., representation of sub-folders) in a way that is suitable to a user.

Figure 3B:
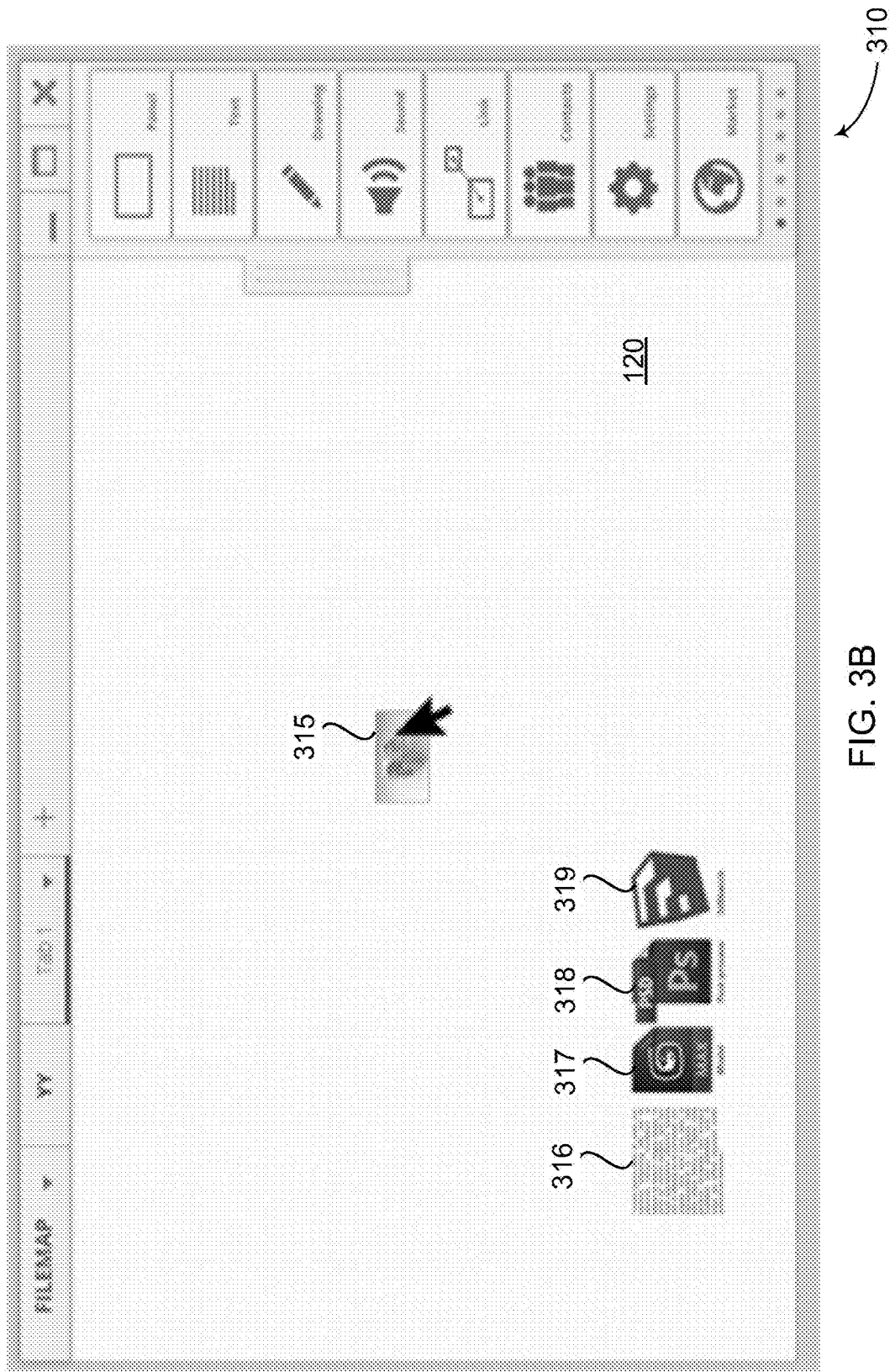

FIG. 3B shows a diagram 310 in which the icons 230 are now shown individually as icons 315, 316, 317, 318, and 319. Icon 315, which corresponds to an image or drawing, can be individually moved, positioned, or relocated within the canvas. The same is possible for each of the other icons (i.e., icons 316, 317, 318, and 319). Changing of the position or location of an icon allows the user to visually organize the contents of the folder 210 in a manner that is suitable to the user. The contents of the folder 210, that is, files 130, do not change by changing the location or position of each of the corresponding icons on the canvas.

Figure 3C:
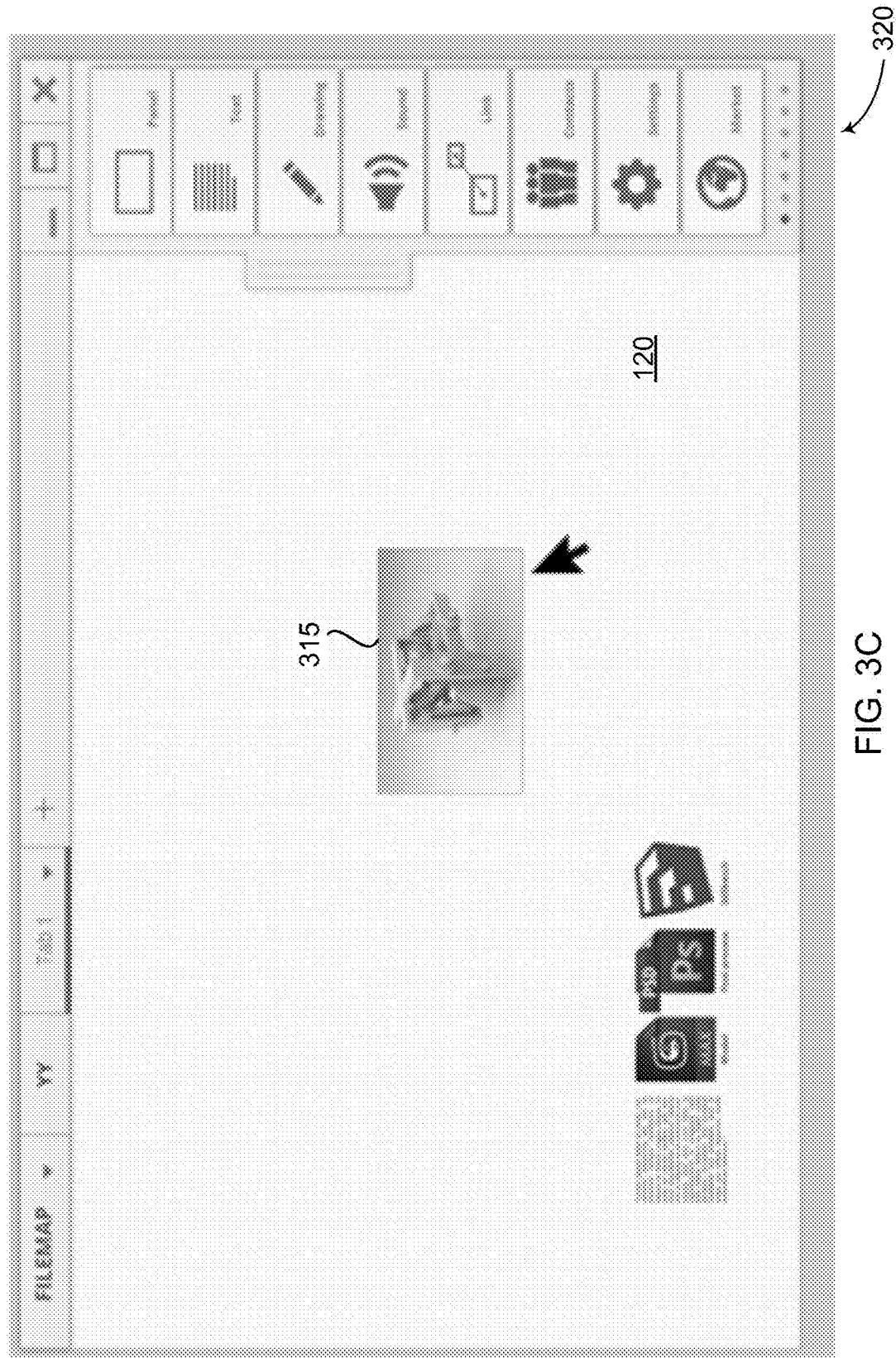

FIG. 3C shows a diagram 320 that illustrates another operation that is possible within the canvas of the visual file manager 120. In this case, icon 315 is resized to a size that is suitable to the user. For example, icon 315 can be enlarged (e.g., modified or changed to a larger size than the current size) or can be reduced (e.g., modified or changed to a smaller size than the current size). The other icons can be kept at their current sizes or can be individually modified like icon 315. In some instances, there may be several icons having different sizes on the canvas, where the various sizes can be defined (e.g., selected) by a user in accordance of user preferences for displaying the icons.

Figure 3D:
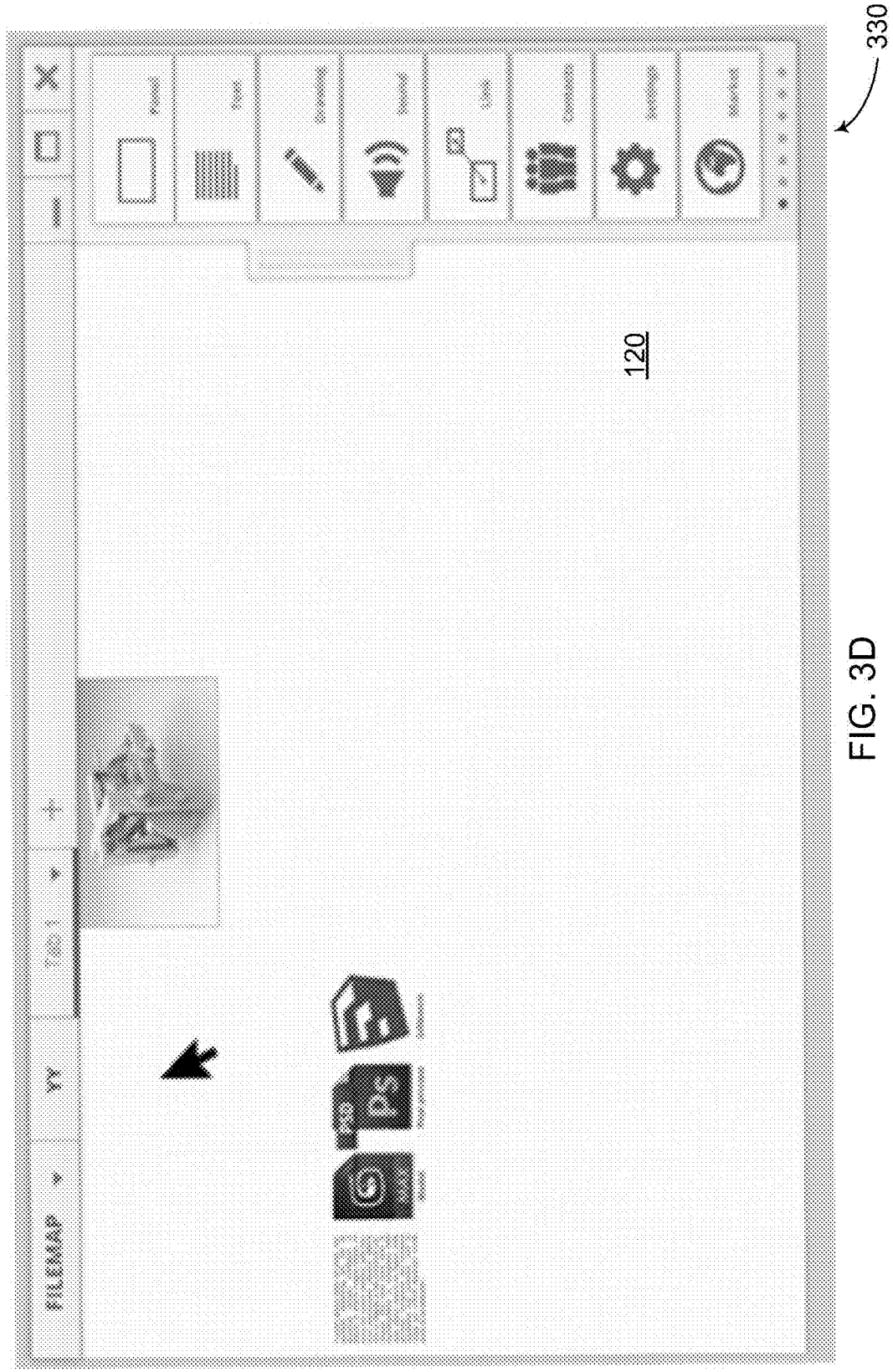

FIG. 3D shows a diagram 330 that illustrates another operation that is possible within the canvas of the visual file manager 120. In this case, icons 316, 317, 318, 319, and resized icon 315 can be panned across the canvas.

Figure 3E:
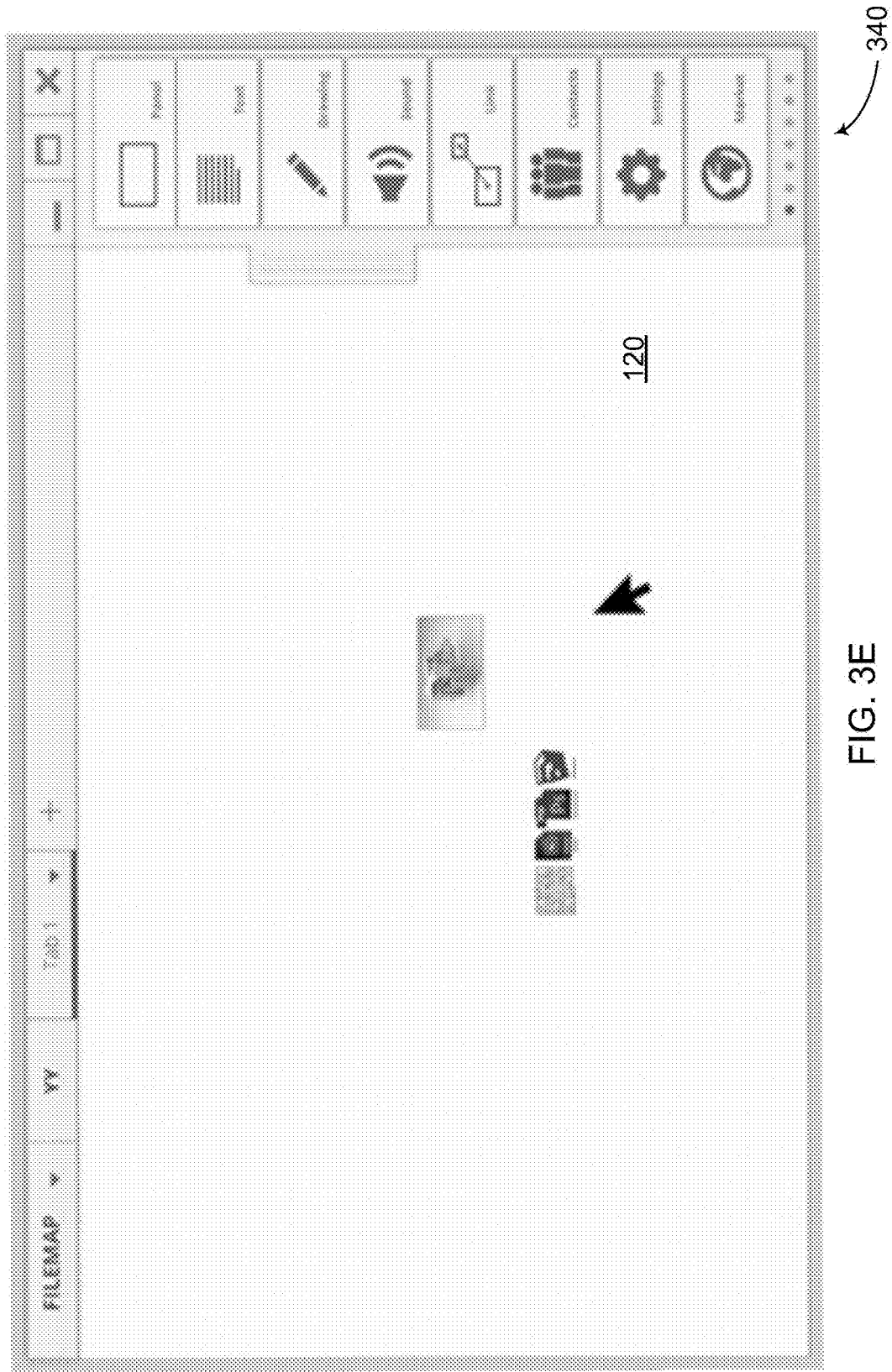
Figure 3F:
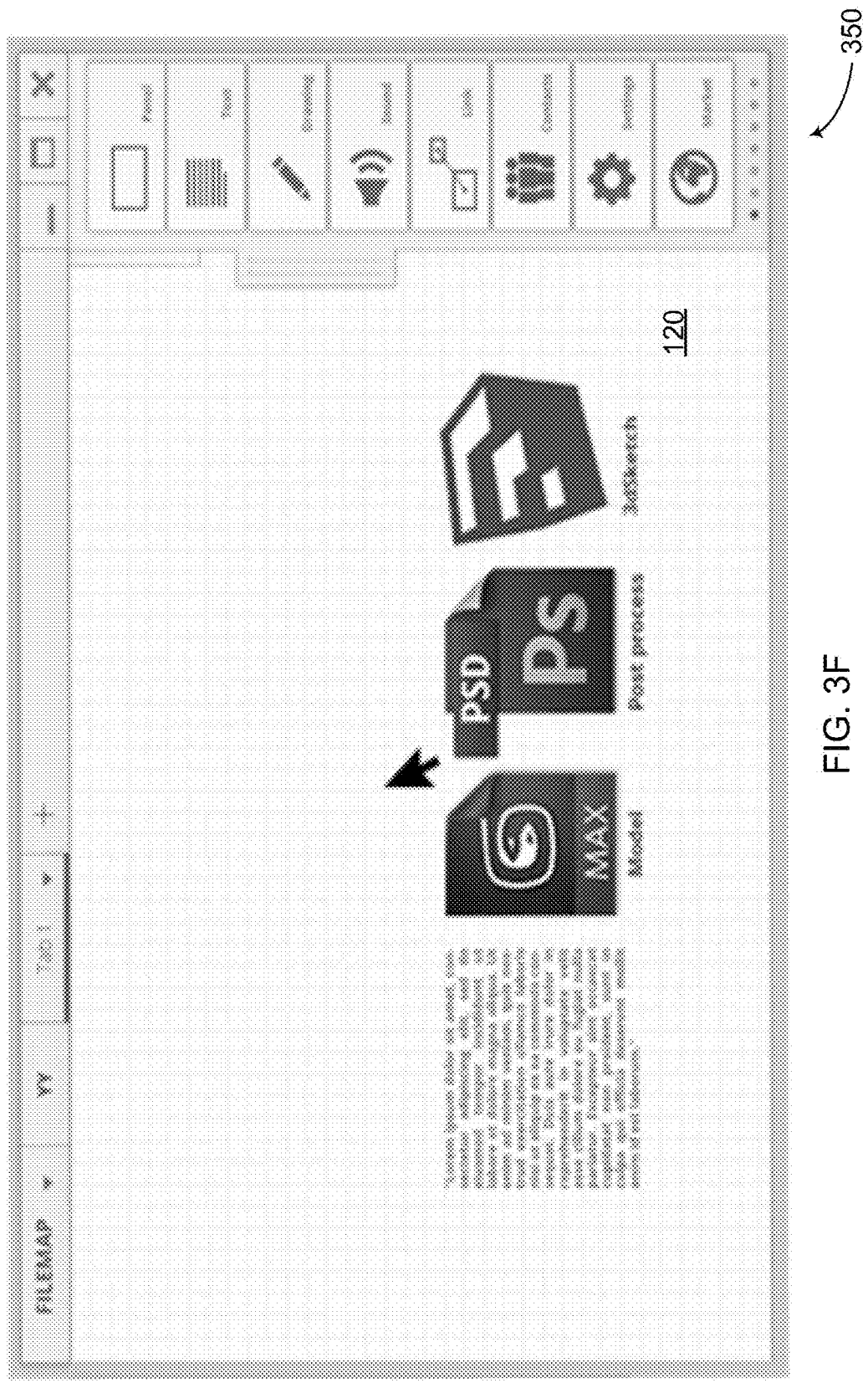

FIGS. 3E and 3F show diagrams 340 and 350 that respectively illustrate the operations of zooming out and zooming in that can be performed on the canvas of the visual file manager 120. In diagram 340, by zooming out it is possible to see additional space in the canvas around icons 316, 317, 318, 319, and resized icon 315. In diagram 350, by zooming in it is possible to see more detail of icons 316, 317, 318, 319, and resized icon 315 (which is mostly shown outside the displayed portion of the canvas).

Figure 4A:
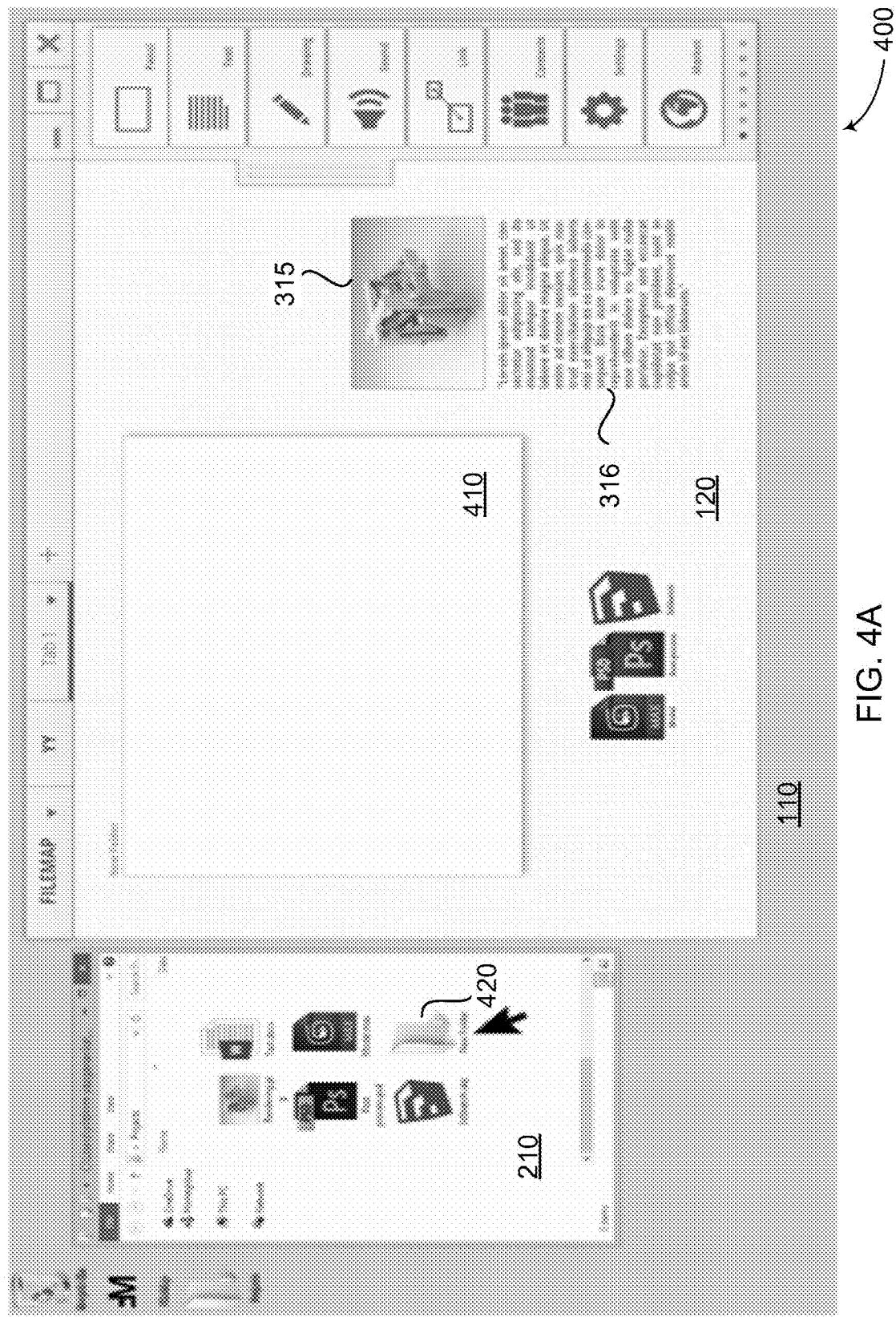
FIGS. 4A and 4B are diagrams illustrating the movement of items in panels in the visual file manager.
Figure 4B:
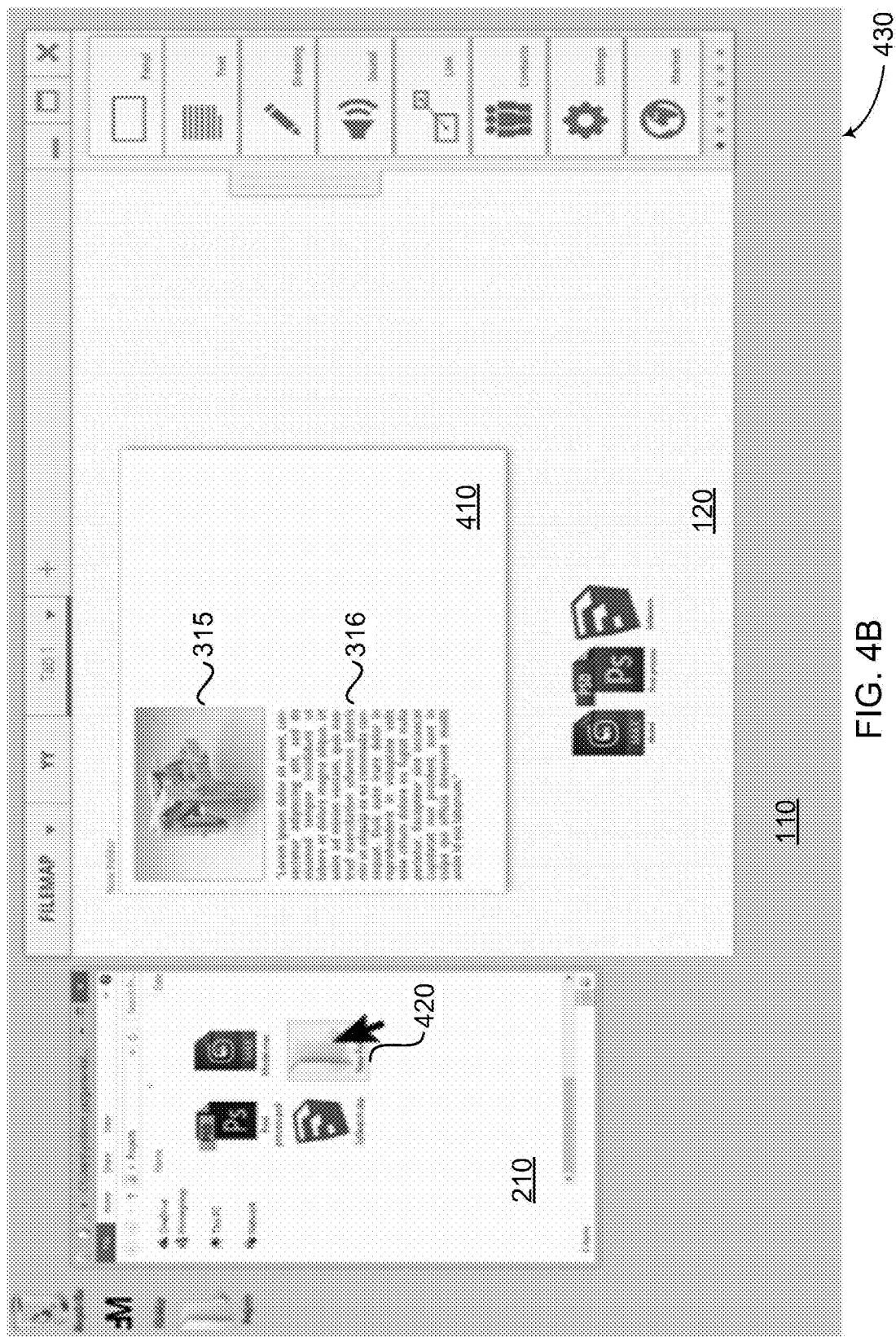

FIGS. 4A and 4B are diagrams illustrating the creation of panels in the visual file manager 120. FIG. 4A shows a diagram 400 in which a new panel (e.g., rectangular panel) 410 has been added to the canvas of the visual file manager 120. Upon the creation of the panel 410, a corresponding sub-folder 420 is automatically created inside the folder 210. Also shown in FIG. 4A are the icons 230, which are shown with icons 315 and 316 resized and positioned one over the other.

FIG. 4B shows a diagram 430 in which the icons 315 and 316 are moved inside the panel 410. In response to this action, the corresponding files to icons 315 and 316 in folder 210 are automatically moved to sub-folder 420. As such, the creation and/or organization of sub-folders and files in the visual file manager 120 is propagated to the linked folder 210 that is part of the folder hierarchy supported by the operating system running on the computer system. As such, changes in the folder 210 can be propagated and are reflected in the visual file manager 120, while changes in the visual file manager 120 can be propagated and are reflected in the folder 210 (e.g., new files added in the file system of the operating system will be automatically added in visual file manager 120 and files deleted in the file system of the operating system will be deleted from visual file manager).

Figure 5A:
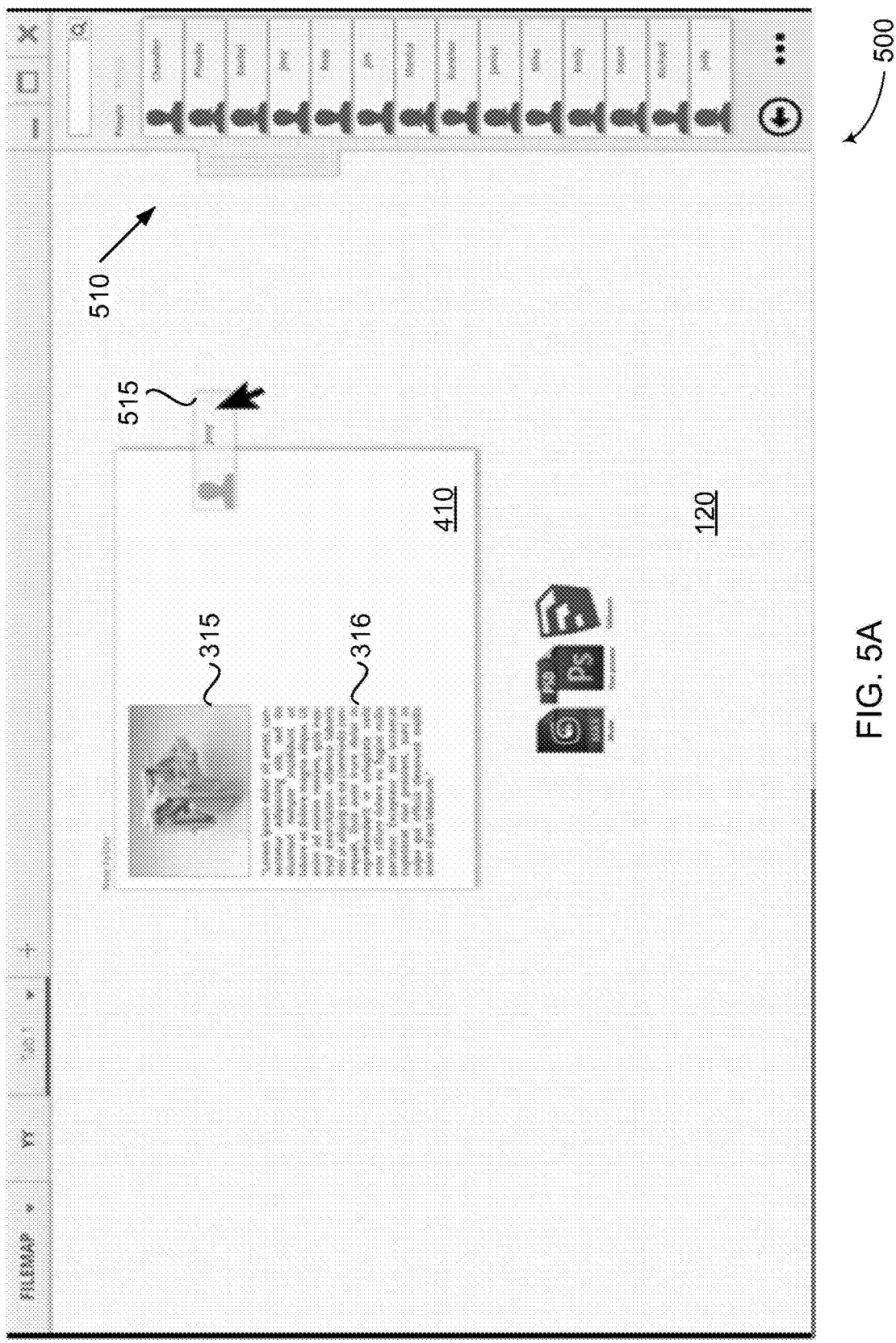
FIGS. 5A-5C are diagrams illustrating collaboration with a contact within a panel in the visual file manager.
Figure 5B:
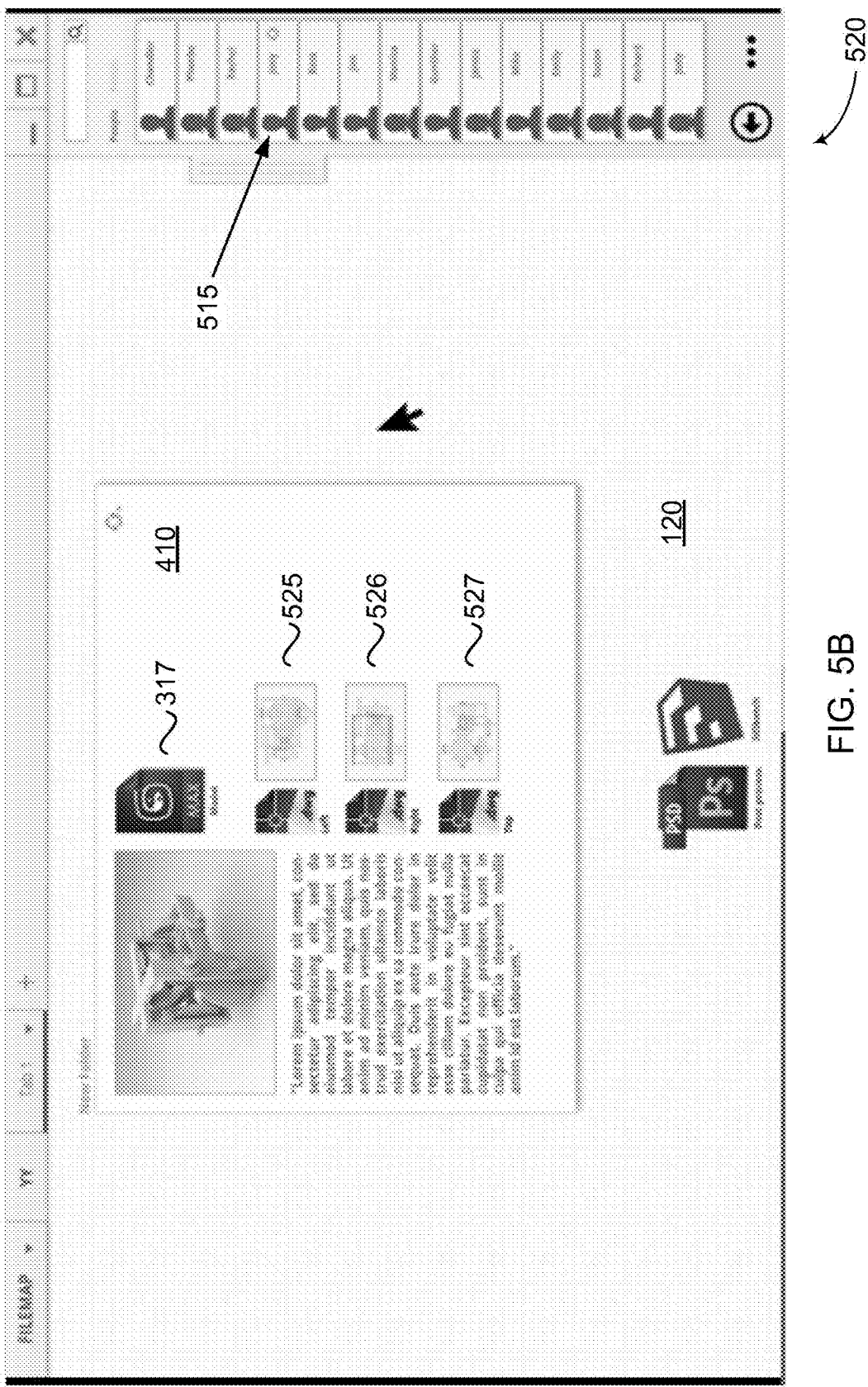
Figure 5C:
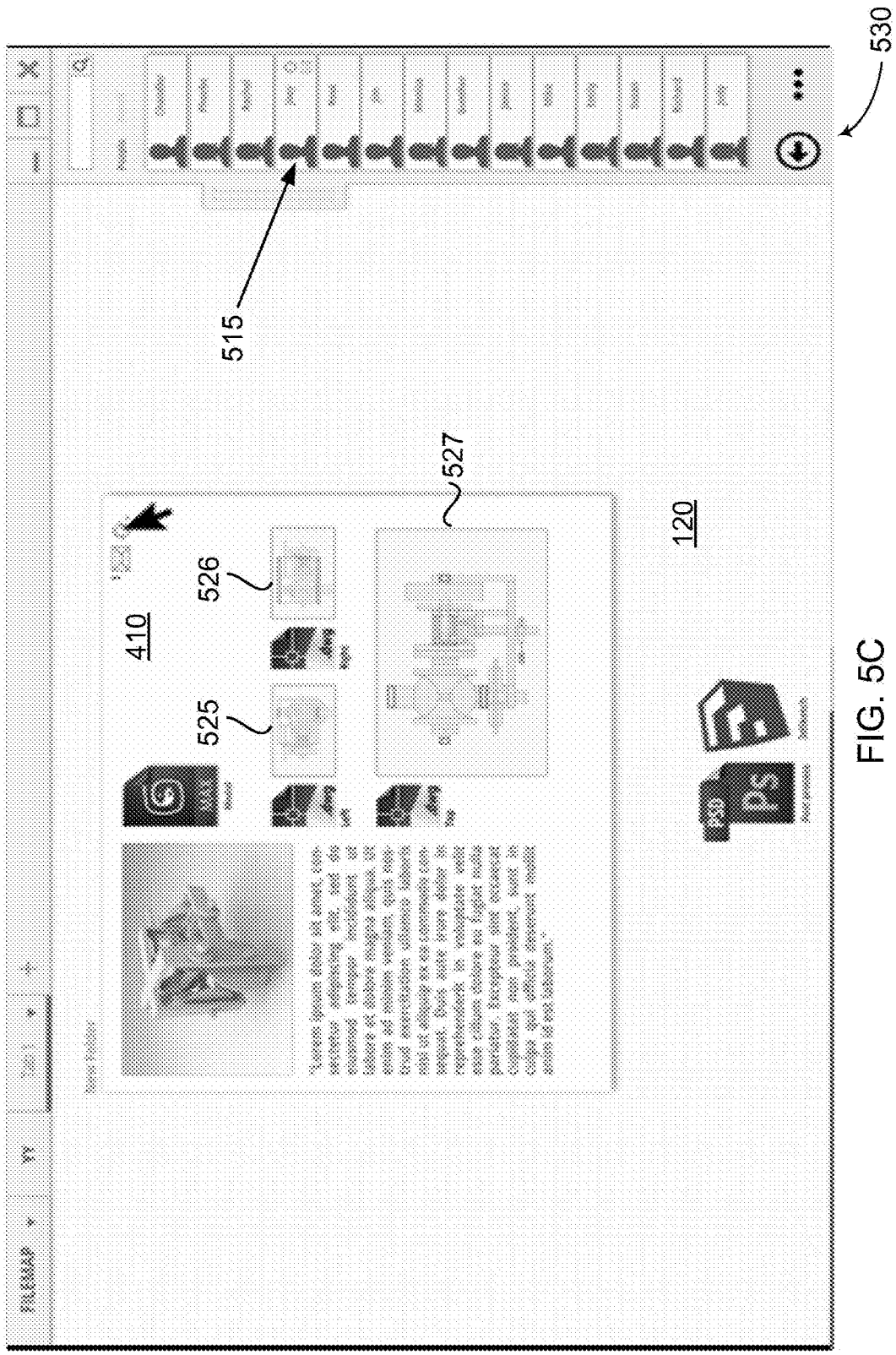

FIGS. 5A-5C are diagrams illustrating collaboration with a contact within a panel in the visual file manager. In FIG. 5A, diagram 500 shows an example in which a contact 515 is selected from a contacts list 510 and the panel 410 can now be shared with contact 515. As such, contact 515 has access to the panel 410 and can make changes within the panel 410. In an aspect, the panel 410 is concurrently accessible by contact 515 and the current user.

FIG. 5B shows a diagram 520 that illustrates the addition of icon 317 to the panel 410 by the current user, which results in the corresponding file being moved inside sub-folder 420 in FIG. 4A. Moreover, diagram 520 also shows the addition by contact 515 of three new icons 525, 526, and 527 inside panel 410, where the corresponding files to those icons are automatically added to sub-folder 420 corresponding to panel 410.

FIG. 5C shows a diagram 530 that illustrates the ability of contact 515 to further manipulate the icons in panel 410. For example, as shown in FIG. 5C, contact 515 can repositioned and/or resize icons 526 and 527 in a manner that is suitable to contact 515.

FIGS. 6A-6E are diagrams illustrating different examples of different types of projects supported by the use of panels in the visual file manager 120. For example, in FIG. 6A, a diagram 600 is shown that illustrates a project or groups of projects having multiple panels 610 like the panel 410 shown in FIG. 4A. These panels can be positioned and/or sized according to the type of project, the contents within each panel, and/or any other preference of the user.

Figure 6A:
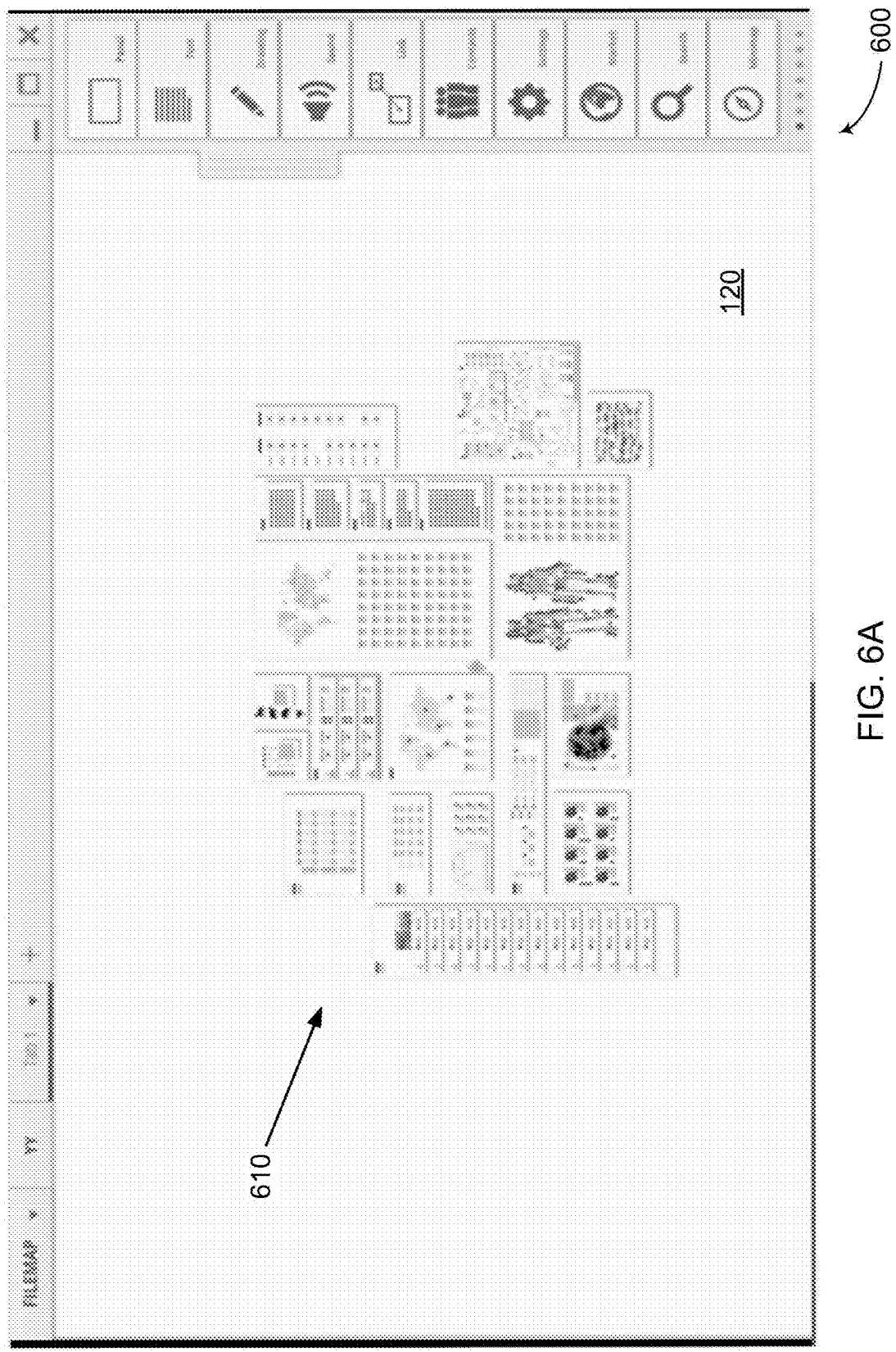
FIGS. 6A-6E are diagrams illustrating different examples of different types of projects supported by the use of panels in the visual file manager.
Figure 6B:
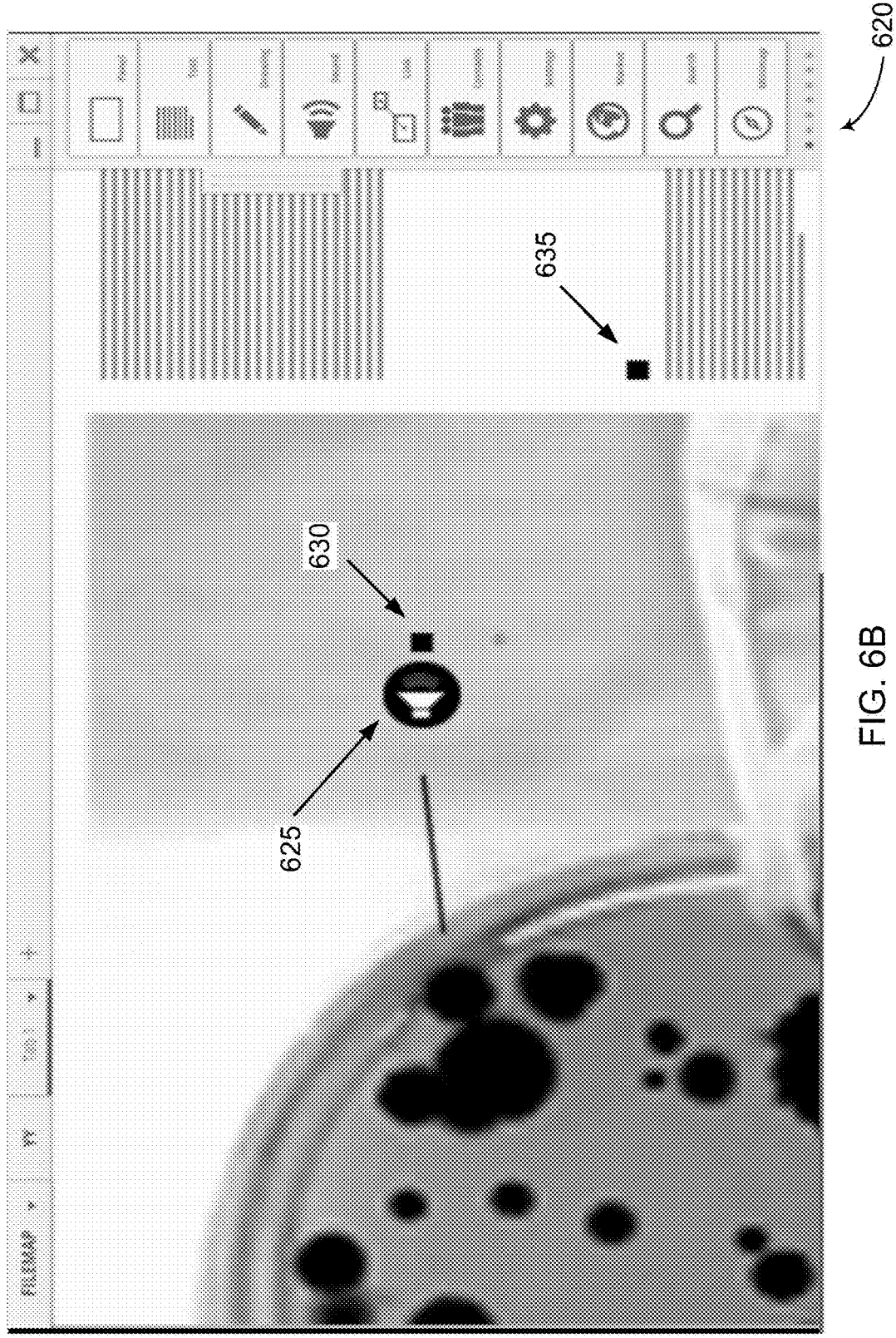

FIG. 6B shows a diagram 620 that illustrates a zoomed-in view of one of the panels 610. In this panel, a media icon 625 has been added through the visual file manager 120 to provide audio information related to the panel shown. A media icon can be added to provide different types of information, including audio, video, images, text, or some other form of information. In addition to the media icon 625, the visual file manager 120 also allows the addition of connections 630 and 635 that allow for linking and jumping from the audio information provided by the media icon 625 and related text shown next to connection 635.

Figure 6C:
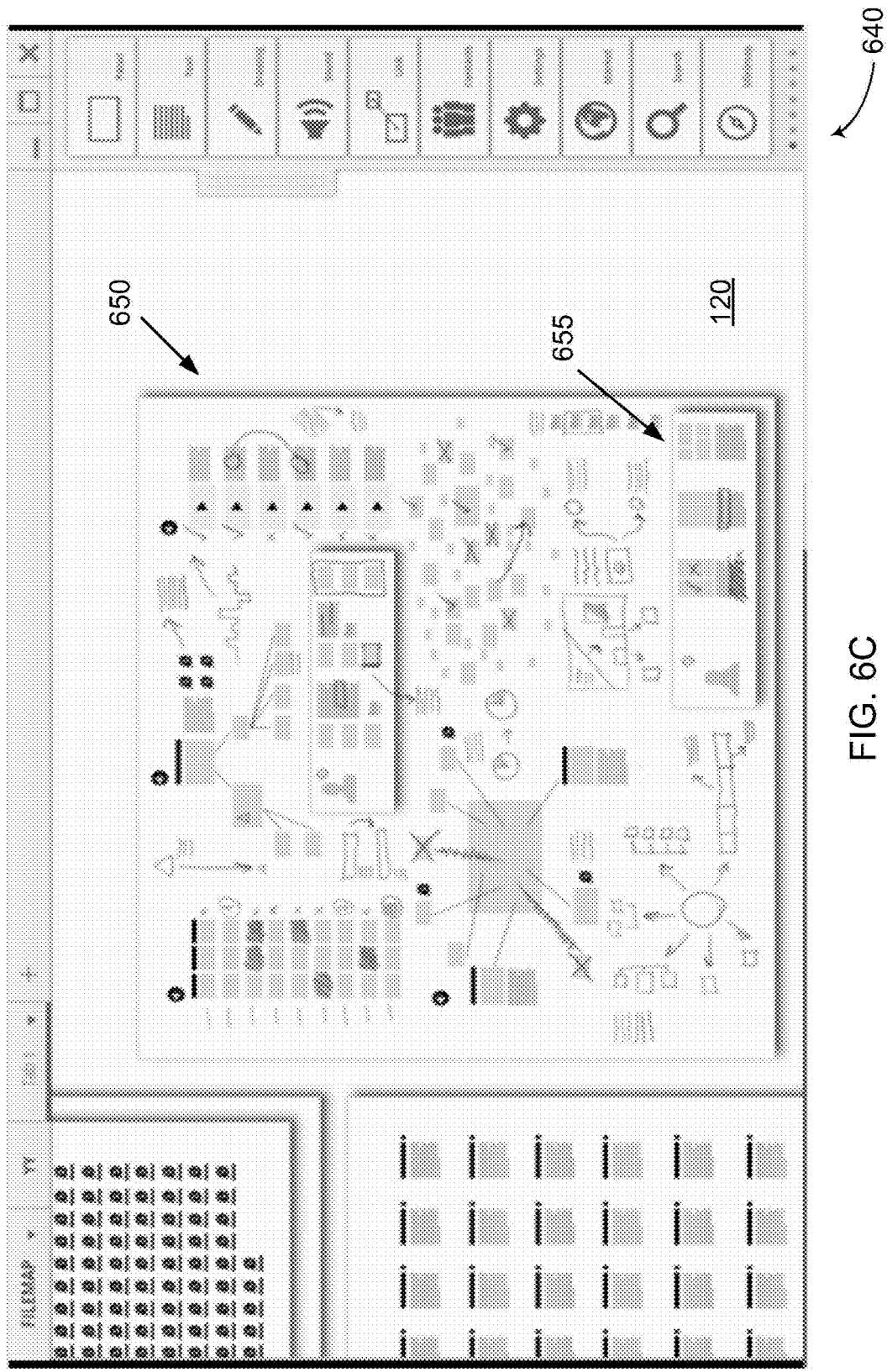

FIG. 6C shows a diagram 640 that illustrates a panel 650 of the panels 610 displayed on the visual file manager 120. In this panel, not only does the visual file manager 120 allow for the addition of multiple sub-panels (e.g., sub-panel 655), but also allows different types of annotations (e.g., lines, drawings, notes) that can be useful to the user when looking at the contents of the panel.

Figure 6D:
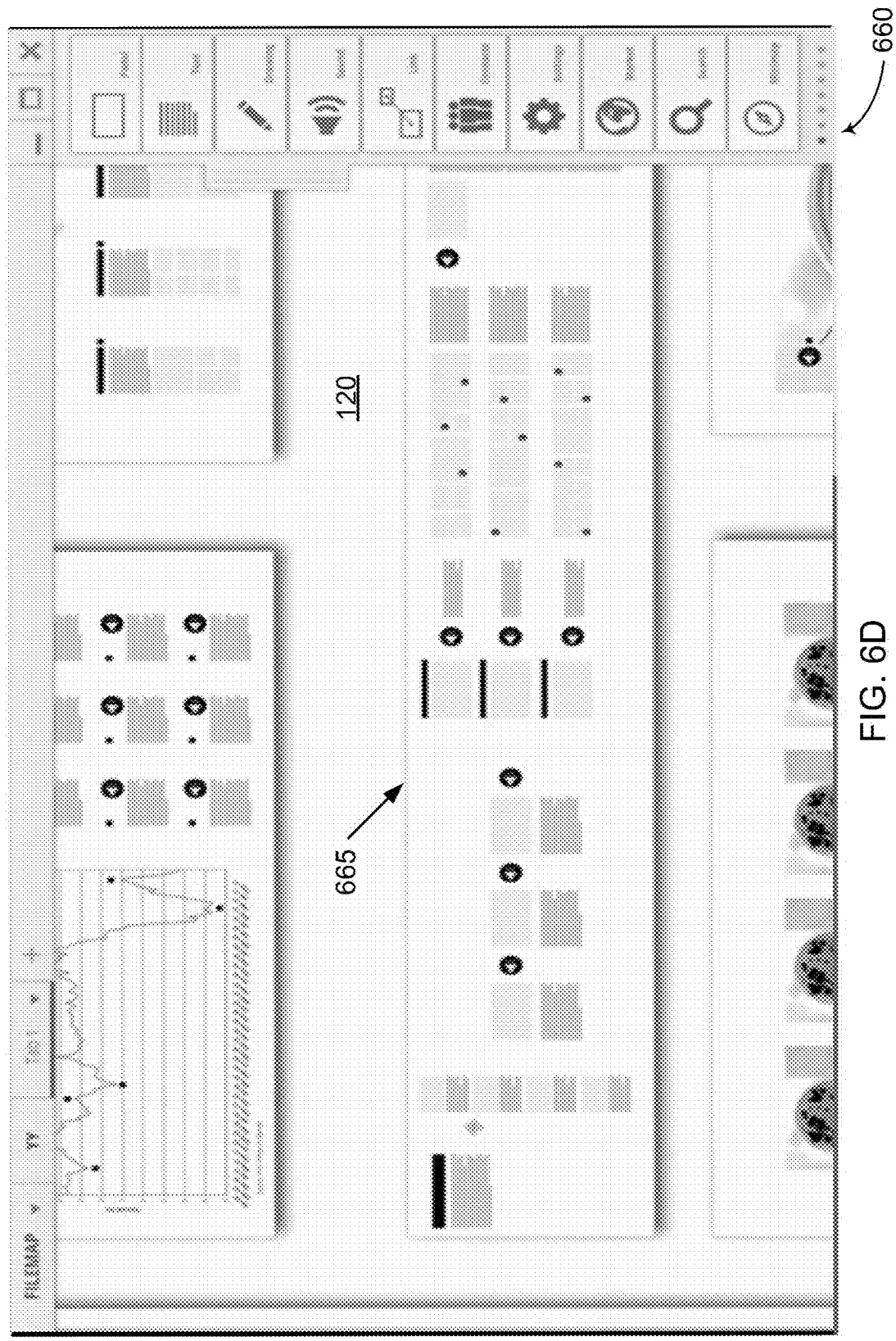

FIG. 6D shows a diagram 660 that illustrates a panel 665 of the panels 610 displayed on the visual file manager 120. In this panel, the contents of the panel (e.g., icons representing files and/or sub-panels representing folders) can be arranged in a manner that shows a progression of the work associated with the contents. In one example, the contents can be arranged or organized to represent a timeline. In another example, the contents can be arranged to show the manner in which the project or sub-project evolved. For instance, it is possible to organize the contents to illustrate parallel efforts that would enable someone to track how these evolved and perhaps why one was selected over the others.

Figure 6E:
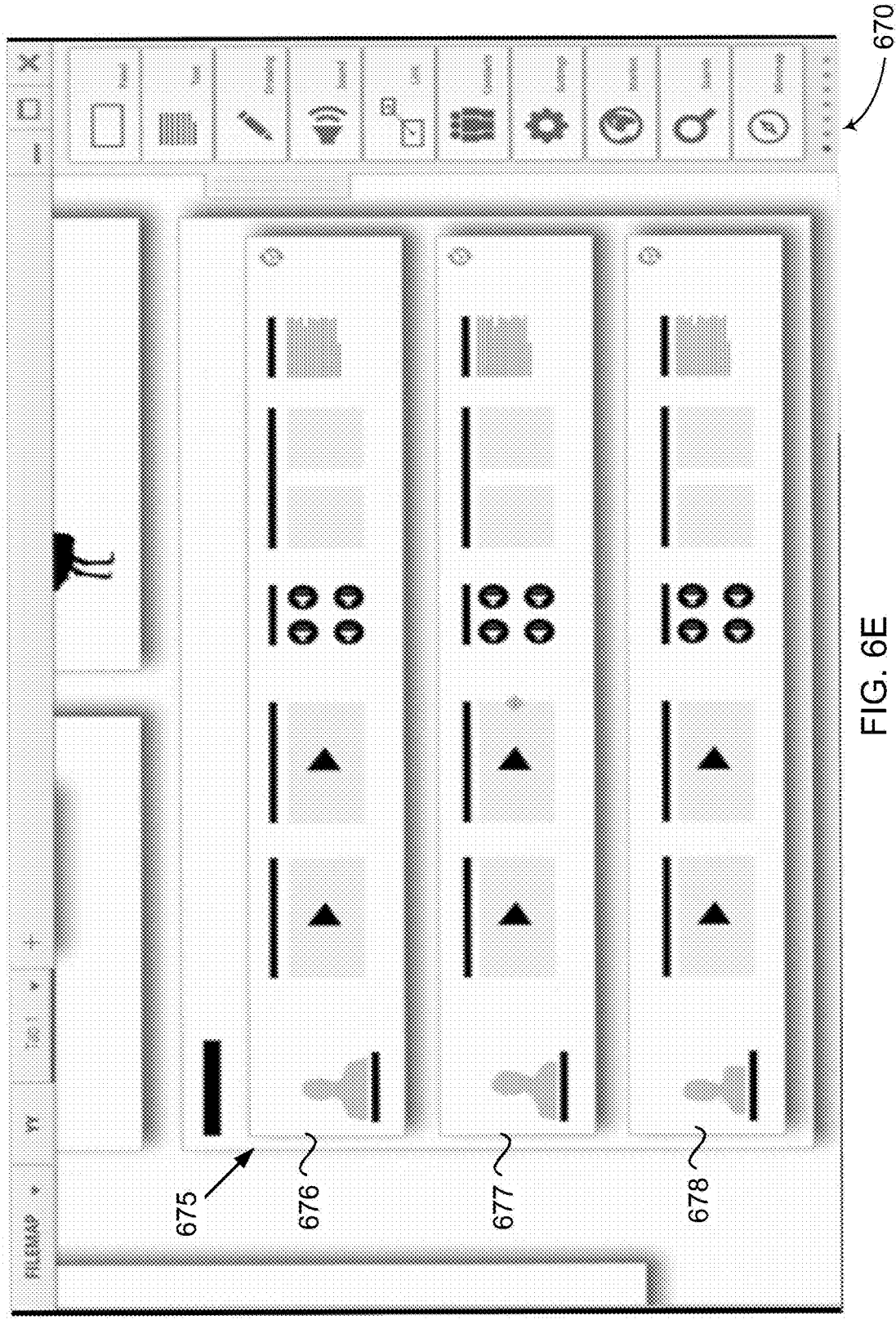

FIG. 6E shows a diagram 670 that illustrates a panel 675 of the panels 610 displayed on the visual file manager 120. In this panel, three sub-panels (e.g., sub-folders) 676, 677, and 687 can be created corresponding to the contributions or work from three different people for a respective project associated with the panel. In this example, the contents in each of the sub-panels is organized by type of icon, that is, video icons, audio icons, image icons, and text icons can be organized in a preferred arrangement.

FIGS. 6A-6E described above are intended to be illustrative and not limiting of the flexibility provided by the visual file manager 120 and of the various ways in which different projects can be implemented visually.

Figure 7A:
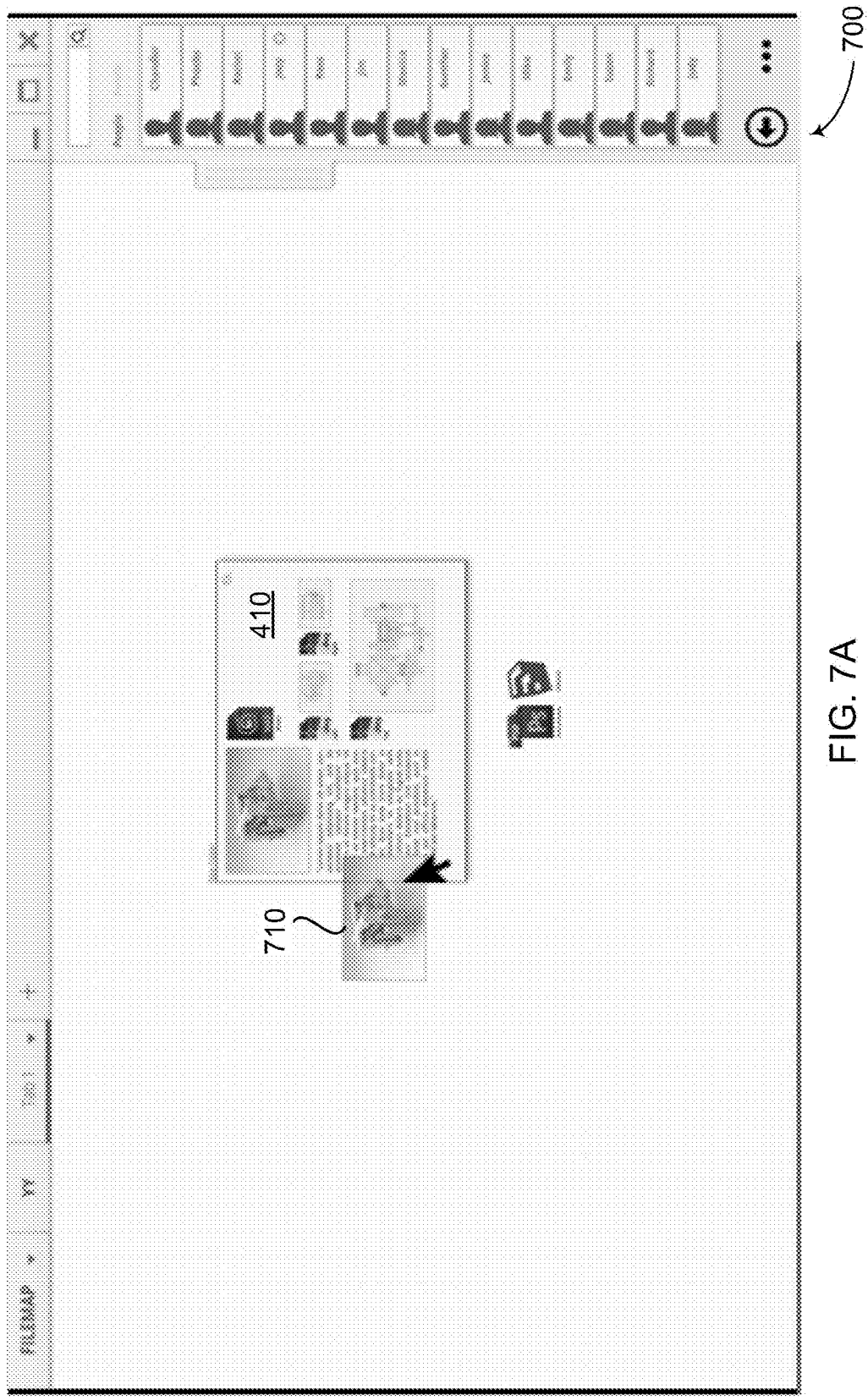
FIGS. 7A-7C are diagrams illustrating image assignment for screen size-based representation of a panel in the visual file manager.
Figure 7B:
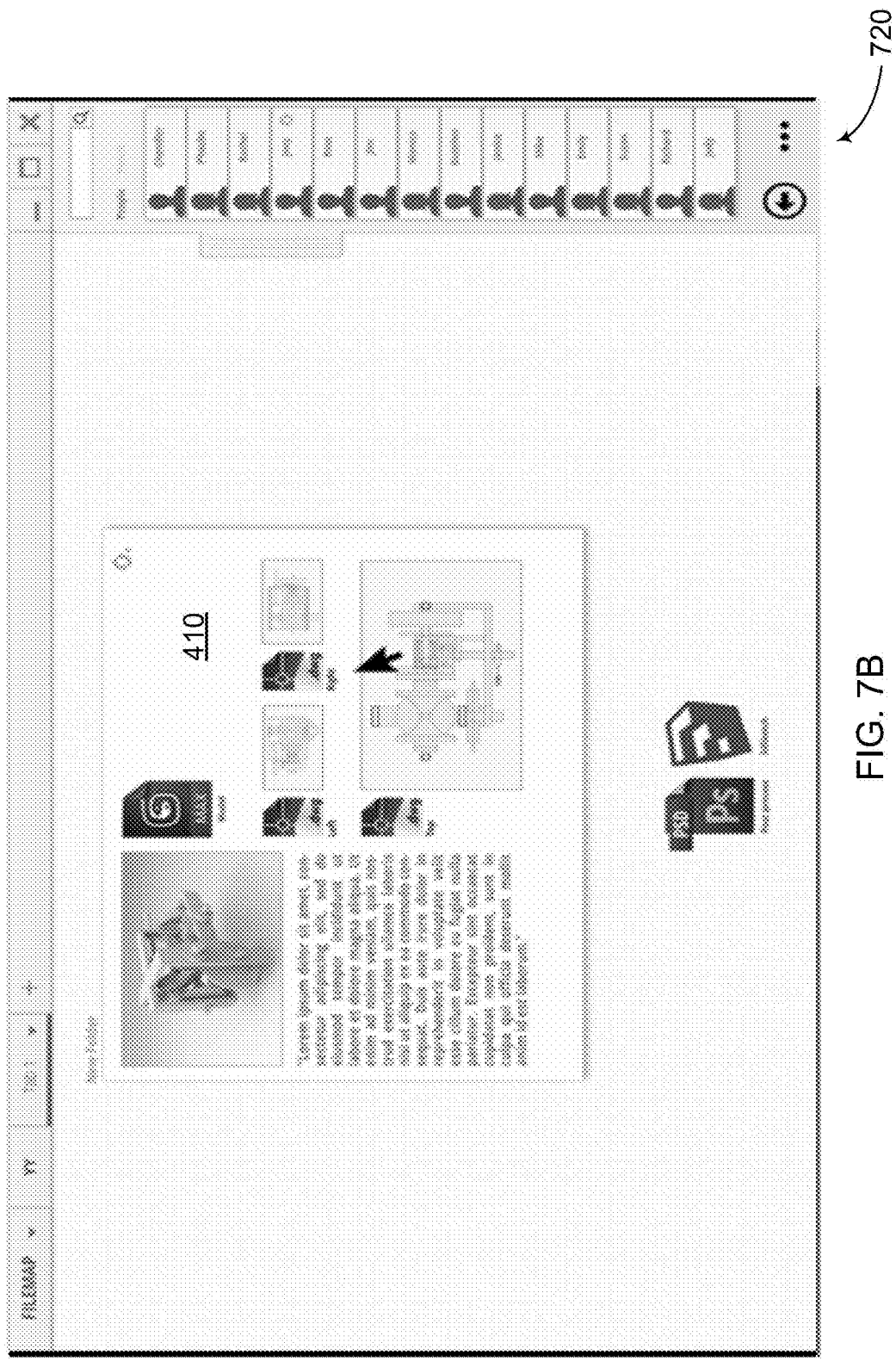
Figure 7C:
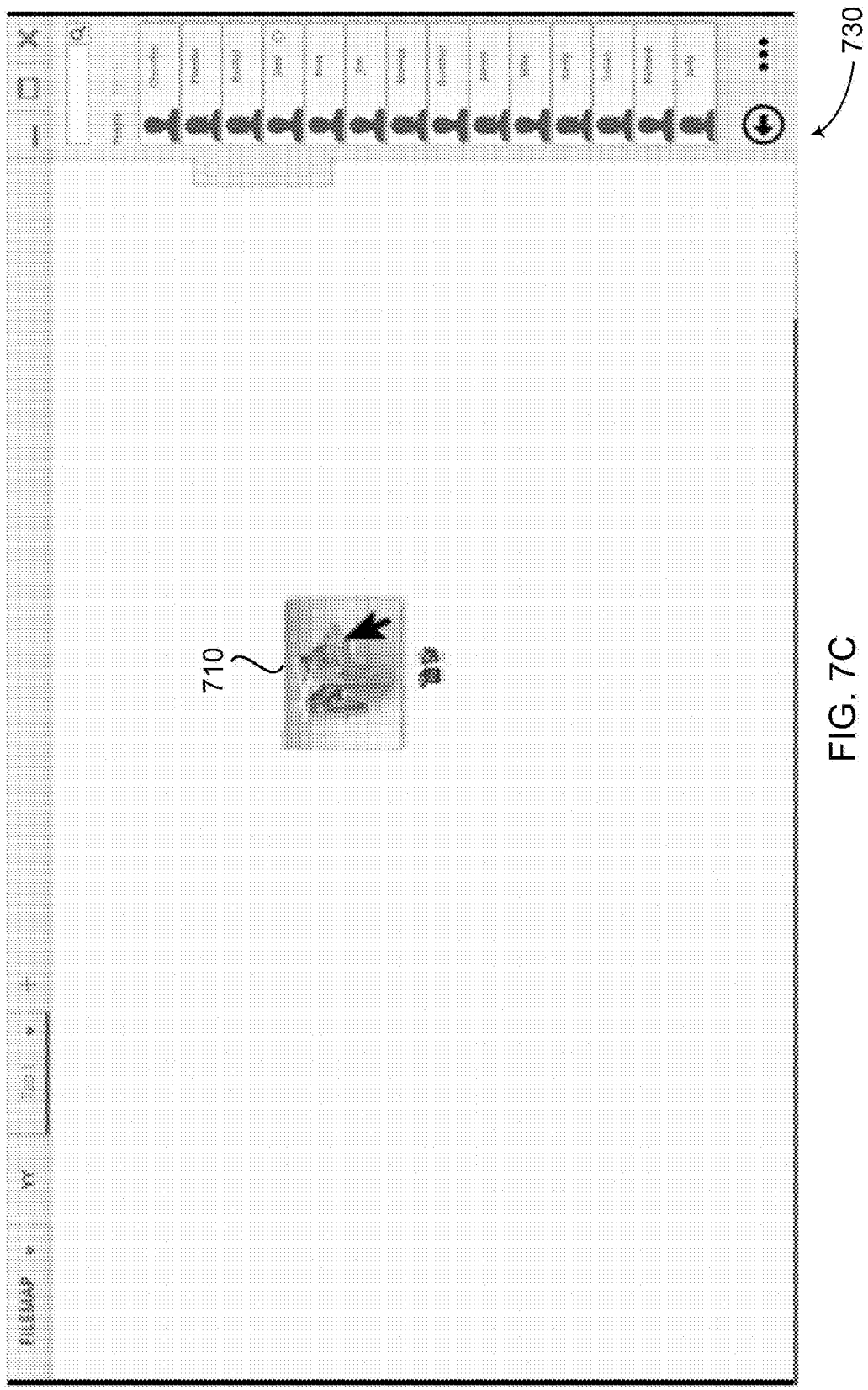

FIGS. 7A-7C are diagrams illustrating image assignment for zoom level-based representation of a panel in the visual file manager 120. In FIG. 7A, a diagram 700 is shown in which an image 710 is assigned or attached to a panel, such as the panel 410. In this example, the image 710 can be selected from one of the icons in the panel 410. In FIG. 7B, when the user zooms in (e.g., during a first zoom level), the contents of the panel 410 are shown to allow the user to work with the contents. In FIG. 7C, when the user zooms out (e.g., during a second zoom level), the panel 410 is instead visually/graphically represented by the image 710 so that the user can have context of what is inside the panel 410 when also presented with a larger share of the canvas and possibly many other panels. In this way, at a certain threshold between two zoom levels, the visual file manager 120 can change the look of the panel 410 to be convenient for the user.

Figure 8:
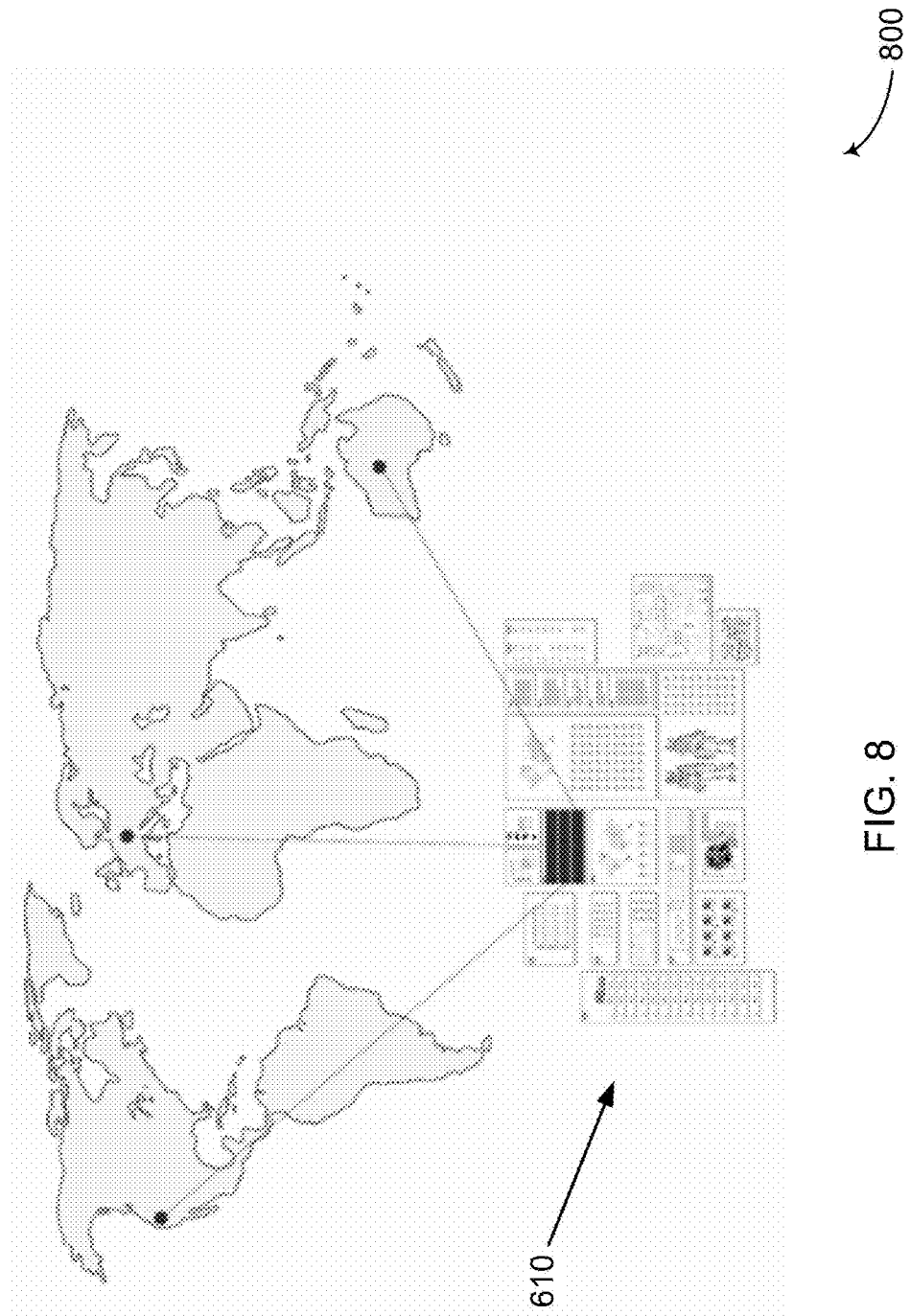
FIG. 8 is a diagram illustrating remote collaboration through the visual file manager.

FIG. 8 is a diagram 800 illustrating remote collaboration through the visual file manager 120. As shown in FIG. 8, one or more of the projects in panels 610 shown in FIG. 6A can be accessed by different users in different remote locations. In some aspects, two or more users in remote locations can access the same panel or can access different panels according to their project participation.

Figure 9A:
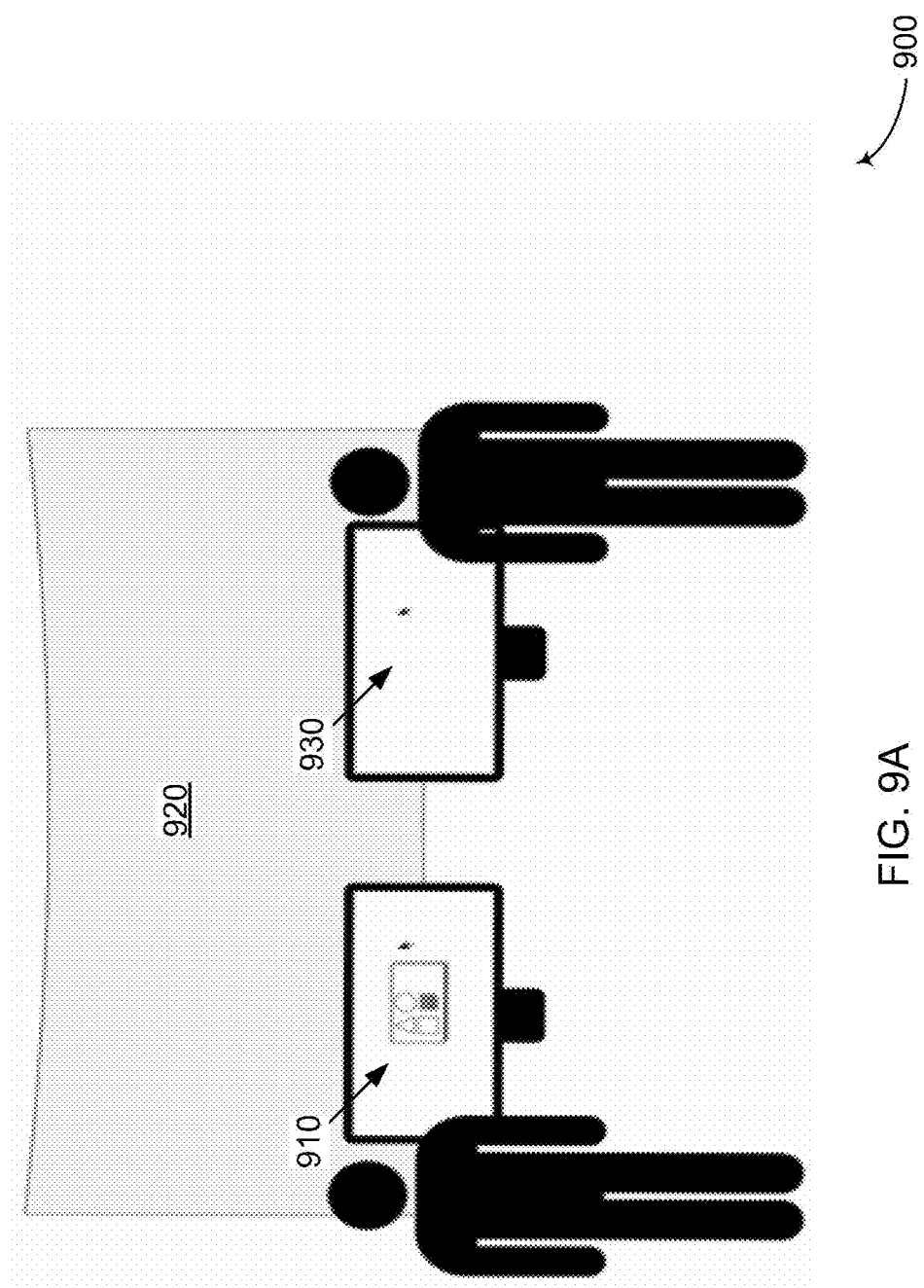
FIGS. 9A-9C are diagrams illustrating an example of collaboration by multiple users of the visual file manager.
Figure 9B:
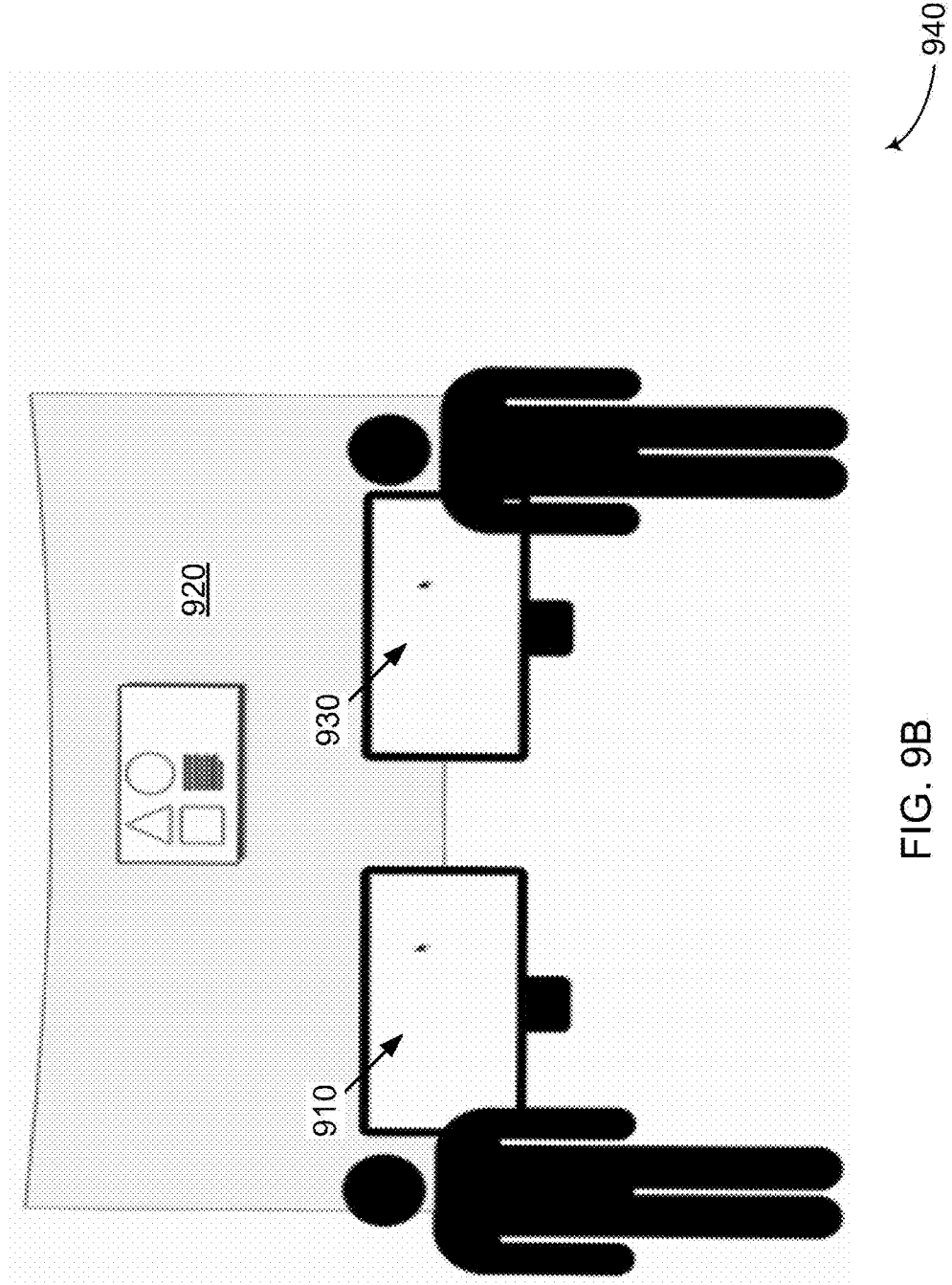
Figure 9C:
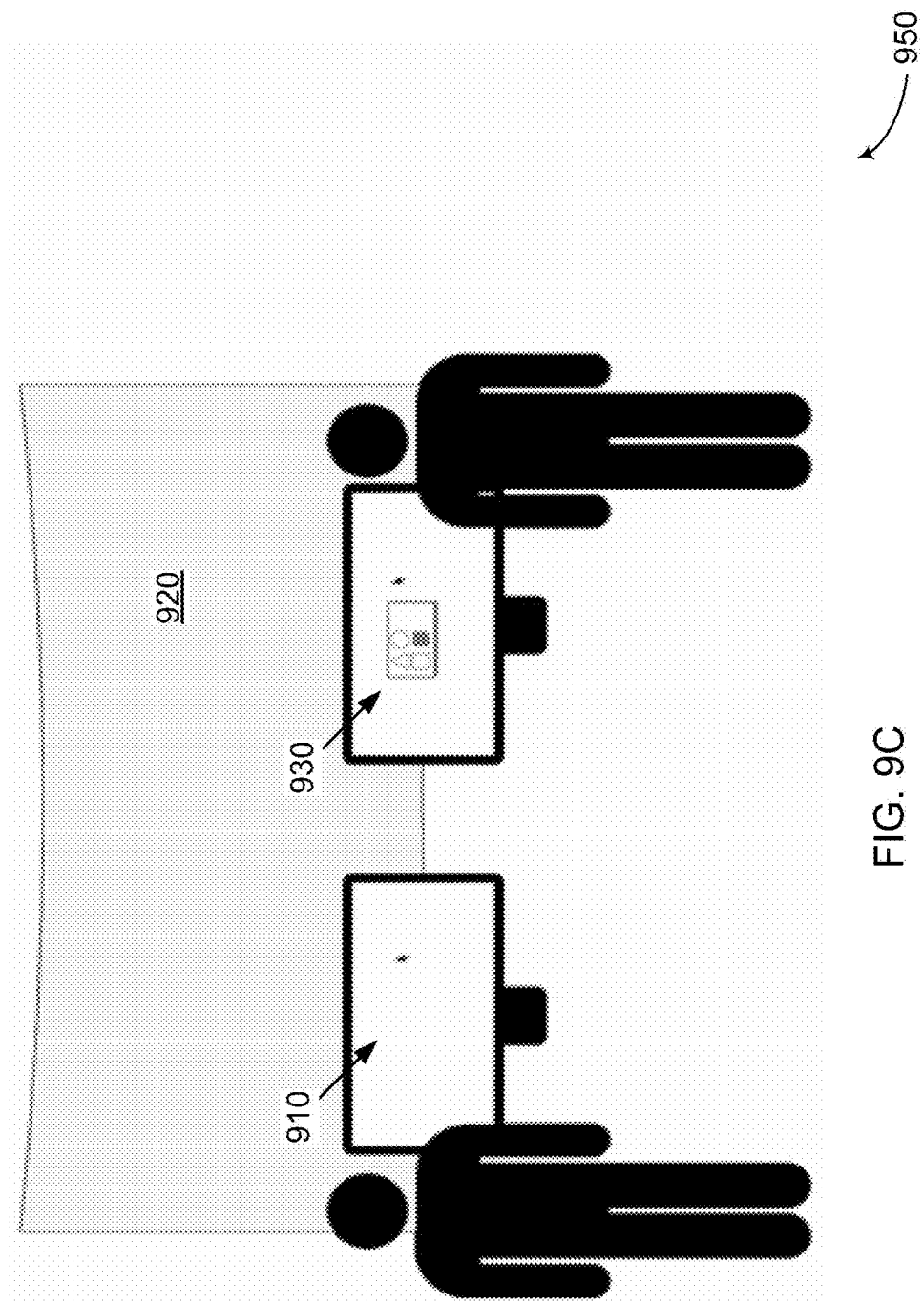

FIGS. 9A-9C are diagrams illustrating an example of collaboration by multiple users of the visual file manager 120. FIG. 9A shows a diagram 900 illustrating a collaborative setting in which two users can share information. For example, user 910 can have a panel with content (e.g., icons representing files and/or sub-panels representing sub-folders). User 930 does not have the panel. A shared medium 920, such as a presentation screen or some form of display mechanism can be used to enable the collaboration.

FIG. 9B shows a diagram 940 in which user 910 has placed the panel and its contents with the shared medium 920. The visual file manager 120 operated by user 910 can allow for the panel to be placed or shared in this manner. User 930 can now see that the panel is available by having the panel displayed on the shared medium 920.

FIG. 9C shows a diagram 940 in which user 930 obtains the panel and its contents from the shared medium 920. The visual file manager 120 operated by user 930 can allow for the panel to be obtained in this manner.

Figure 10B:
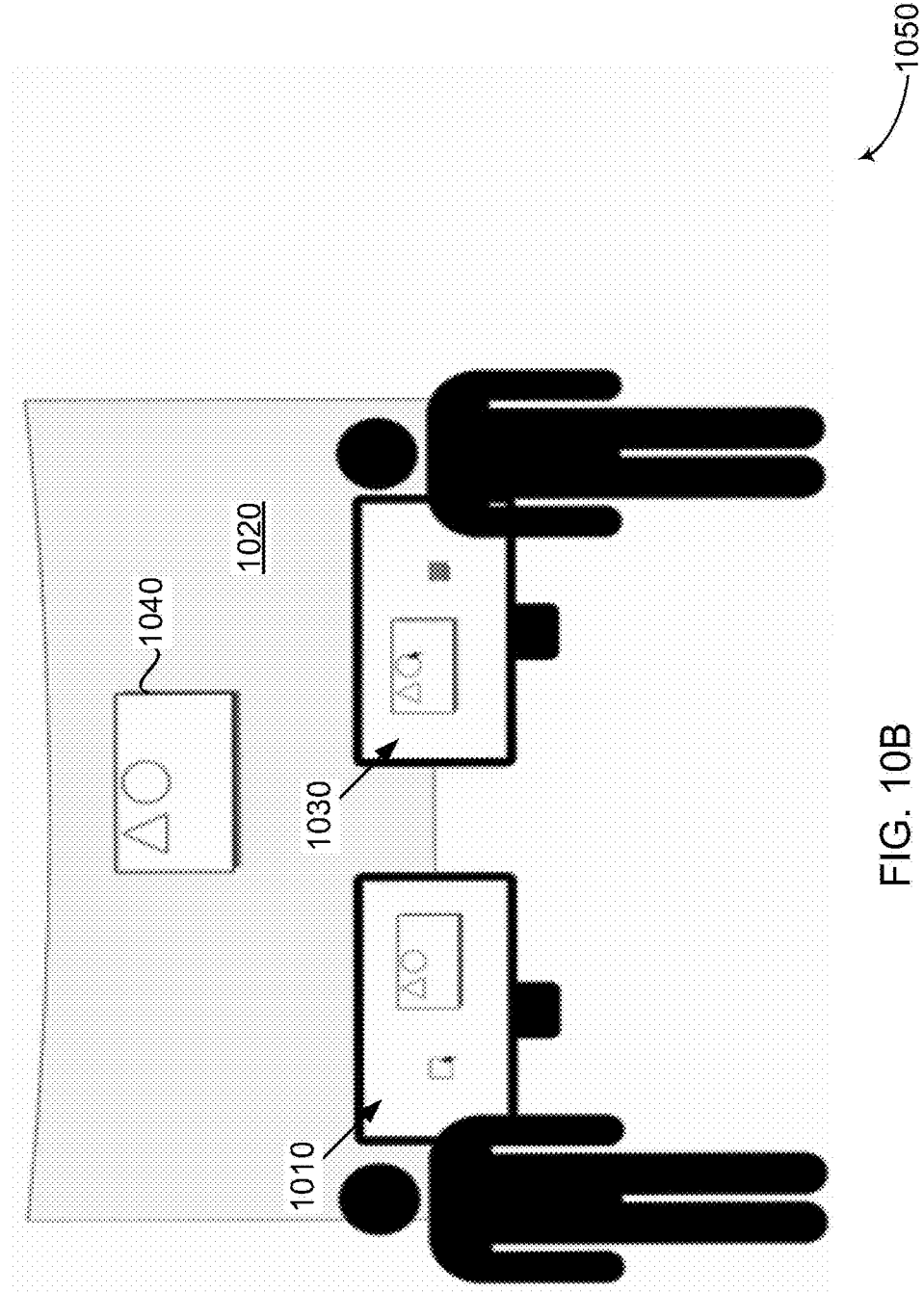

FIGS. 10A and 10B are diagrams illustrating another example of collaboration by multiple users of the visual file manager 120. FIG. 10A shows a diagram 1000 illustrating a collaborative setting in which two users can share information. For example, user 1010 can have a panel 1040 and other icons outside the panel. User 1030 also has panel 1040 and a different set of icons outside the panel. A shared medium 1020, such as a presentation screen or some form of display mechanism can be used to enable the collaboration. In this example, the panel 1040 is shown on the shared medium 1020 without any contents.

FIG. 10B shows a diagram 1050 in which each of users 1010 and 1030 can add one or more icons as contents of panel 1040. Any icon added by user 1010 is reflected in panel 1040 in the user's computer system as well as in panel 1040 in the shared medium 1020. Similarly, any icon added by user 1030 is reflected in panel 1040 in the user's computer system as well as in panel 1040 in the shared medium 1020. The example need not be limited to icons (e.g., representations of files) but may optionally or alternatively include the addition of one or more panels (including nested or recursive panels) to panel 1040 by either or both of users 1010 and 1030.

The collaborations described above in connection with FIGS. 9A-9C and FIGS. 10A and 10B can take place in a common area. It is to be understood that the visual file manager 120 is also configured to allow remote collaboration as shown in the example of FIG. 8.

Figure 11:
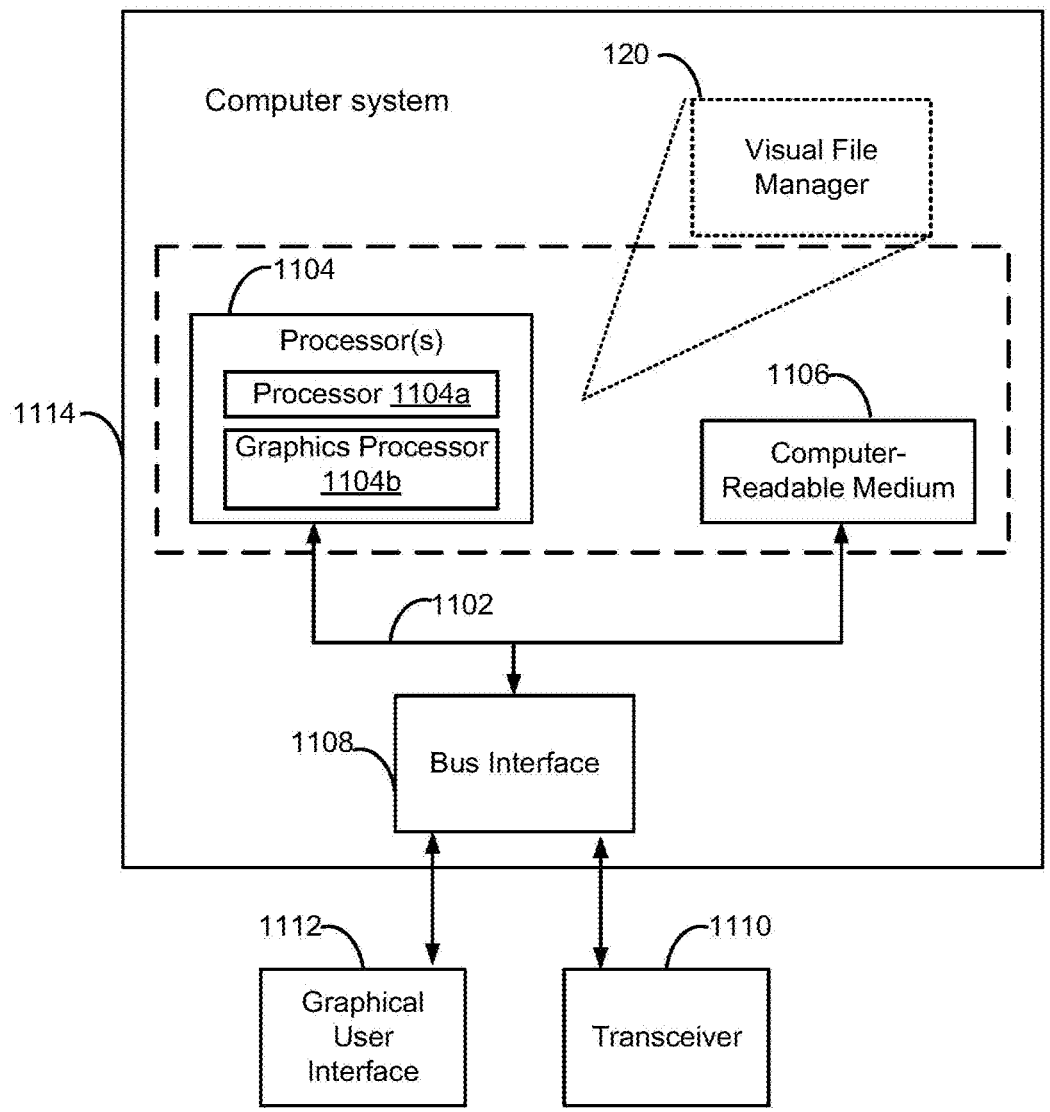
FIG. 11 is a diagram illustrating an example of a computer system that supports the operation of the visual file manager.

FIG. 11 illustrates an example of a computer system 1114 that supports operation of the visual file manager 120. The computer system 1114 can also be referred to as a processing system or an apparatus. The computer system 114 is configured to perform the various functions or actions described herein in connection with the visual file manager 1020 (e.g., FileMap) or similar visual file managers. In this example, computer system 1114 may be implemented with a bus architecture, represented generally by the bus 1102. The bus 1102 may include any number of interconnecting buses and bridges depending on the specific application of computer system 1114 and the overall design constraints. The bus 1102 links together various circuits including one or more processors, represented generally by the processor(s) 1104 (including at least a processor or CPU 1104a and a graphics processor or GPU 1104b), and computer-readable media or memory storage (or simply a memory), represented generally by the computer-readable medium 1106. A bus interface 1108 provides an interface between the bus 1102 a transceiver 1110 and a graphical user interface 1112 on which the visual file manager 120 is displayed. In one example, the graphical user interface 1112 may correspond to the desktop of a computer. The graphical user interface 1112 may include a display. The transceiver 1110 provides a means for communicating with various other apparatus over a transmission medium (e.g., for collaboration as shown in FIGS. 8-10B). Depending upon the nature of the computer system 1114, the bus interface 1108 may also be an interface to one or more of a keypad, a display, a speaker, a microphone, or a joystick, for example.

The processor(s) 1104 is responsible for managing the bus 1102 and general processing, including the execution of software stored on the computer-readable medium 1106. The software, when executed by the processor(s) 1104 (see e.g., FIGS. 12A and 12B), causes the computer system 1114 to perform the various functions described above with respect to the visual file mapper 120 (e.g., FileMap) or any similar visual file managers. The computer-readable medium 1106 may also be used for storing data that is manipulated or executed by the processor(s) 1104 when executing software. The visual file manager 120 (e.g., FileMap) may therefore be implemented by the processor(s) 1104 and/or the computer-readable medium 1106.

Additional details regarding the implementation and/or operation of software aspects of the visual file manager 120 are provided next. The visual file manager 120 may rely on the GPU (e.g., graphics processor 1104b) that exists in the computer system 1114. As almost all modern systems from smart phones to tablets and computers comes equipped with very capable GPUs, this is perhaps a preferred approach to render heavy and interactive graphics.

The visual file manager 120 may also take advantage of the computer system's own storage capabilities to prepare and store "preview" images for file system items beforehand. The term "item" may refer to the different icons, images, panels, annotations, or the like to be rendered or drawn as part of the displaying that occurs with the visual file system 120. These "preview" can contains raster images for different possible zoom levels for different "rectangles" within virtual space. In some aspects, the preview items are not limited to images and can also be simplified 2D models, video files, spreadsheet files for creating sequence animations, etc. The visual file manager 120 can use those images, either completely or partially (which requires slightly more CPU power during rendering) to help the GPU render a portion of visible virtual space. The GPU along with operating system and readily provided universal platform tools (e.g., UWP) controls the rendering and scrolling processes. General logic of the application provides portions of virtual space as raster images whenever it is required by display subsystem in rectangles. Those rectangles are calculated and produced from existing previews (by finding the best match using current zoom level, grid level, size and position of the rectangle) and any interactive and/or vectoral annotations are calculated and drawn as a second layer as well.

Figure 12A:
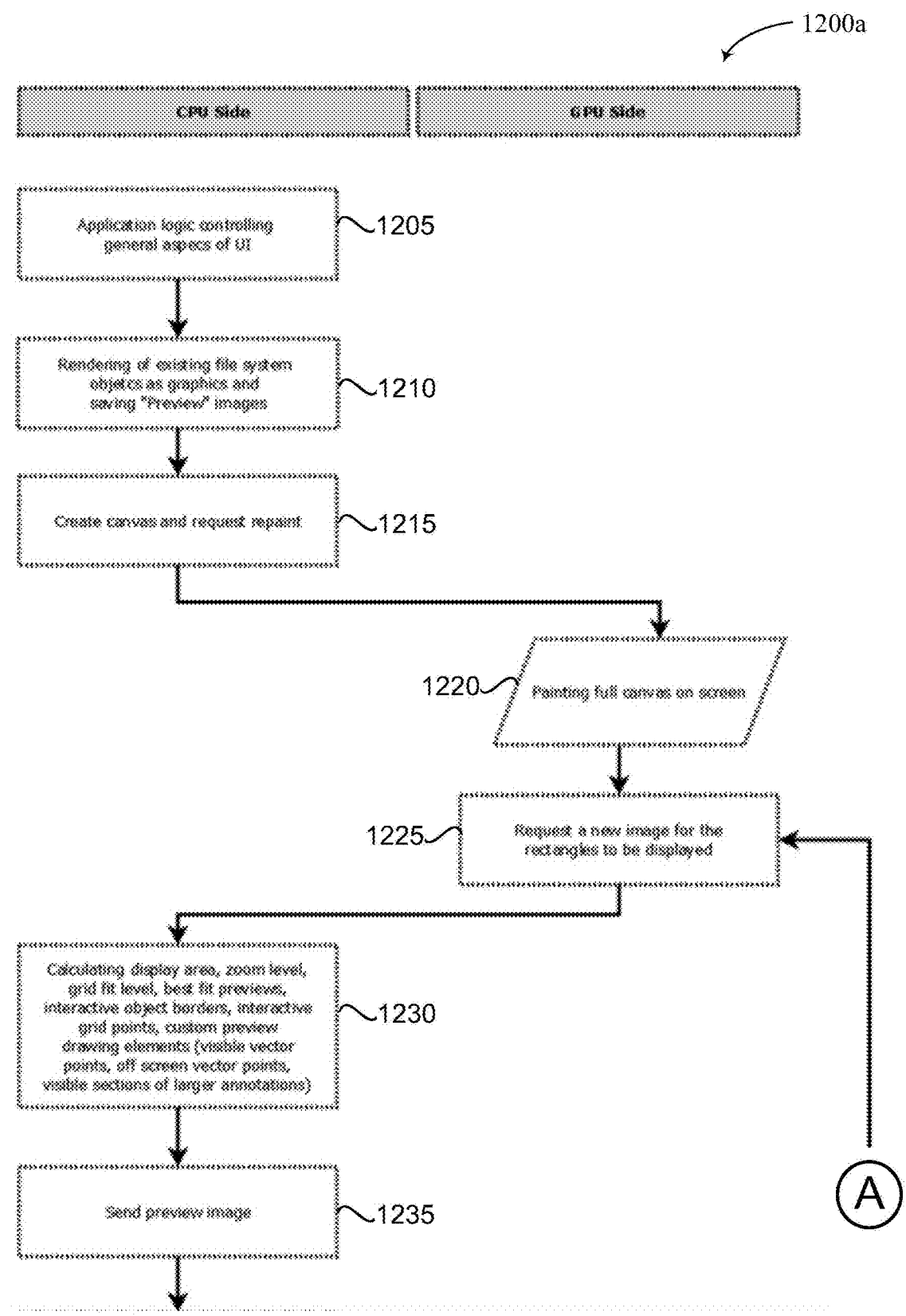
FIGS. 12A and 12B are flow charts illustrating an example of processor operation in connection with visual file manager.
Figure 12B:
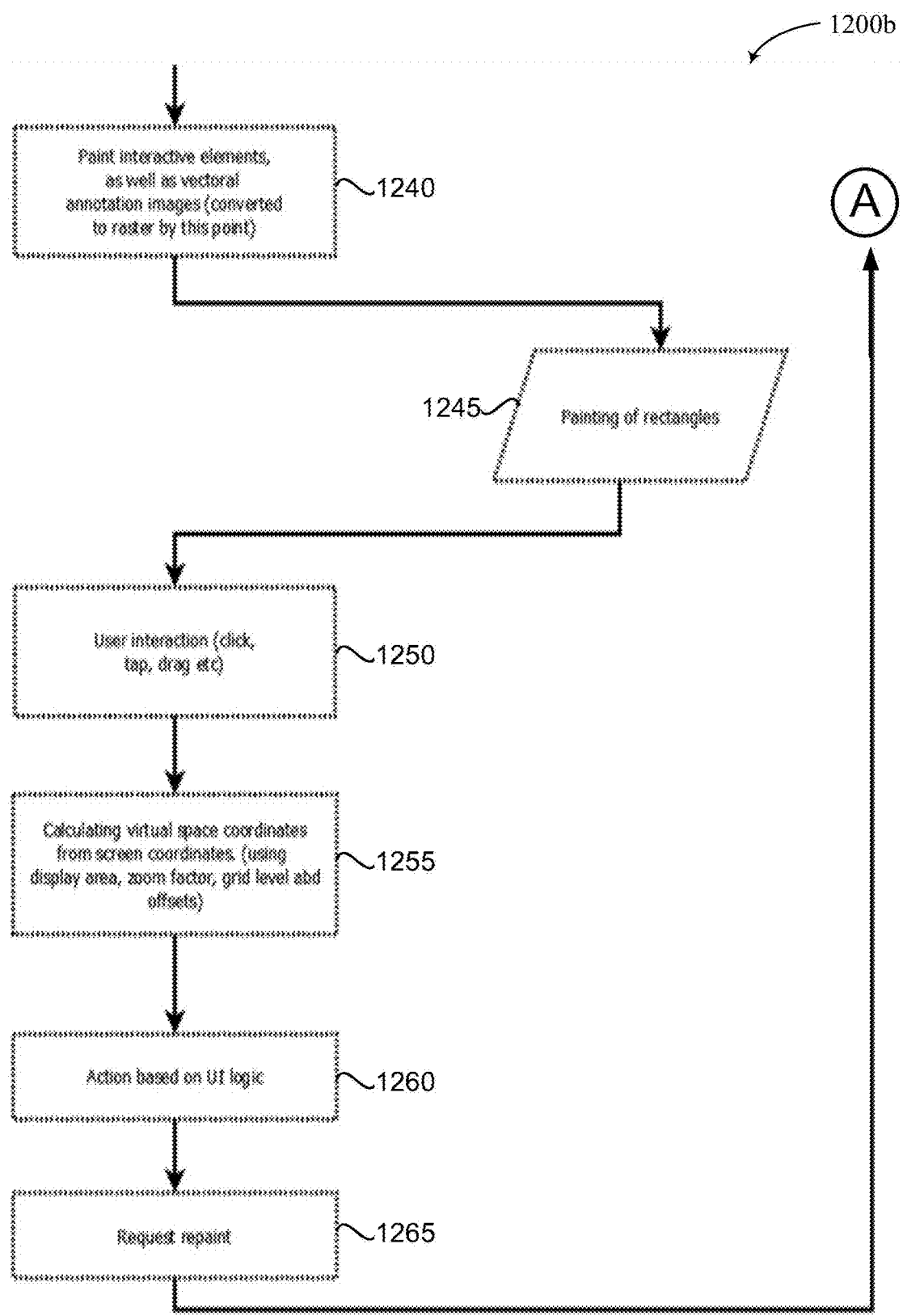

FIGS. 12A and 12B are flow charts illustrating an example of processor operation (e.g., processor(s) 1104 in FIG. 11) in connection with visual file manager 120. FIG. 12A shows a diagram 1200a that illustrates various operations or block are provides an example of which processing engine (e.g., processor or CPU, graphics processor or GPU) is likely to perform the corresponding operation. For example, operations or blocks 1205, 1210, 1215, 1230, and 1235 are likely to be performed by the processor or CPU (e.g., processor 1104a), while operations or blocks 1220 and 1225 are likely to be performed by the graphics processor or GPU (e.g., graphics processor 1104b).

At block 1205, application logic is applied controlling general aspects of the user interface (UI) associated with the visual file manager 120.

At block 1210, rendering of existing file system items as graphics and saving "preview" images is performed.

At block 1215, canvas is created and repaint is requested.

At block 1220, the full canvas is painted on screen.

At block 1225, a new image for the rectangle to be displayed is requested.

At block 1230, the following are calculated: display area, zoom level, grid fit level, best fit previews, interactive item borders, interactive grid points, custom preview drawing elements (visible vector points, off screen vector points, visible sections of larger annotations).

At block 1235, the preview image is sent.

FIG. 12B shows a diagram 1200b that is a continuation of diagram 1200a in FIG. 12A. At block 1240, interactive elements are painted, as well as vectoral annotation images (converted to raster by this point).

At block 1245, likely performed by the GPU, rectangles are painted.

At block 1250, user interactions may take place (e.g., click, tap, drag, etc.).

At block 1255, virtual space coordinates can be calculated from screen coordinates (using display area, zoom factor, grid level and offsets).

At block 1260, actions based on UI logic may take place.

At block 1265, repaint may be requested.

Following block 1265, the process described in FIGS. 12A and 12B may return to block 1255.

Figure 13:
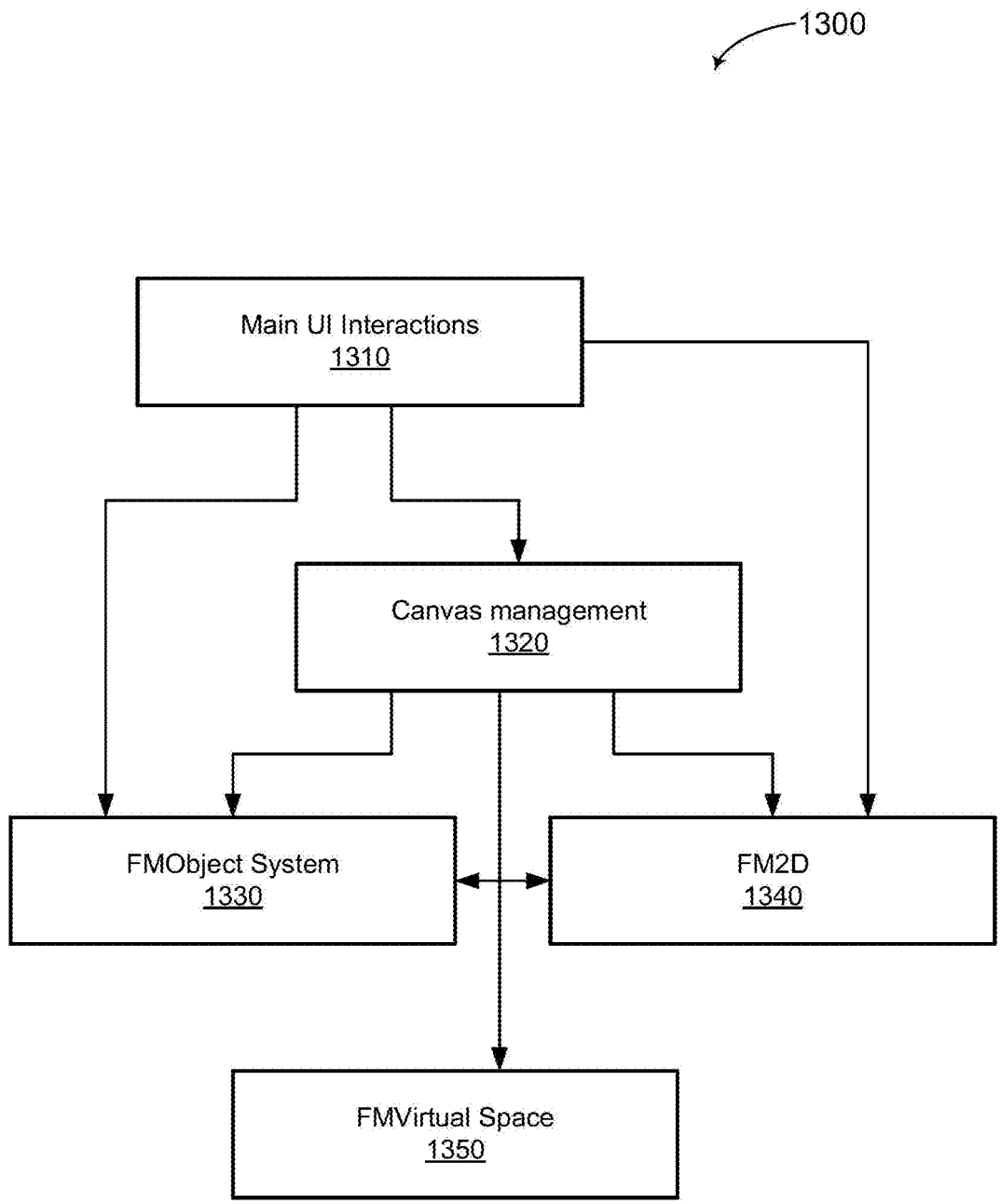
FIG. 13 is a diagram illustrating a block partitioning of the modules of the visual file manager.

FIG. 13 is a diagram 1300 illustrating a block partitioning of the software modules of the visual file manager 120. The main module of the application is the FMItemSystem 1330. This module is composed of several libraries and responsible for managing interactive, interconnected and persistent items that stores virtual space representations for file system elements. This module, working closely with modules FM2D 1340 and FMVirtualSpace 1350, also helps to provide support for drawing and interactivity for virtual items on physical display. The FMItemSystem 1330 also provides a caching mechanism to provide efficient use of memory and fast retrieval times. This caching mechanism helps to reduce the number of database operations on persistence level.

The module FMVirtualSpace 1350 provides a limitless space that can be traveled across in two dimensions (2D) using a viewport of varying size and zoom level. This is one of the features behind the visual file manager 120 that allows fast and uninterrupted scrolling and zooming functionality on a very large space. It works very closely with the module FM2D 1340 to provide actual drawing of viewports.

The module FM2D 1340 provides fast access to GPU functionality. It allows fast drawing of raster images as well as scroll and zoom functionality on a virtual 2D canvas. It works closely with the module FMVirtualSpace 1350 to provide virtual-to-real coordinate conversions as well as working closely with the module FMItemSystem 1330 to retrieve raster images to be draws. It also has an application specific caching mechanism for raster images that helps save of CPU time when calculating rectangle to be displayed.

Other modules that are part of the architecture of the visual file manager 120 include the main user interface (UI) interactions 1310 and the canvas management 1320. These two modules interact with one or more of the modules described above as shown in FIG. 13.

The use of modules FMItemSystem 1330 along with FMVirtualSpace 1350 and FM2D 1340 allows the visual file manager 120 (e.g., FileMap) to create and display a virtual space of practically limitless size. This virtual space contains interactive elements that user can interact and control. The way the visual file manager 120 does this is also different. The visual file manager 120 first creates preview images for this virtual space elements (folders, files, etc.) for different zoom levels (a particular zoom level may refer to a zoom ratio or the like). This way, more than one preview is generated per element and is stored in memory, which while requiring more storage space also allows very fast computation of raster images later, which is one of the features that makes the visual file manager 120 very useful. Also, space loss is quite ignorable considering todays modern computing devices come with considerable amount of store. Moreover, because preview store is depended on file system items, there can generally be a direct correlation between the total size of the storage capacity and preview store size. Thus, the more storage size a device has, the more preview store will consume. The opposite also applies (e.g., less storage means smaller preview store size) and therefore the size consideration for preview store can be negligible when the storage size is smaller.

The visual file manager 120, when using modules FM2D 1340, FMItemSystem 1330, and FMVirtualSpace 1350 together, draws the virtual space on a hardware screen or display using a novel method of special hardware-to-virtual space coordinates, finding the best matching preview images from cache or retrieving it from preview store, cutting it to size, drawing it to a GPU canvas buffer, calculating any vectoral items to be displayed, converting them to raster and adding those to canvas, and passing that canvas to operating system (OS)/hardware to be drawn and managed.

This allows a very fast and continuous drawing of a very large virtual space in multiple layers, using varying viewports (size and zoom levels). But it also supports a dynamic grid that is displayed across different zoom levels but always consistent.

The system is supported by a background threading system that continuously synchronizes file system items and items in the visual file manager 120 (FMItems) as well as continuously grooms preview store. The threading system supports prioritized queues so that any operation that need to be done quickly can be marked for immediate processing (such as creation of previews for a folder that is being manipulated by the user so that any other instance of the application will display the updated view).

The visual file manager 120 uses FMItemSystem 1330 to keep track of file system elements. Within the FMItemSystem 1330 there are special types for managing file system elements. Folders, files, access control lists (ACLs), security bits, security contexts etc. Each of those types are used to keep track of some aspects of a file system item. Not all items carry around all these types as not all file systems are equal. For example, the Android operating system may not have ACLs. However, a main base class, FMItemBase, can be used to provide easy checks for inquiring an item about what types of information the item carries.

Each FMItem can be interactive and can have multiple connections to provide interconnectivity between items. An FMItem can have its children and its shadows (hard/soft links, junctions/symbolic links) and depending on these, each FMItem can have a parent as well as shadow parent. This can be required to reflect any file system change onto virtual space since any change in a file should be reflected not only to the file, but also to the folder(s) containing that file. This also means, links/functions may also need to be considered.

The approach used by the visual file manager 120 to store these file system items (e.g., FMItemBase derived class instances) in memory is self-included within the module FMItemSystem 1330. This cache system differs from a regular access time tracked caching mechanisms in that the caching mechanism tracks not only access times but it is also coordinate aware. Several methods in FMItemSystem 1330 allows this cache to be purged/renewed based on coordinates. This allows FMVirtualSpace 1350 (in conjunction with FM2D 1340) to control what is to be cached. This way any file FMItem that is invisible as currently displayed is not cached. The visual file manager 120 can take into consideration scrolling buffers as well. This way the area around the immediate display view port is also cached so that any scroll operation can be a moving viewport to an already calculated/cached place.

Moreover, there can be background threads that continuously run and execute various tasks within the FMItemSystem 1330. These are responsible with executing task queues, which includes grooming and synchronization tasks. Those tasks help the visual file manager 120 with synchronizing real file system with FMItems. Any change made to the file system is also monitored so while the visual file system 120 is running any changes are captured and queued for processing with high priority.

Figure 14A:
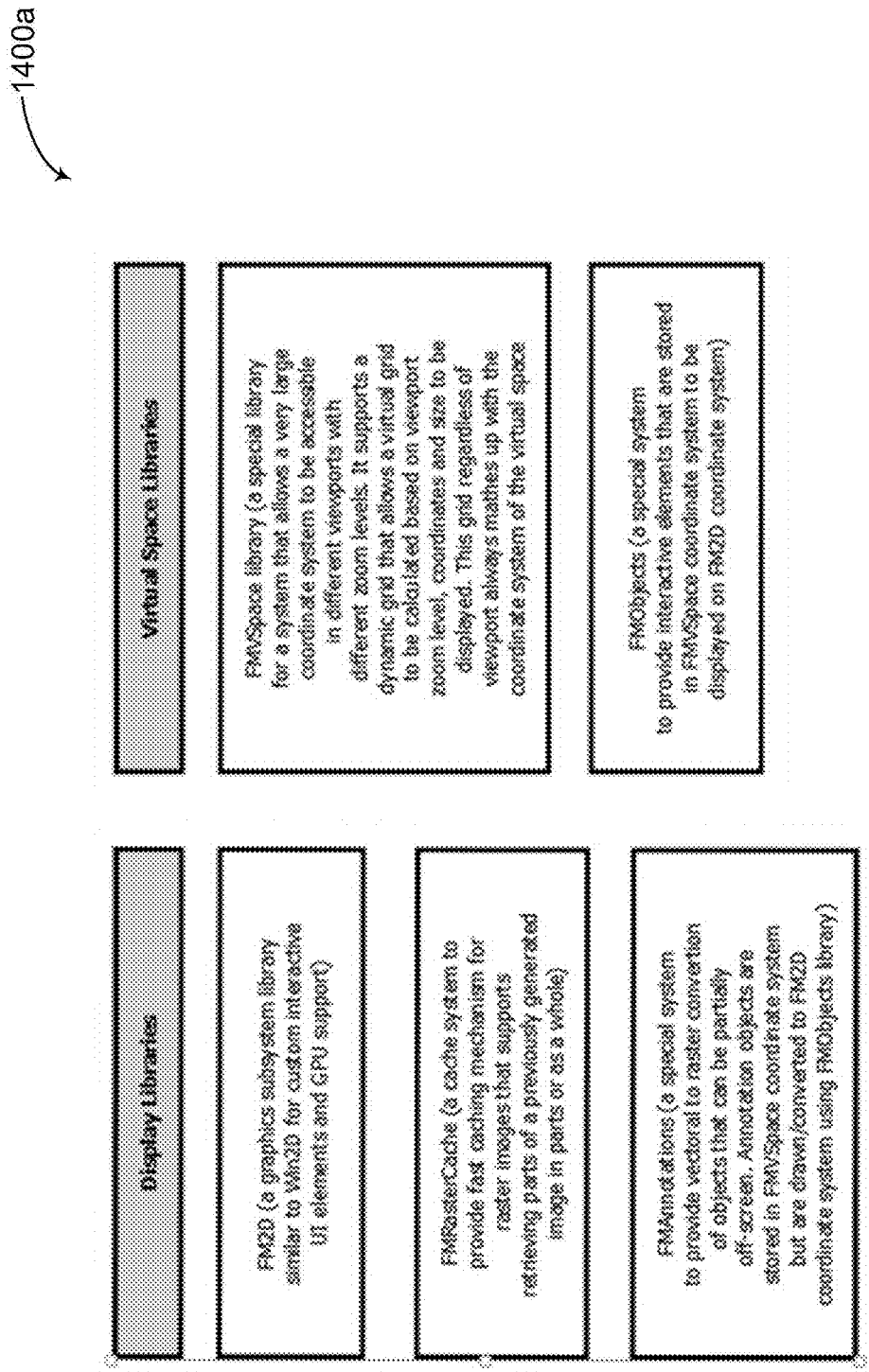
FIGS. 14A and 14B are diagrams illustrating examples of libraries used in connection with the visual file manager.
Figure 14B:
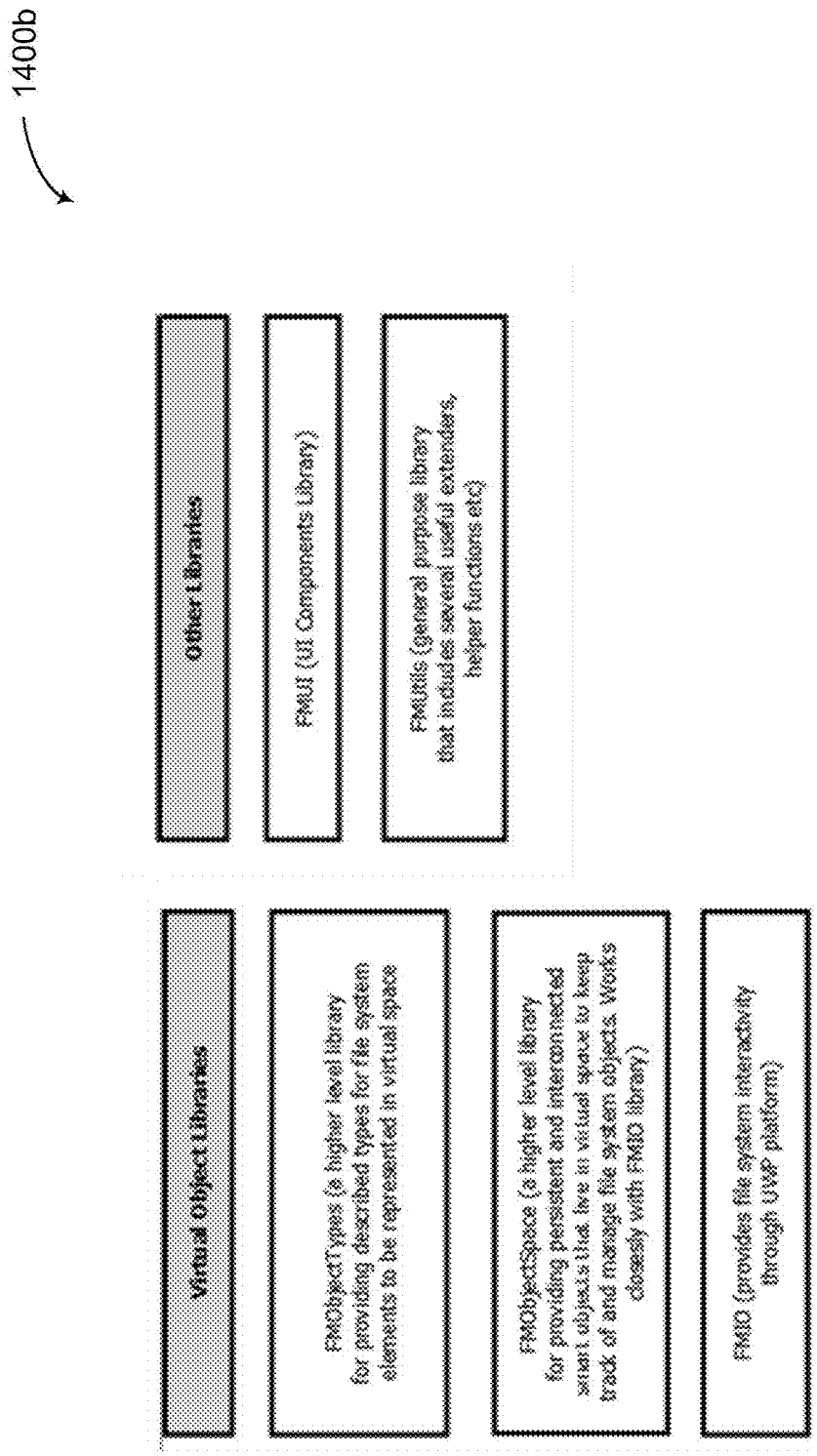

FIGS. 14A and 14B are diagrams illustrating examples of libraries used in connection with the visual file manager. For example, FIG. 14A shows a diagram 1400a that includes various display libraries as well as virtual space libraries. Similarly, FIG. 14B shows a diagram 1400b that includes various virtual item libraries as well as other libraries. These libraries are used in connection with the software modules shown in FIG. 13 as part of the overall operation and implementation of the visual file manager 120.

Figure 15:
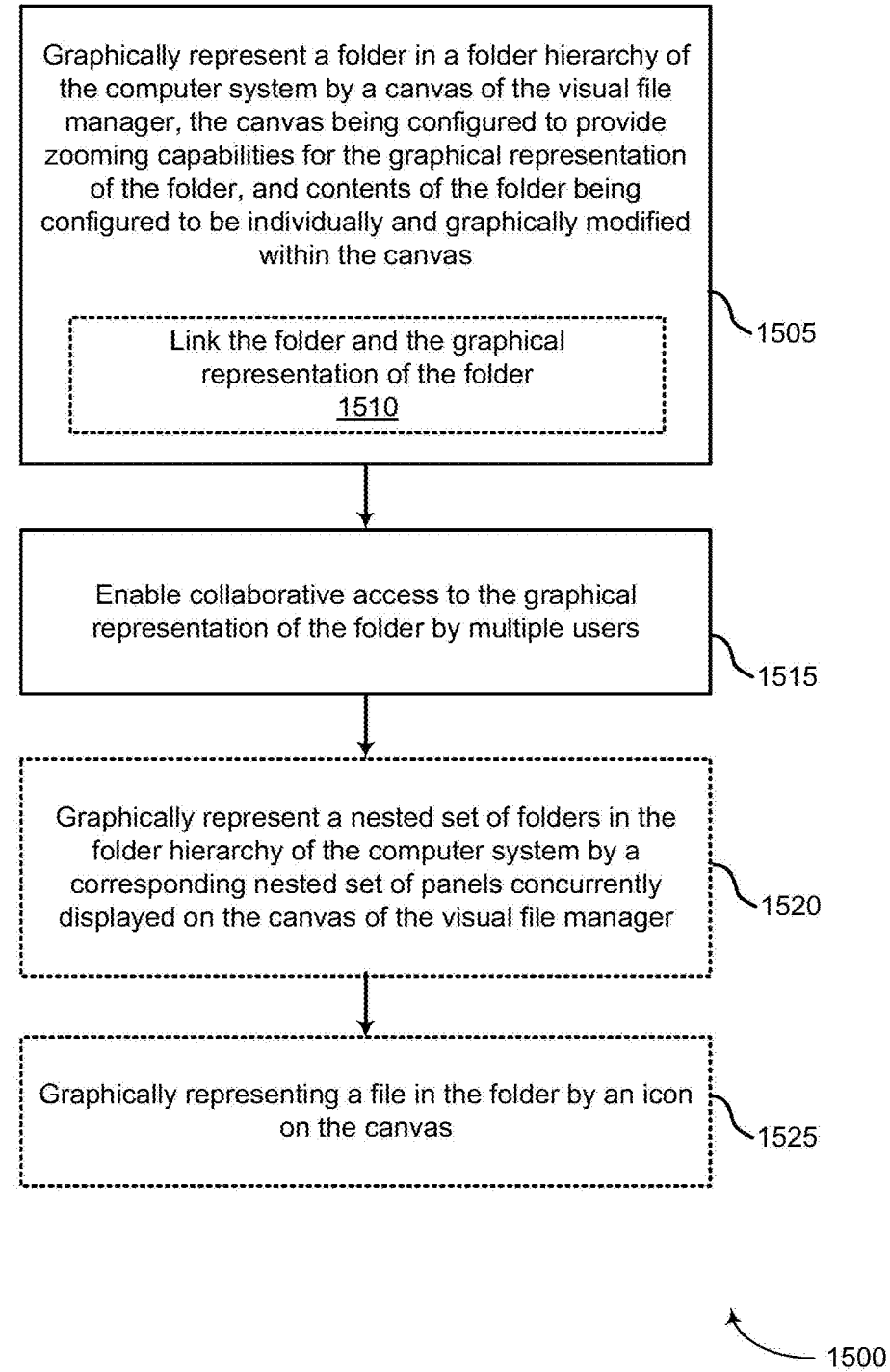
FIG. 15 is a flow chart illustrating an example of a method for a visual file manager.

FIG. 15 is a flow chart illustrating an example of a method 1500 for a visual file manager. The operations described in connection with method 1500 can be performed by a computer system like the computer system 1114 described in FIG. 11. More specifically, the operations described in connection with method 1500 can be performed by one or more processors, where the one or more processors can include a processor like a CPU, a graphics processor like a GPU, or both.

The method 1500 is a method for operating a visual file manager (e.g., the visual file manager 120) on a GUI of a computer system.

At block 1505, the method 1500 may include graphically representing a folder in a folder hierarchy of the computer system by a master panel of the visual file manager, the master panel being configured to provide zooming capabilities for the graphical representation of the folder, and contents of the folder being configured to be individually and graphically modified within the master panel.

Optionally at block 1510 in block 1505, the method 1500 may include linking the folder and the graphical representation of the folder.

At block 1515, the method 1500 may include enabling collaborative access to the graphical representation of the folder by multiple users. For example, collaboration as described in FIGS. 5A-5C, 8, 9A-9C, 10A, and 10B can be enabled as part of the operation of the visual file manager 120.

Optionally at block 1520, the method 1500 may include graphically representing a nested set of folders in the folder hierarchy of the computer system by a corresponding nested set of panels concurrently displayed on the master panel of the visual file manager. The nested set of folders can be inside the folder and the nested set of panels can be displayed on the canvas. Each panel can be a rectangular panel, for example. Other shapes of panels may also be used if so desired by the user. For example, circular, oval, or rectangular with rounded corners are other shapes that can be available. In some instances, different panels of different shapes can also be used.

Moreover, optionally at block 1525, the method 1500 may include graphically representing a file in the folder by an icon on the master panel. In one example, the icon can be an image that is an exact representation of at least a portion of the contents of the file. Moreover, the icon can be modified by changing a size and/or a position of the icon.

In another aspect, the method 1500 may include linking the folder and the graphical representation of the folder. Linking the folder and the graphical representation of the folder may include dynamically and automatically performing one or both of propagating changes in the folder to corresponding changes in the graphical representation of the folder, or propagating changes in the graphical representation of the folder to corresponding changes in the folder In another aspect, the method 1500 includes graphically representing a separate folder inside the folder in the folder hierarchy of the computer system by a panel displayed on the canvas of the visual file manager, the contents of the separate folder can be configured to be individually and graphically modified within the panel. Moreover, an image can be assigned (e.g., FIG. 7A) to the graphical representation of the separate folder, the image can be displayed as the graphical representation of the separate folder during a first zoom level (e.g., FIG. 7C), and the panel with contents being displayed as the graphical representation of the separate folder during a second zoom level (e.g., FIG. 7B).

In another aspect, the method 1500 may include adding a media icon and connecting the media icon to the icon (e.g., FIG. 6B), the media icon can be configured to reproduce one or more of audio, video, or text when activated to provide information associated with the icon.

In yet another aspect, the method 1500 may include graphically representing multiple files in the folder by multiple corresponding icons on the master panel; and graphically organizing the multiple icons into a progression associated with the contents of the multiple files to which the multiple icons correspond.

In another aspect, a different method for operating a visual file manager (e.g., the visual file manager 120, FileMap) is described. Aspects of this other method may include operating a visual file manager and performing one or more functions of the visual file manager. For example, this method may involve handling information in a computer system (e.g., computer system 1114), where such handling includes operating, by one or more processors (e.g., processor(s) 1104), a visual file manager (e.g., visual file manager 120) that graphically organizes and displays assets (e.g., in the graphical user interface or GUI 110), the visual file manager being configured to perform one or more of the following functions: generating or constructing diagrams, linking a directory, tabbing, transferring files, enabling a file basket, broadcasting a panel as a website, enabling a locator, generating, managing, and interacting with panels, interacting with assets, managing a relationship between a panels and an asset, generating a grid for a master panel, managing a relationship between an asset, a name, and a grid, managing appearances of assets, converting panel types, generating and managing a toolbar, enabling collaboration between two or more computer users, or performing one or more of a right click menu, a hold function, a hide function, a record process, a search, an undo, a full screen, a print screen, a link, a sound recording, a panel market, a tool market, a tag, or a profile.

Figure 16:
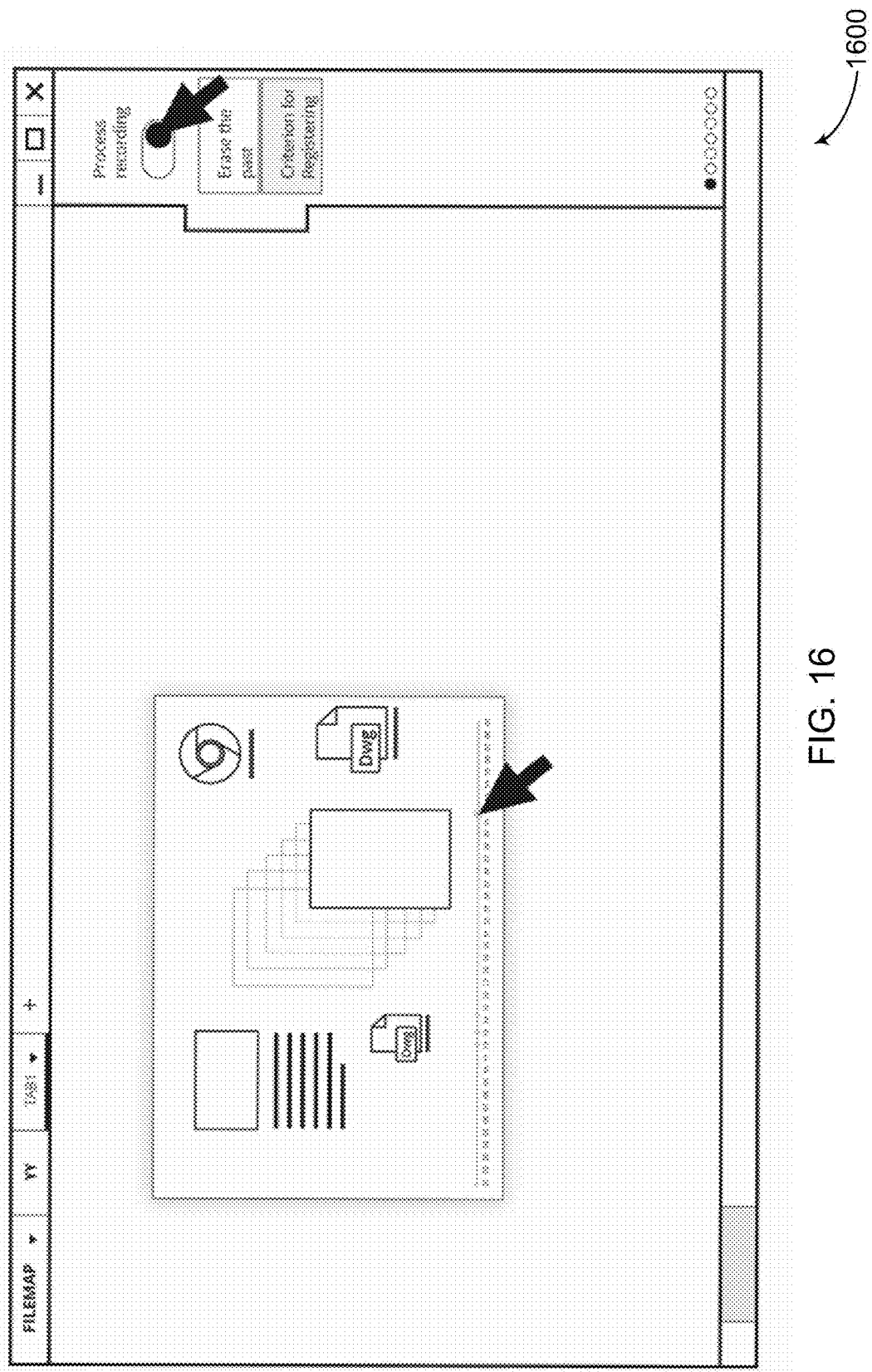
FIG. 16 is a diagram illustrating an example of a recording feature of the visual file manager.

FIG. 16 shows a diagram 1600 illustrating an example of a recording feature of the visual file manager 120. When this feature is enabled, it is possible to record or store the graphic layout of a panel through time and to plot the major changes that occur in that time to a timeline located below the panel. The timeline can appear when the feature or tool is enabled. These major changes can be represented via nods. These types of changes can include changes in position, changes in scale, and/or asset modifications.

Figure 17:
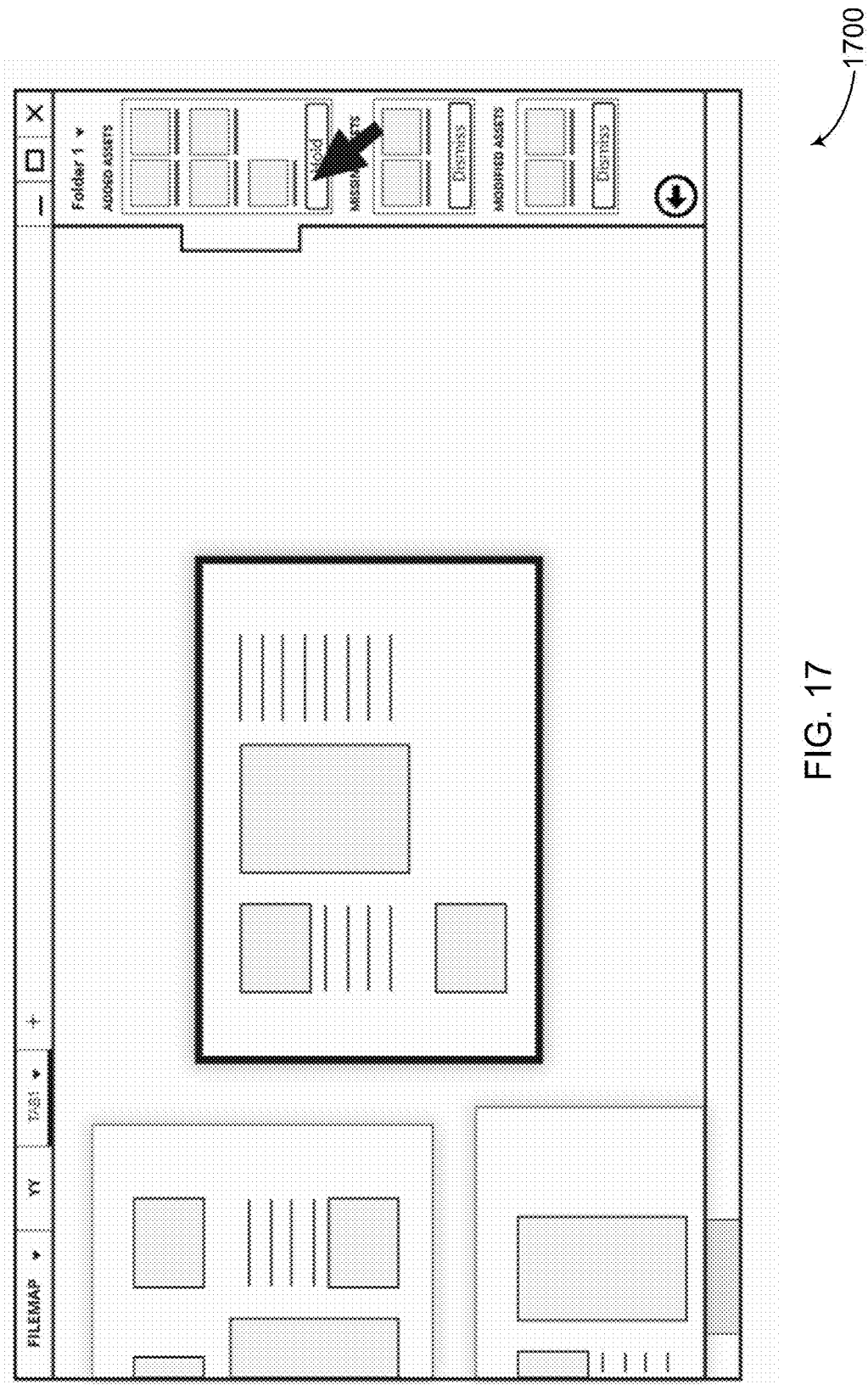
FIG. 17 is a diagram illustrating an example of a locator feature of the visual file manager.

FIG. 17 is a diagram 1700 illustrating an optional example of a locator feature of the visual file manager 120. Because the user is free to add, delete or modify assets via the default file manager, these changes need to be reflected in the visual file manager 120 since it holds additional intelligence about the assets such as location and scale.

The locator can show what has been added, deleted or modified in a folder while making us look at the corresponding panel so that the user can place the added assets on the panel, be notified about which assets are changed, and/or be notified about which assets are deleted. In addition to these three main functions, the locator may also show when a panel is being shared with the user so that the user can place the panel in the visual file manager 120. If any change is made in the file system the locator (which can be implemented as a virtual button, for example) may indicate that the user's attention is required. When the user clicks the locator button, the locator menu appears, and the locator can list missing, modified and added assets.

As part of the locator feature, the canvas can pan and zoom automatically so that the user can see the corresponding panel clearly. Moreover, the border of the panel in consideration can be indicated with a thickness to make it easier to identify by the user.

Figure 18:
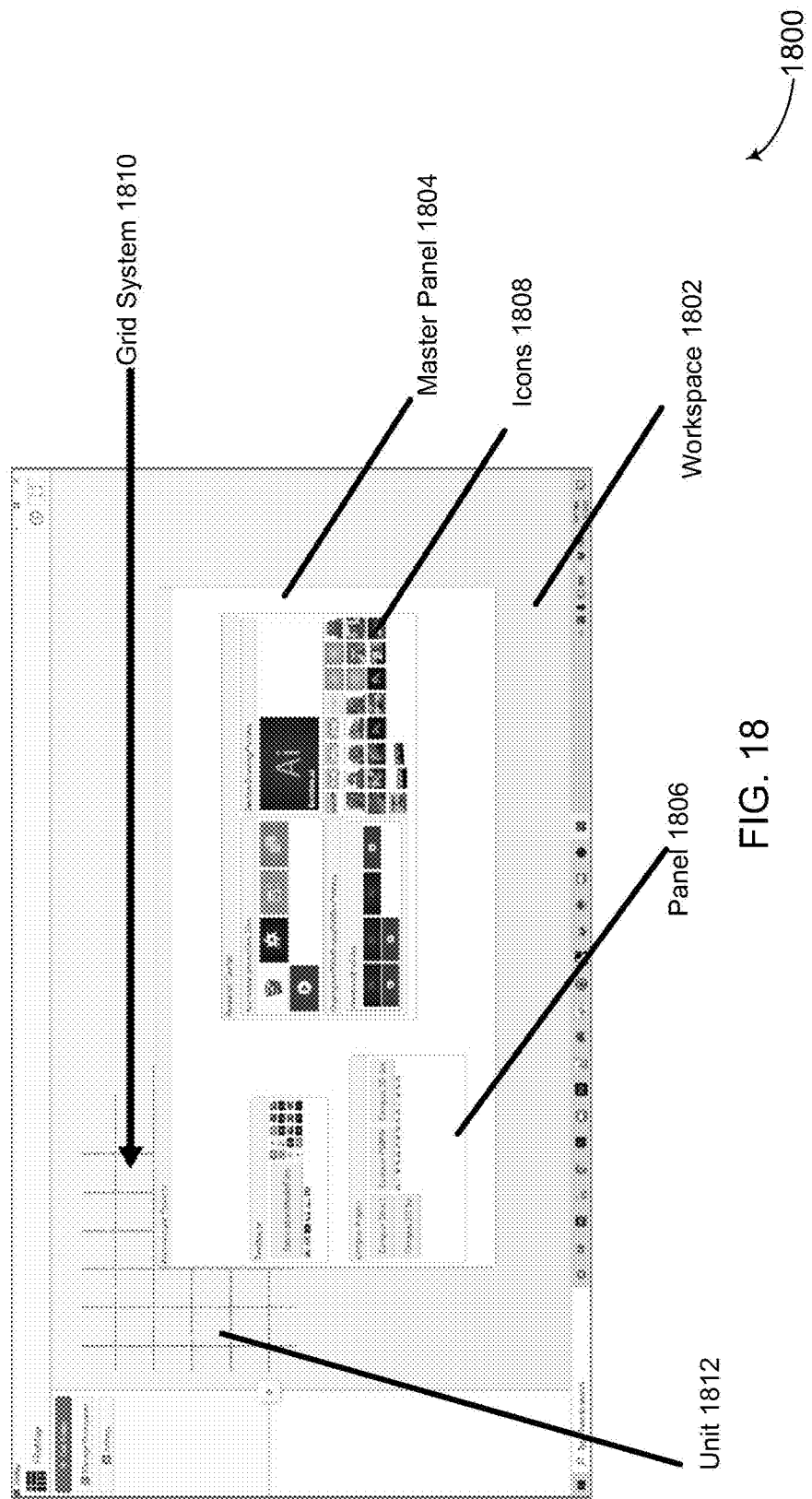
FIG. 18 is a diagram illustrating an example of a grid system of a workspace of the visual file manager.

FIG. 18 is a diagram illustrating example 1800 of a grid system of a workspace of the visual file manager. In particular, workspace 1802 is depicted being governed by grid system 1810. A workspace is a space where master panels can be placed. A workspace has a grid system that defines a unit size in a coordinate system. Grid systems also provide structure to master panels (e.g., master panel 1804), panels, non-file system items etc., by defining a unit size in a coordinate system. For example, resizing a panel will snap to a grid to provide a clean and organized user interface. Grid system 1810 is made up of a plurality of units 1812, which are each shaped as a square. A unit represents the smallest size that an item (e.g., icon or panel) can be within the grid system. The grid system is used to establish a relative size and position of an item (e.g., a panel, icon, preview, etc.) within the workspace, master panel, or panel.

In an exemplary aspect, one or more processors are configured to execute the instructions to graphically represent on the GUI a first folder in a folder hierarchy of the computer system by a first master panel (e.g., master panel 1804) of the visual file manager, at least one file in the first folder by at least one icon (e.g., icons 1808) on the first master panel, and a nested folder in the first folder by a first panel (e.g., panel 1806) on the first master panel.

Figure 19:
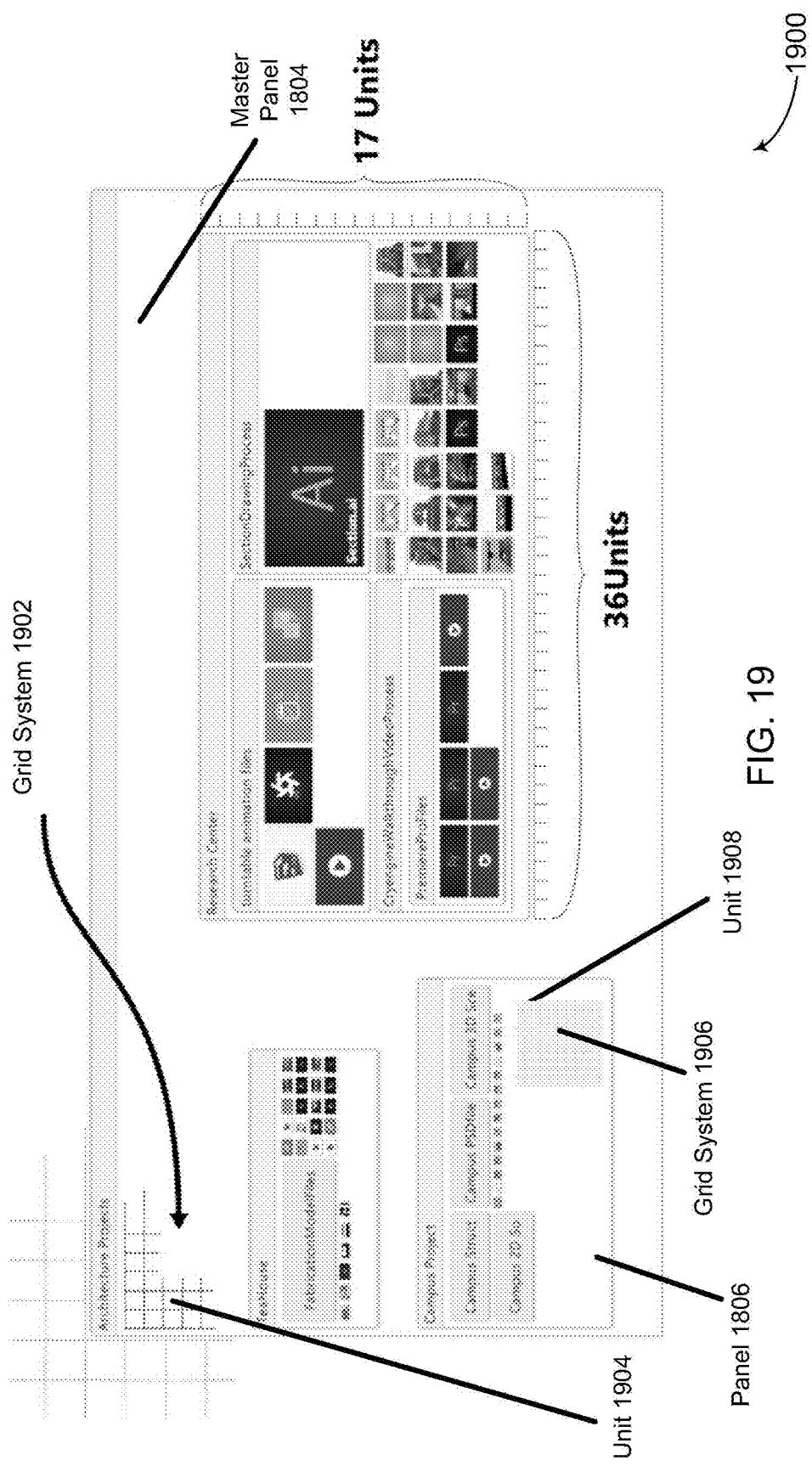
FIG. 19 is a diagram illustrating an example of a grid system of a master panel and a grid system of a panel of the visual file manager.

FIG. 19 is a diagram illustrating example 1900 of a grid system of a master panel and a grid system of a panel of the visual file manager. In particular, example 1900 is a focused view of master panel 1804 and its contents.

The contents of master panel 1804 is organized in a first grid system (e.g., grid system 1902) and contents of panel 1806 is organized in a second grid system (e.g., grid system 1906). In some aspects, the units making up grid system 1902 (i.e., unit 1904) are larger than the units making up grid system 1906 (i.e., unit 1908). This signifies that the resolution of the icons and panels within panel 1806 is greater than that of master panel 1804, allowing for greater layout flexibility in panel 1806. In example 1900, a panel within master panel 1804 is 36 units wide and 17 units in height. These units are made up of unit 1904 because the panel is within the space of master panel 1804.

At an initial point, if a panel has fewer items, the visual file manager will set a lower resolution for the panel. If the panel has a lot of items, the visual file manager will set a higher resolution for the panel. Thus, the reason for having more or less resolution grids is related to the number of children items of a panel. This is determined in the backend by the visual file manager, which is further configured to read folder content and calculate an ideal layout and resolution for the child items in the folder. The user can increase and decrease the resolution after the initial layout based on user preference.

In order to concurrently depict the contents of workspace 1802, master panel 1804, and panel 1806, a universal grid system where all spaces are governed by the same unit sizes will limit visibility of icons, panels, etc., and/or use an unnecessary amount of computer resources. A universal grid system also limits flexibility in visual customization. For example, if all spaces are governed by grid system 1810, the sizes of icons 1808 (which are governed by the grid system of its associated panel) will need to be larger. If the computer screen size is small, larger icons will take up screen real estate and limit the number of icons that can be displayed simultaneously. One a more technical level, the reason a universal grid system is not utilized is because a universal grid system cannot provide an easy, practical, and accurate way to describe very small items. Since there may be many nested sub folders, there may be a drastically high number of small items to be displayed. A universal grid system would attempt to define these small items with very small numbers. These small numbers would require very long floating points (which is not supported by the computer and creates visual artefacts because of rounding operations). Therefore each panel having their own grid system eliminates the need for a universal system.

Figure 20:
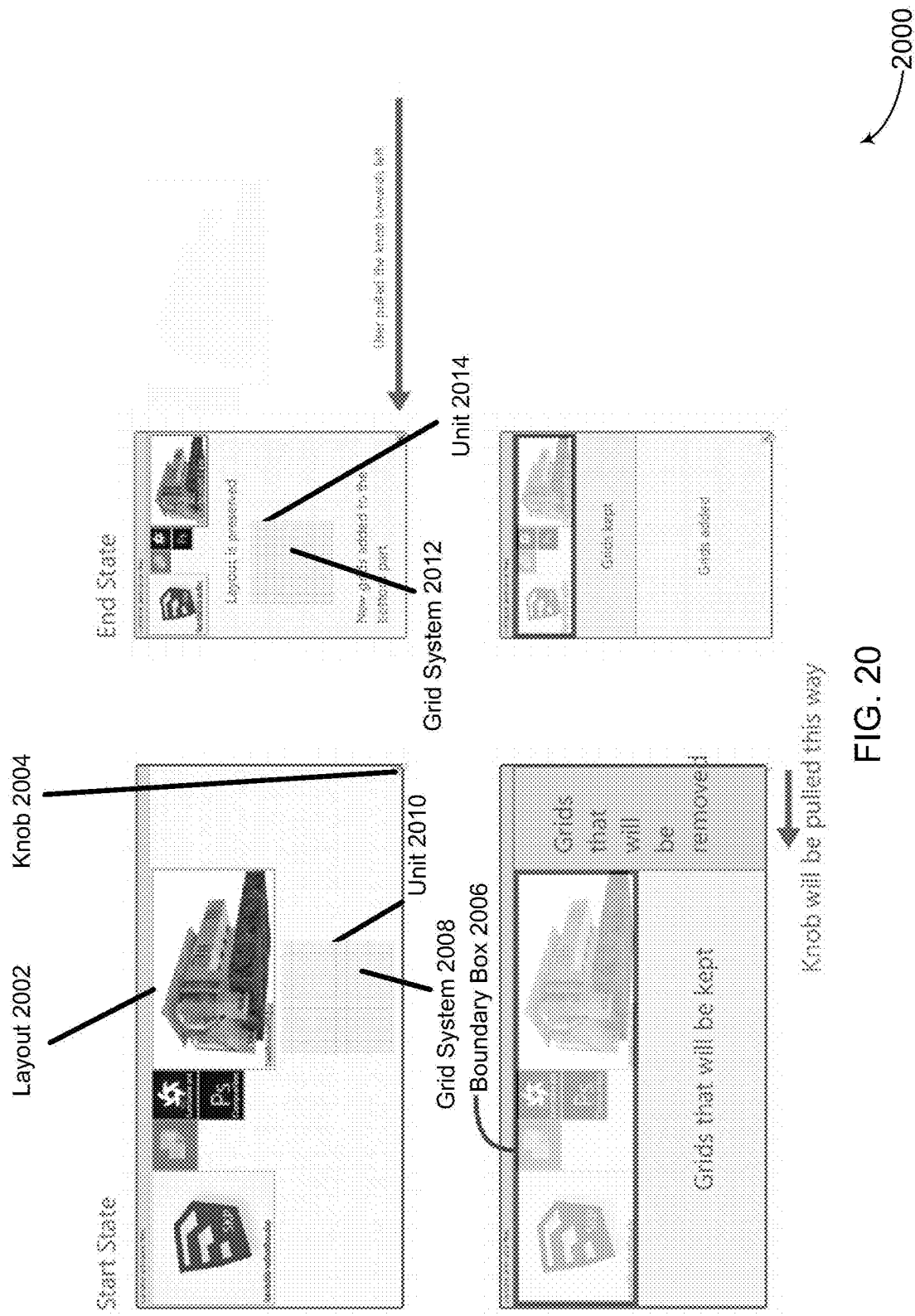
FIG. 20 is a diagram illustrating an example of maintaining a layout when a panel is resized.

FIG. 20 is a diagram illustrating example 2000 of maintaining a layout when a panel is dynamically resized. The layout is the size and position of placed items in relation to an inner space origin of the panel. Thus, extra empty space is not a part of the layout. In an exemplary aspect, one or more processors receive (e.g., from a user) and execute a request to configure (or reconfigure) a layout of a plurality of icons in the first panel. The request may specifically indicate a relative size and position for each of the plurality of icons in the layout. For example, a user may move the position of an icon or resize an icon. The layout is thus made up of a combination of icons, their relative positions, and their relative sizes. In example 2000, suppose that a user adjusts a panel such that it has layout 2002.

The one or more processors may also receive and execute a request to dynamically adjust a size of the first panel. For example, each panel and/or master panel may have a knob 2004 that the user can drag or push to adjust the size of the respective panel/master panel. In example 2000, the user may pull knob 2004 leftward such that the panel size changes from the start state to the end state (i.e., a portion of the panel inner space is removed and a new portion is added).

In an exemplary aspect, the one or more processors execute the request to dynamically adjust the size of the first panel by changing a grid system of the first panel to a third grid system such that layout 2002 of the plurality of icons is not changed. It should be noted that in example 2000, the request to adjust the size of the first panel involves changing an aspect ratio of the first panel such that layout 2002 of the plurality of icons will be disturbed in the second grid system.

For example, certain icons will be hidden if not shifted. In another example, certain icons may need to be re-positioned in order to avoid being hidden—thus breaking layout 2002. In yet another example, layout 2002 may get disturbed as the sizes of the icons relative to one another may change, causing the look of the panel to change in an unappealing manner.

Because resizing the panel horizontally or vertically will add/remove columns or rows of grids, layout 2002 will be disturbed unless the grid system is changed. For example, the panel may start with grid system 2008 with unit 2010. In order to maintain layout 2002, the one or more processors may change continuously (as the size of the panel changes) adjust the grid system until grid system 2012 is reached with unit 2014. In some aspects, adjusting the grid system involves changing the density/resolution of the grid system. Suppose that an icon in the panel is 2×2 units under grid system 2008. The same icon will retain the size of 2×2 units under grid system 2012. However, the unit size of unit 2010 will change to unit 2014.

The magnitude of the change in unit size from unit 2010 to unit 2014 depends on boundary box 2006. The one or more processors may first generate boundary box 2006 around the icons and panels comprised in layout 2002. The size of boundary box 2006 is minimized such that reducing the size of the boundary box further will omit icons inside layout 2002. In some aspects, boundary box 2006 is predetermined shape (e.g., a rectangle). The one or more processors determine whether the change in the panel size requested by the user will reduce at least one dimension (e.g., height, width) of the panel to be less than a corresponding dimension of boundary box 2006. In response to determining that the panel size change will cause the dimension to be less than a dimension of boundary box 2006, the one or more processors adjust the corresponding dimension to match the new dimension of the panel size. In example 2000, the width of the panel is reduced to be less than the width of boundary box 2006. Thus, in the end state, the width of the boundary box 2006 is equal to the new width of the panel's inner space.

The one or more processors further scale unit size proportionally based on the change in the dimensions of the boundary box. For example, if the width of boundary box 2006 is halved, the unit size of unit 2014 is half of the unit size of unit 2010.

In general, a user may resize a panel/master panel in any way he/she wants and the corresponding grid system will adapt to this change (e.g., by changing unit size of units, adding/removing rows/columns). The existing layout is never disturbed. This makes creating layouts in a workspace easier because all master panels/panels can automatically be resized, snapped to grids, and aligned with each other. Similarly this method can also be utilized to create more grid space in a panel to continue the work of a user.

FIG. 21 is a diagram illustrating example 2100 of resizing and changing panel icons and file icons in a canvas. In some aspects, the one or more processors are further configured to execute the instructions to receive (e.g., from a user) and execute a request to zoom into a portion of the first master panel at a first zoom level. The visual file manager may execute the request to zoom by determining a ratio between a total screen size associated with a default graphical representation of the first icon (can either be a file, a panel or a master panel) and an adjusted screen size associated with a graphical representation of the first icon at the first zoom level. The visual file manager then adjusts sizes of the at least one icon and the first panel based on the ratio.

In an exemplary aspect, the size of an item (e.g., an icon, a file, etc.) is described relative to the size of the screen of a device displaying the user interface. The visual file manager calculates the size of an item by comparing the smallest edge of an item with the width of the screen. In some aspects, the comparison is performed between one of the width of an item, height of an item, smallest of the width or height, largest of the width or height, or the area of the item, etc., with a corresponding/different dimension of the screen. The size of an item can be adjusted by zooming in or manual resizing.

In some aspects, the total screen size may also be represented by a grid system with a given unit size. When a zoom-in action is performed, the unit size of a grid system where the zoom is being focused on is increased. When a zoom-out action is performed, the unit size of a grid system where the zoom is being focused on is decreased. However, the unit size of the screen is kept constant. The magnitude of the increase and decrease is based on screen size. For example, a zoom-in is performed such that only half of the default screen is shown, the unit sizes are doubled.

In some aspects, the visual file manager adjusts sizes of the at least one icon and the first panel by determining that a size of a first icon in the at least one icon is greater than a first size (e.g., 100×100 units relative to the unit size of the screen) and in response, displaying, in place of the first icon on the first master panel, contents of a file corresponding to the first icon. Suppose that the default look of an icon (e.g., of a file or a panel) is one of icon versions 2104. If zooming into the screen, increases the size of an icon beyond the first size, the look changes to icon version 2102, which displays the contents of the panels. Icon version 2102 comprises new U.I. elements such as panel buttons and tabs, which offer more options to interact with the items.

In some aspects, the visual file manager adjusts sizes of the at least one icon and the first panel by determining that a size of a first icon in the at least one icon is less than a second size (e.g., 30×30 unit relative to the unit size of the screen) and in response, displaying the first icon as a single minimalistic icon on the first master panel. For example, the visual file manager may simplify the look of a panel by not displaying its space (e.g., grid space and content) as depicted in icon version 2106. Not displaying the space makes the representation more minimalistic and also eliminates the need to render the child items. This helps reduce resource usage since the total number of visible items are reduced. In other words, it is displayed as a single abstract rectangle with the folder name. In some aspects, if the size is less than a third size (e.g., 10×10 units), the icon depict loses its name as well (e.g., as shown in icon version 2108).

In general, the visual file manager implements a screen size-based item mode change (so the system is not directly related to zoom level and is related to the size change as a result of either zooming or other methods such as scaling or resizing items, etc.). This means that the visual file manager looks at the size of the item in relation to screen size.

In addition to the screen size concept, the visual file manager implements a look change in several different contents types such as the panels and viewers. For example, if an icon size is greater than the first size, the contents of the file is shown. If the item is a panel, the contents of the panel are shown. If the file is a single file (e.g., a text document, a video, an image, an application, etc.) viewers (e.g., text viewer, 3D viewer, PDF viewer, etc.) are displayed as their generic file icon. More specifically, if the icon is less than a threshold size, the icon associated with the application that launches the file is depicted. If the icon is larger than a threshold size, the visual file manager displays its content or a portion of its content such as the actual text, the actual 3D file, the actual PDF content, etc. This allows a user to see the content without needing to open the file (e.g., via zooming) and it optimizes performance since the visual file manager will only process more costly digital content only if the user zooms to specific files (which means the user will only see a limited number of files on the screen). For example, FIG. 21 shows how the representation of a single item changes from icon A (e.g., a small icon), to icon B (e.g., a mid-size thumbnail showing the application logo), to icon C (e.g., a preview of the contents of the item) as the user zooms in or resizes the item.

Figure 22A:
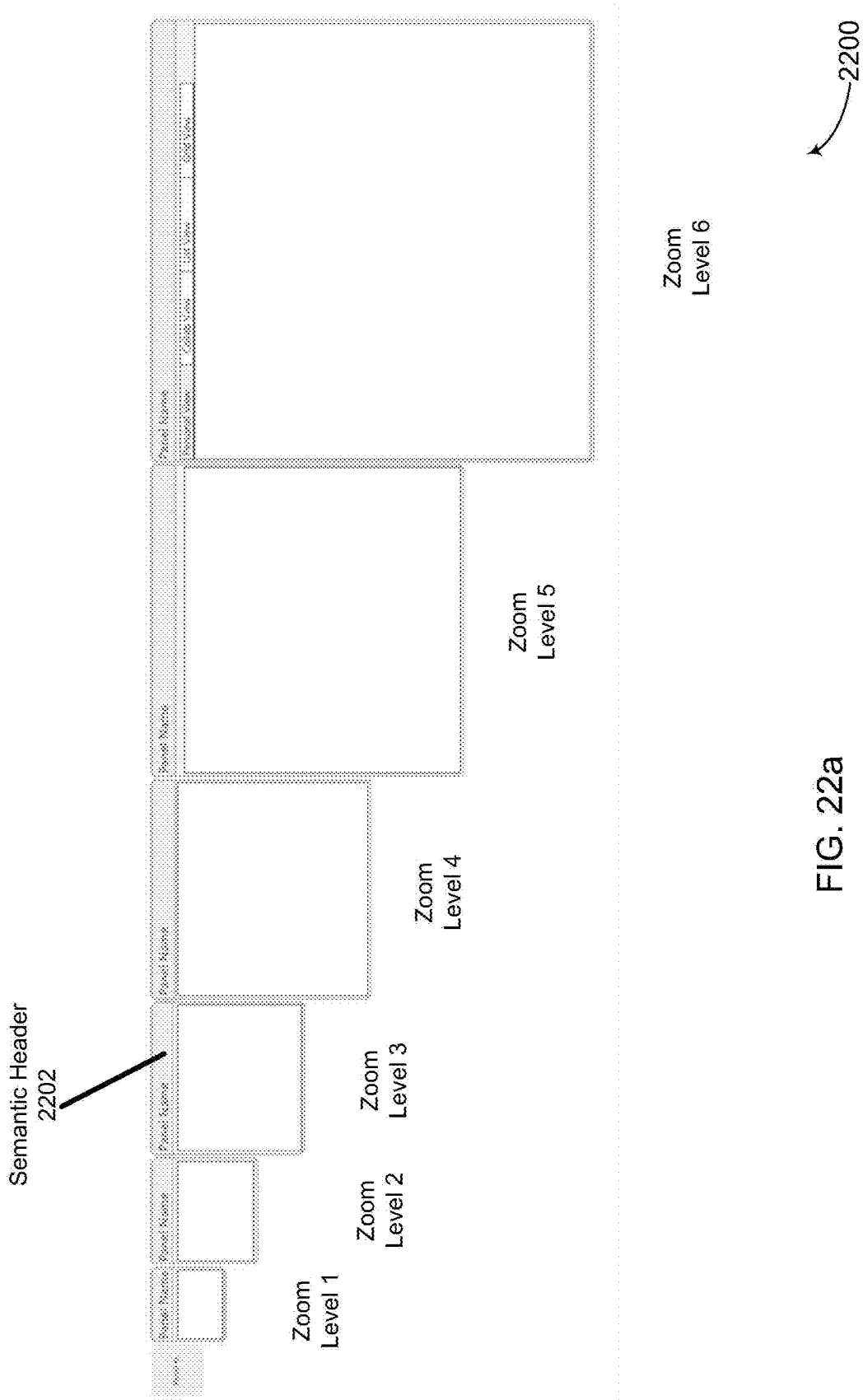
FIG. 22a is a diagram illustrating an example of maintaining a semantic header and panel name when zooming.

FIG. 22a is a diagram illustrating example 2200 of maintaining a semantic header and panel name when zooming. In some aspects, the first panel comprises semantic header 2202 indicating a panel name. The height of semantic header 2202 and a font size of the panel name is constant across all zoom levels (e.g., zoom levels 1-6) in which the panel size is not less than the second size described above. This allows the visibility of the panel name and it allows enough surface area for the cursor actions (such as dragging the panel in another location by holding from semantic header 2202).

The panel itself is a geometric item. The panel will appear larger as a user zooms in. In some aspects, however, some of the panel's visual features such as gaps and border thicknesses will stay the same size (because they are considered "semantic"), even as the item shrinks or enlarges. This is further described in FIG. 22b.

Figure 22B:
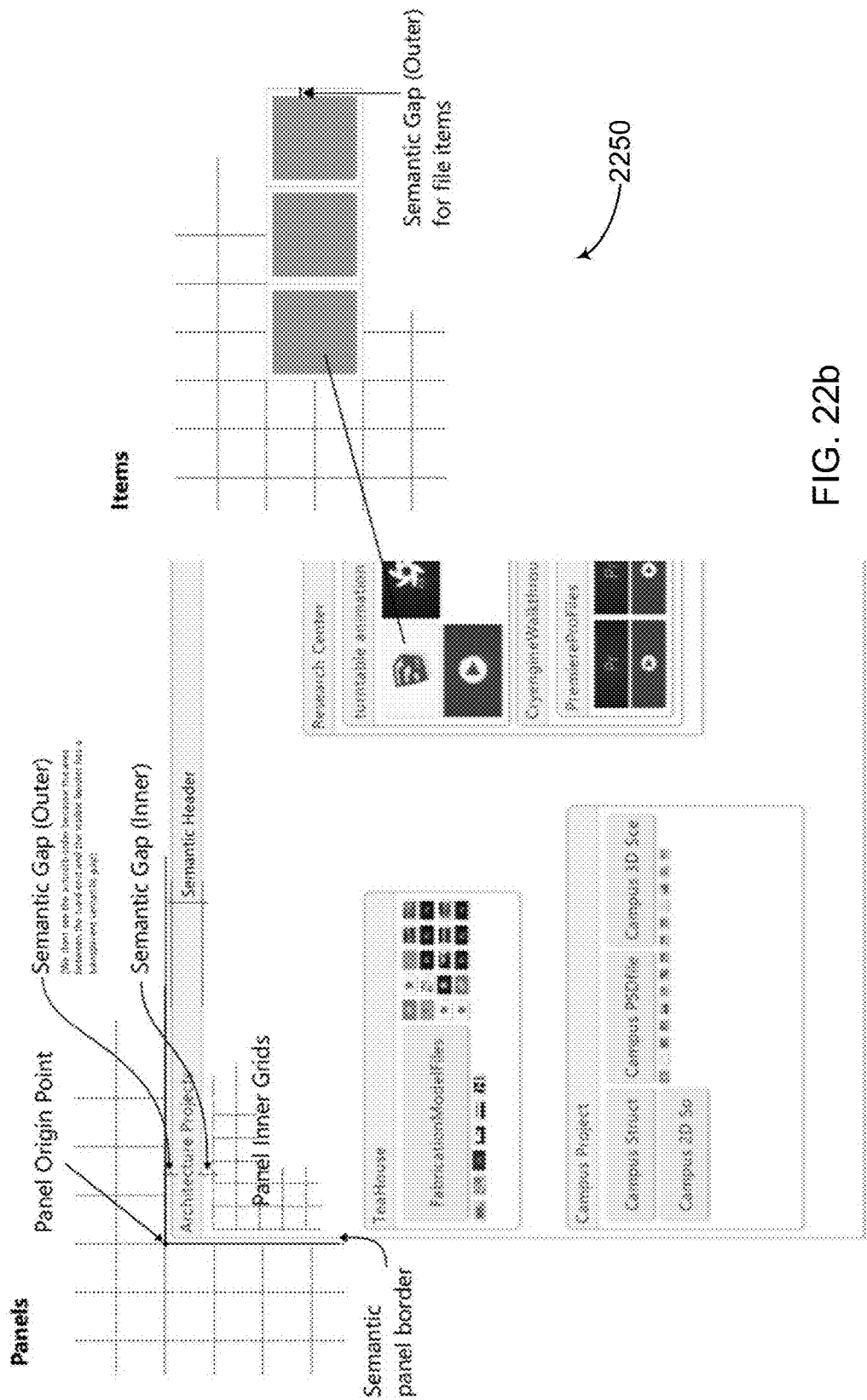
FIG. 22b is a diagram illustrating an example of semantic gaps and borders of panels and items.

FIG. 22b is a diagram illustrating example 2250 of semantic gaps and borders of panels and items. The master panel shown in FIG. 22b is titled "Architecture Projects." The semantic panel border divides the panel inner grids and the workspace grids. There is an outer semantic gap of the master panel, which starts at the panel origin point and has a thickness up until the semantic header. Likewise, there exists an inner semantic gap that starts from the semantic header and has a thickness extending until the panel inner grids. The items in example 2250 also have an outer semantic gap that prevents the items from visually meshing together—making distinguishing between adjacent items easier.

Figure 23:
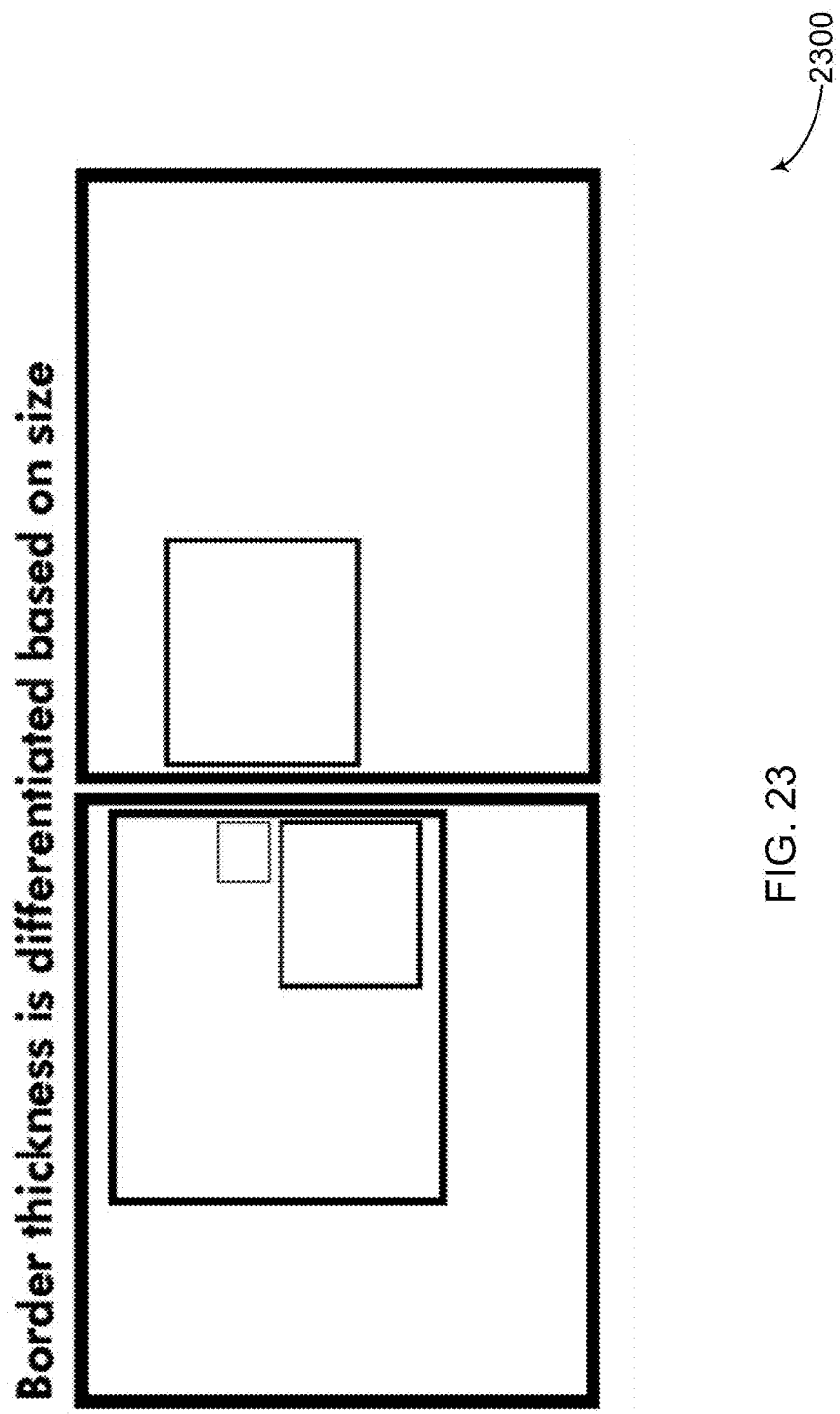
FIG. 23 is a diagram illustrating an example of setting border thickness of panels based on the size of the panel.

FIG. 23 is a diagram illustrating example 2300 of setting border thickness of panels based on the size of the panel. In some aspects, the visual file manager may set the border thickness to be proportional to the size of the item (panel/master panel/icon). For example, larger items will have thicker borders. This allows users to pick up not only the actual size of the item, but the border thickness as well to reinforce their understanding of the size of the item. Additionally the border thickness can be helpful for perceiving the size of the panel at times where the entire panel is not visible.

Figure 24:
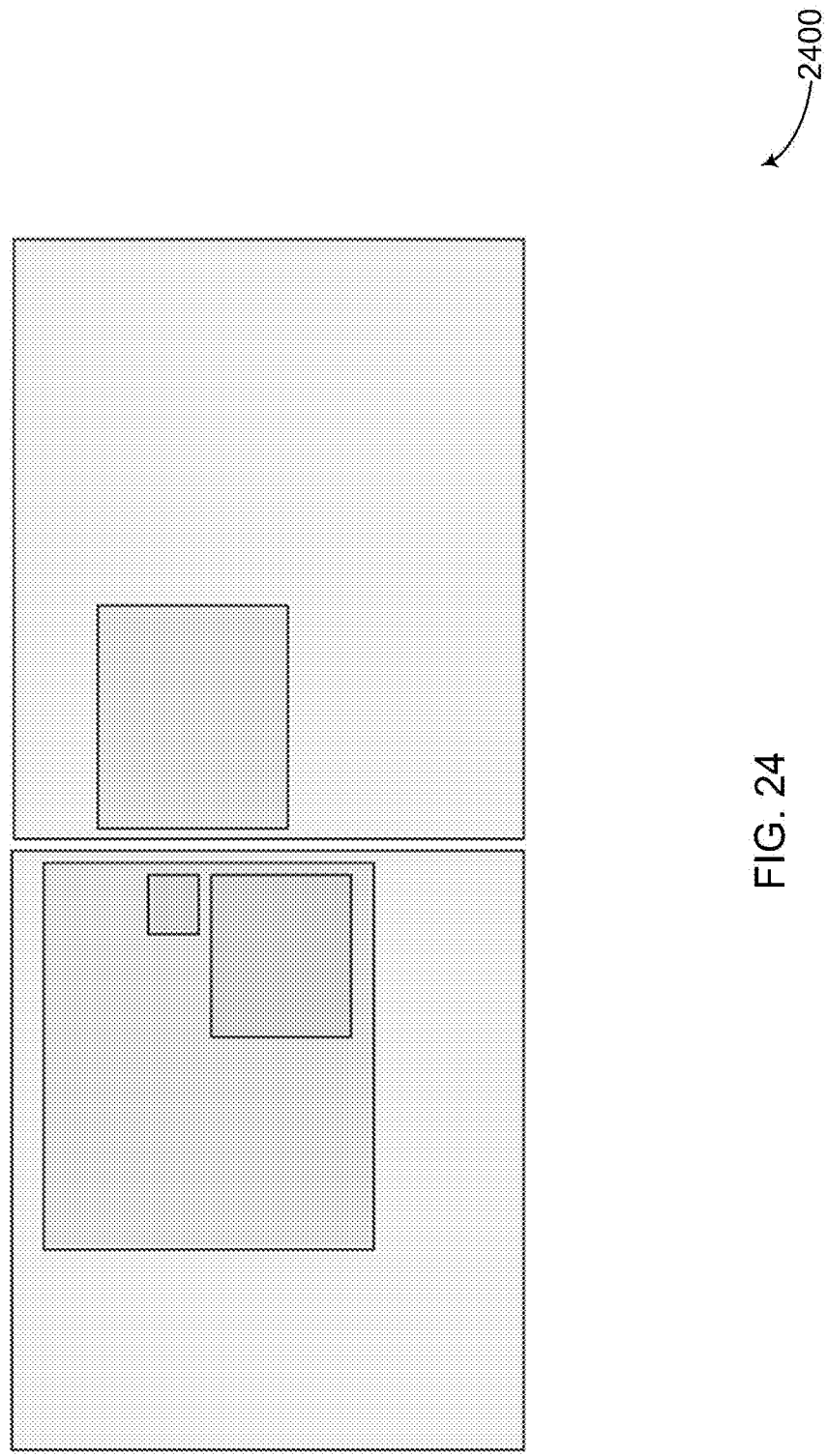
FIG. 24 is a diagram illustrating an example of setting border shading of panels based on the size of the panel.

FIG. 24 is a diagram illustrating example 2400 of setting border shading of panels based on the size of the panel. In some aspects, the visual file manager may set the shade brightness to be proportional to the size of the item (panel/master panel/icon). For example, larger items may have lower brightness values than smaller items. This not only reinforces the understanding of size, but also helps the user differentiate panel surfaces from each other. In example 2400, the smallest panels are the darkest and the largest panel/master panel is brightest in shading.

Figure 25:
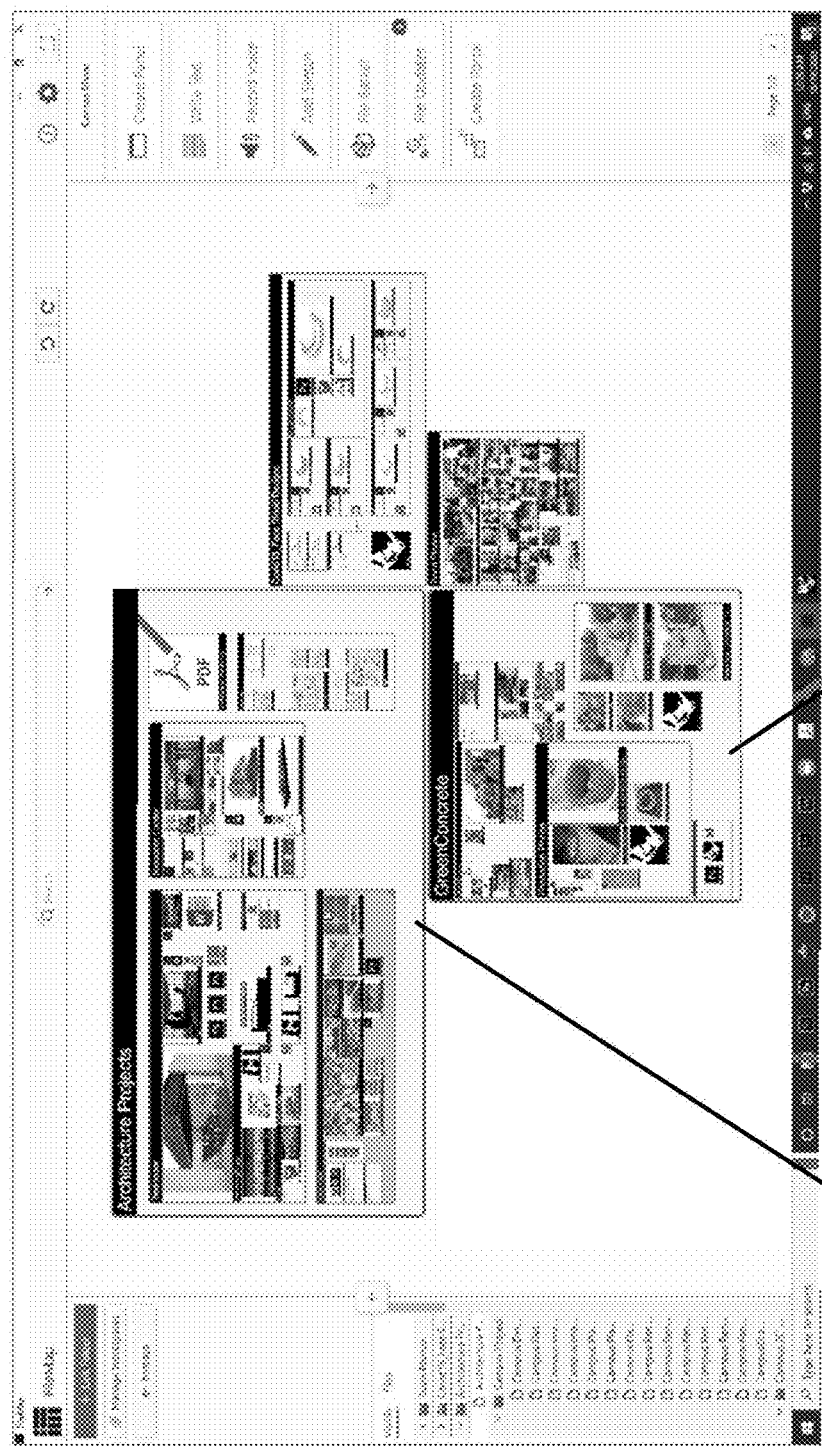
FIG. 25 is a diagram illustrating an example of displaying multiple master panels in a single workspace.

FIG. 25 is a diagram illustrating example 2500 of displaying multiple master panels in a single workspace. Up until now, only one master panel (e.g., master panel 2502) was shown in a given workspace. However, the visual file manager may also generate, for display, additional master panels. In some aspects, the one or more processors are further configured to execute the instructions to: graphically represent on the GUI: a second folder in the folder hierarchy of the computer system by a second master panel (e.g., master panel 2504) of the visual file manager, at least one file in the second folder by at least one other icon on the second master panel, and a nested folder in the second folder by a second panel on the second master panel, wherein the first master panel and the second master panel are displayed on the visual file manager concurrently (as shown in example 2500). Users may thus link or unlink more than one folder to the visual file manager (e.g., the FileMap application) such that the visual file manager generates multiple master panels (used interchangeably with rootlinks).

In some aspects, when generating the user interface of the visual file manager, a user may link a child folder or link a parent folder of the current master panel to the visual file manager. Linking the child folder will unlink the current master panel and will convert one or more child panel to master panel. On the other hand, linking a parent folder will link a new master panel, but will relocate the current master panel inside the new master panel, and keep the existing master panel layout as is (but is then considered a child panel). In both of these cases, the visual file manager will handle the permission hierarchy and will update the related shared folders either in the cloud file storage service or local file server (discussed in FIG. 26).

Figure 26:
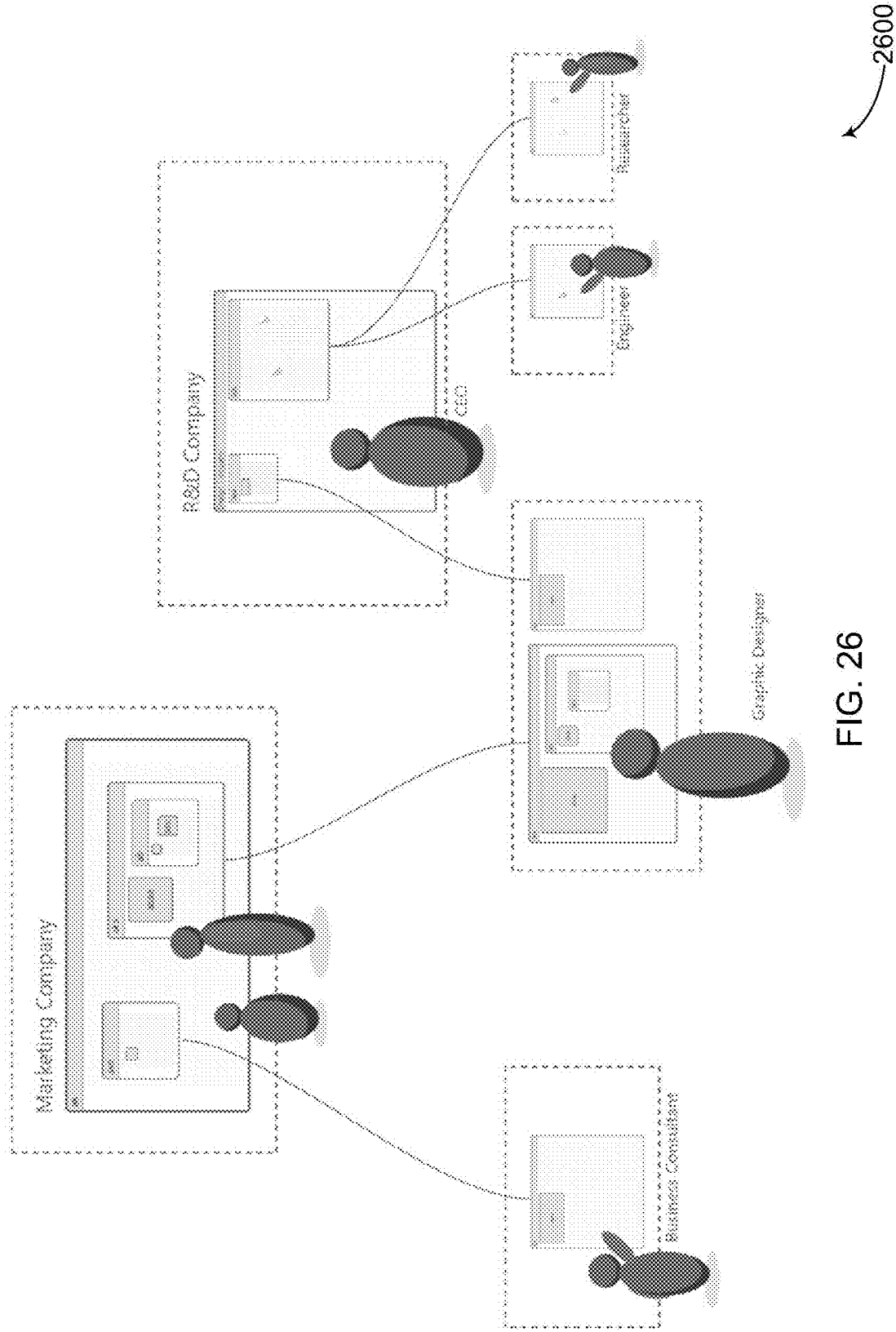
FIG. 26 is a diagram illustrating an example of a collaborative setting when using the visual file manager.

FIG. 26 is a diagram illustrating example 2600 of a collaborative setting when using the visual file manager. Example 2600 depicts the collaboration on a project between a marketing company and an R&D company. Employees (e.g., business consultant, graphic designer, CEO, engineer, researcher) within each company have access to different panels/sub-panels depending on the portion of the project that is relevant to them.

From a high-level overview, a user can invite other users inside a workspace and/or specific master panels and/or specific sub-panels. The main idea about collaboration is to allow the entire company/team/group to take advantage of the visual layout. Bringing the concept of 2D space to shared file systems can be a significant contribution to any collaborative process.

If a collaborator is added to the workspace they will simply receive an invitation to that workspace. If a master panel or sub-panel is shared with a collaborator, they receive that panel and they can add the panel to their workspace. The linked folders will be uploaded to at least one storage device or service (e.g., Google Drive) and collaborators will receive these folders in their own file system saved and synced at the desired path. This collaboration also works with the local file servers (e.g., users can point to the same folder location in the local file server). All of these will obey the LDAP (permission hierarchy of the company/organization).

In some aspects, when a panel is shared, a collaborator will see the same layout of shared items without the need to download the related file system. In some aspects, collaboration can also happen without the need to physically download related file system (cloud-only workspaces). Users may also download the related file system in their hard drives to have the files ready under their hands. Any change in the shared file system will sync between devices via the visual file manager (specifically FileMap Cloud, which is a service that handles synchronization of individual FileMap clients). Users may also use cloud storage applications to mirror and synchronize related master panels (e.g., orchestrated by the user's own file sync methods such as a local file server or a folder synced via cloud service daemon or FileMap itself.

It should be noted that when a first user shares a panel from their master panel with a second user, the second user receives the panel as a master panel to their own workspace. The second user will not have access and they cannot see above the provided panel (e.g., other panels in the master panel of the first user).

Figure 27A:
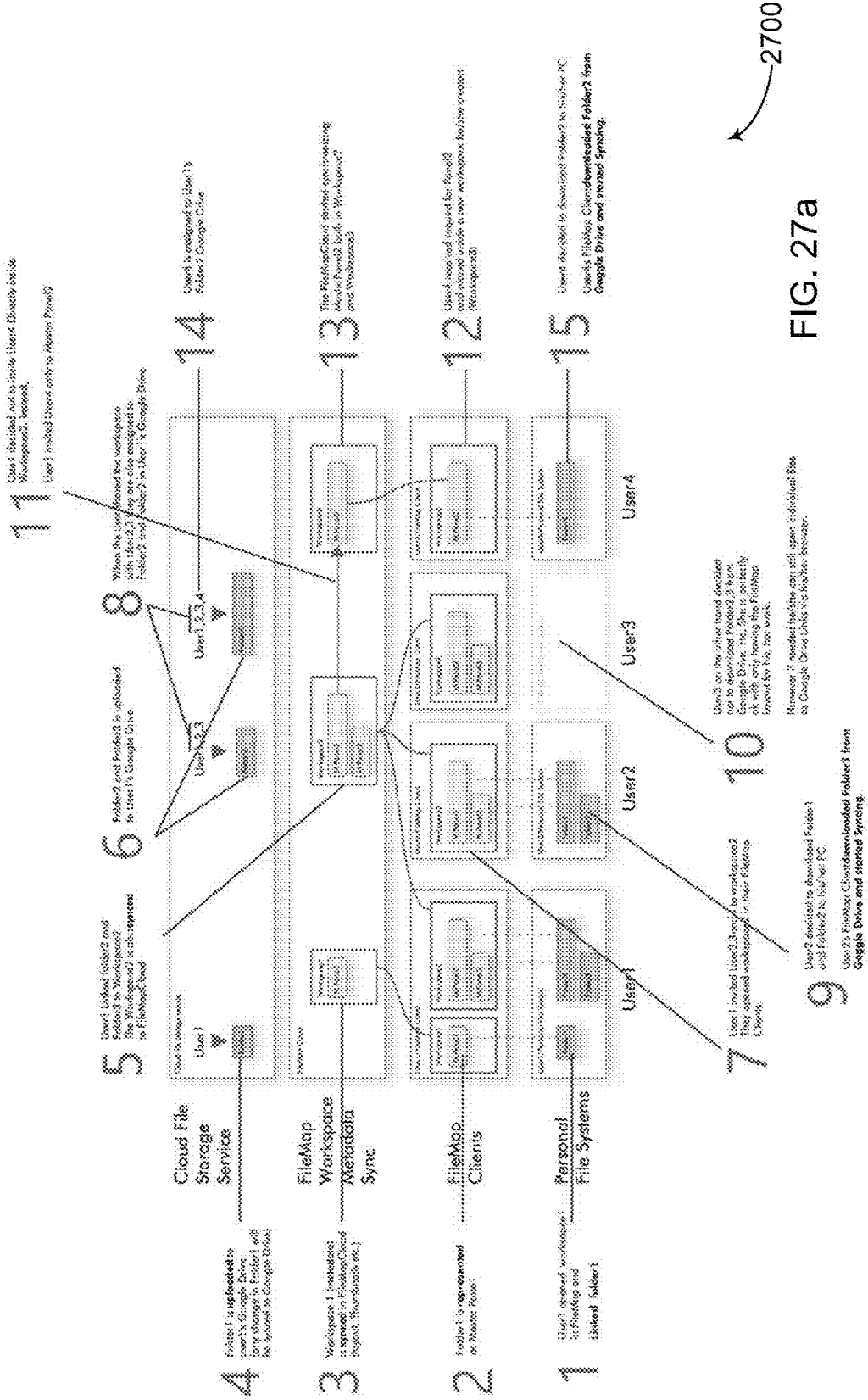
FIG. 27a is a diagram illustrating an example of a first portion of a collaboration architecture of the visual file manager.
Figure 27B:
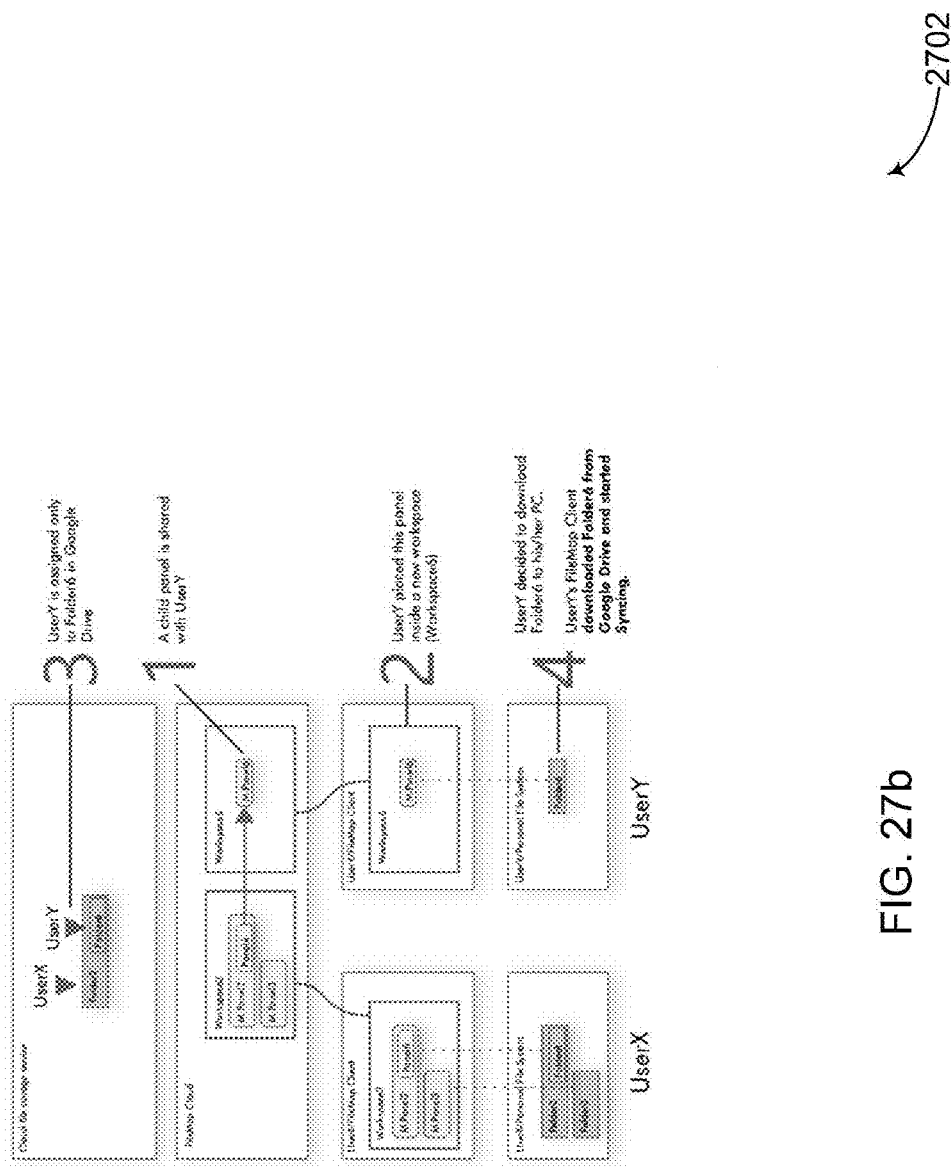
FIG. 27b is a diagram illustrating an example of a second portion of a collaboration architecture of the visual file manager.
Figure 27C:
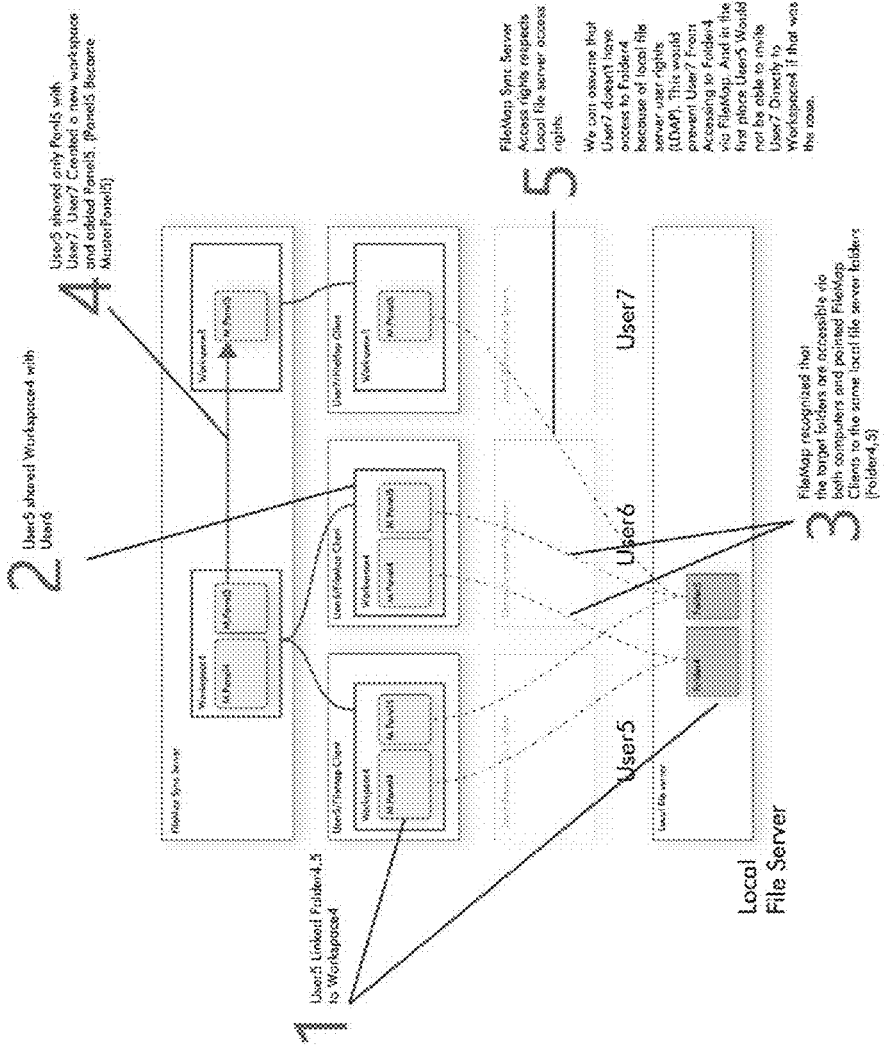
FIG. 27c is a diagram illustrating an example of a third portion of a collaboration architecture of the visual file manager.

FIG. 27a is a diagram illustrating example 2700 of a collaboration architecture of the visual file manager. FIG. 27b is a diagram illustrating an example of a second portion of a collaboration architecture of the visual file manager. FIG. 27c is a diagram illustrating an example of a third portion of a collaboration architecture of the visual file manager.

Example 2700 shows users, their file systems, and what the users see on their FileMap clients. Example 2700 further depicts what the FileMap Cloud is storing and how these folders are stored and synced via a cloud service (e.g., Google Drive). In example 2700, user 1 opens workspace 1 in FileMap and linked folder 1 on his/her personal file system. Folder 1 is represented as a master panel in the FileMap client of user 1. The FileMap client synchronizes metadata of workspace 1 (e.g., layout, thumbnails, etc.) in FileMap Cloud. Folder 1 is further uploaded to a cloud service of user 1 (any changed in folder 1 is synced with the cloud service).

Suppose that user 1 adds linked folder 2 and folder 3 to workspace 2. Workspace 2 is also synced to FileMap Cloud. Folders 2 and 3 further get uploaded to the cloud service of user 1. User 1 may invite users 2 and 3 to workspace 2. Users 2 and 3 are then able to open workspace 2 on their respective FileMap clients. When user 1 shares workspace 2 with users 2 and 3, users 2 and 3 are also assigned to folders 2 and 3 on the cloud service of user 1. Suppose that user 2 decides to download folder 1 and folder 2 on his/her computer and user 3 decides not to download folder 2 and 3 from the cloud service. User 3 will still have the FileMap layout for his/her work and, if needed, can still open individual files using links to the cloud service via his/her browser.

As discussed before, users can decide who and what to share with other users. For example, user 1 may decide to not invite user 4 directly inside workspace 2, and may only enable access to master panel 2 (of folder 2). User 4 may thus receive a request for master panel 2, which is placed inside a new workspace (e.g., workspace 3). The FileMap Cloud then synchronizes master panel 2 in both workspace 2 and workspace 3. User 4 may then decide to download folder 2 to his/her computer so user 4's FileMap client may download folder from the cloud service of user 1 and initiate synchronization. In example 2702, a child panel is shared with user Y. User Y may place this panel inside a new workspace (e.g., workspace 6). User Y is assigned only to folder 6 in a cloud service, which enables user Y to download folder 6 from the cloud service. In example 2704, user 5 links folders 4 and 5 to workspace 4 in his/her FileMap client. User 5 then shares workspace 4 with user 6. FileMap may recognize that the target folders are accessible via both computers and point to the same local file server folders. It should be noted that user 7 does not have access to folder 4 because of local file server user rights (LDAP), which prevents user 7 from accessing folder 4 via FileMap (this prevents user 5 from inviting user 7 directly to workspace 4). In example 2704, user 5 may also share panel 5 with user 7. User 7 creates a new workspace to add panel 5, which becomes master panel 5.

Figure 28:
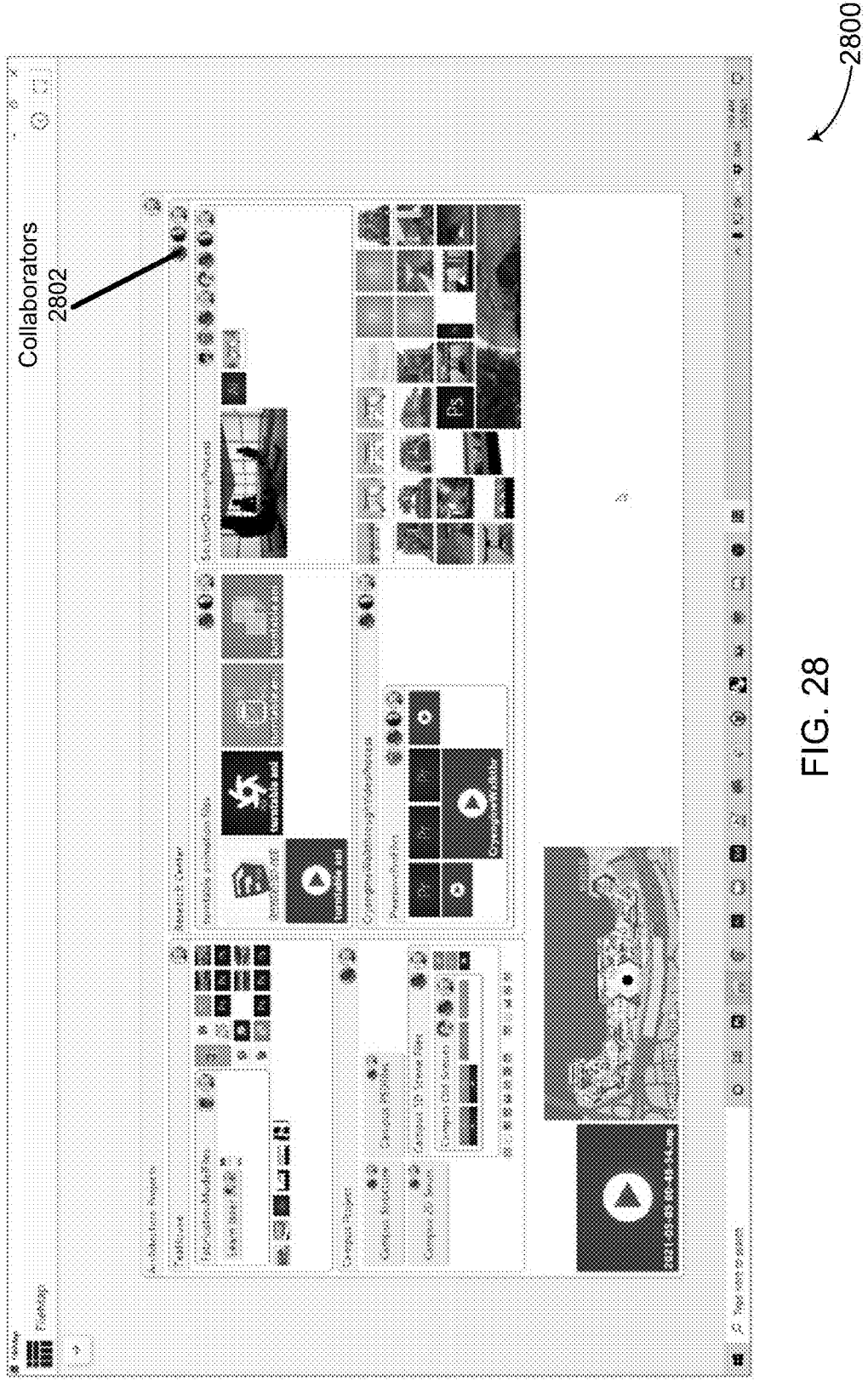
FIG. 28 is a diagram illustrating an example of a workspace including multiple collaborative configurations.

FIG. 28 is a diagram illustrating example 2800 of a workspace including multiple collaborative configurations. In some aspects, the one or more processors are further configured to execute the instructions to receive and execute a request to share the first master panel with at least one collaborating user accessing a different computer system. Executing the request comprises transmitting the first folder to at least one storage device accessible to the different computer system, and also transmitting, to the at least one storage device (or in some aspects, cloud device, cloud sync service, etc.), metadata comprising icon and panel layout information, access rights, and grid system configurations of the first master panel on the computer system. In some aspects, the metadata is synchronized using a different cloud device or cloud sync service than the first folder. Either way, metadata synchronization allows for the same layout to be generated by a visual file manager on the different computer system. When a panel is shared, identifiers may be generated on the panel indicating collaborators 2802 that have access to the panel's contents. This access may be read-only or with modification rights. In some aspects, the at least one storage device is one of a cloud server and a local file server.

In some aspects, the one or more processors are further configured to execute the instructions to receive and execute a synchronization request. Executing the synchronization request involves retrieving changes to the first master panel made on the second computer system via metadata transmitted to the at least one storage device by the second computer system, and implementing the changes to the first master panel on the computer system.

Figure 29:
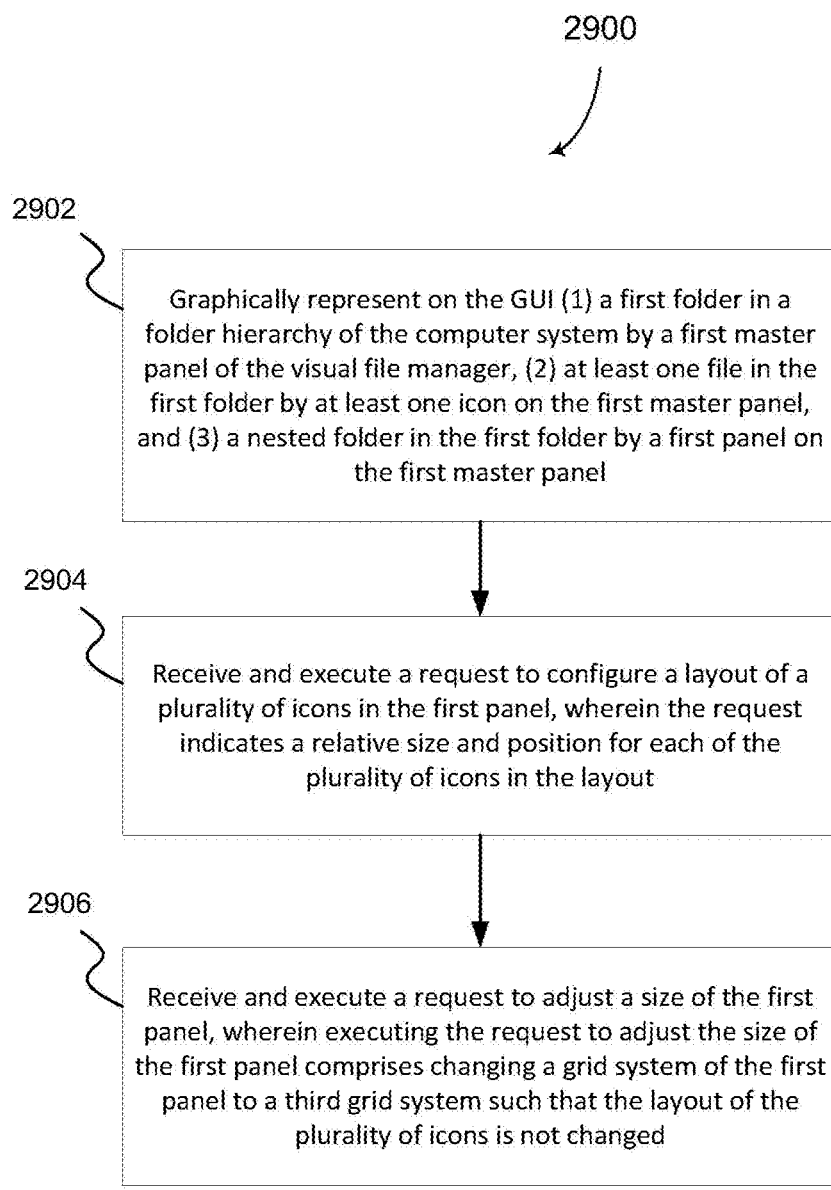
FIG. 29 is a flow chart that illustrates an example of processor operation in connection with visual file manager.

FIG. 29 is flow chart 2900 that illustrates an example of processor operation in connection with visual file manager.

As shown, at block 2902, one or more processors executing the visual file manager graphically represent on the GUI (1) a first folder in a folder hierarchy of the computer system by a first master panel of the visual file manager, (2) at least one file in the first folder by at least one icon on the first master panel, and (3) a nested folder in the first folder by a first panel on the first master panel.

At block 2904, one or more processors executing the visual file manager receive and execute a request to configure a layout of a plurality of icons in the first panel, wherein the request indicates a relative size and position for each of the plurality of icons in the layout.

At block 2906, one or more processors executing the visual file manager receive and execute a request to adjust a size of the first panel, wherein executing the request to adjust the size of the first panel comprises changing a grid system of the first panel to a third grid system such that the layout of the plurality of icons is not changed.

Those of skill in the art would understand that information and signals used in communications for collaboration, for example, may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for operating a visual file manager on a graphical user interface (GUI) of a computer system, comprising:
    graphically representing on the GUI:
        a first folder in a folder hierarchy of the computer system by a first master panel of the visual file manager,
        at least one file in the first folder by at least one icon on the first master panel, and
        a nested folder in the first folder by a first panel on the first master panel,
    wherein contents of the master panel is organized in a first grid system and contents of the first panel is organized in a second grid system, wherein a unit size indicative of a smallest size possible for an icon in the first grid system is different than a unit size of the second grid system;
    receiving and executing a request to configure a layout of a plurality of icons in the first panel, wherein the request indicates a relative size and position for each of the plurality of icons in the layout; and
    receiving and executing a request to adjust a size of the first panel, wherein executing the request to adjust the size of the first panel comprises changing a grid system of the first panel to a third grid system such that the layout of the plurality of icons is not changed.

2. The method of claim 1, wherein the request to adjust the size of the first panel comprises changing an aspect ratio of the first panel such that the layout of the plurality of icons will be disturbed in the second grid system.

3. The method of claim 1, further comprising:
    receiving and executing a request to zoom into a portion of the first master panel at a first zoom level, wherein executing the request to zoom comprises:
        determining a ratio between a total screen size associated with a default graphical representation of the first master panel and an adjusted screen size associated with a graphical representation of the first master panel at the first zoom level; and
        adjusting sizes of the at least one icon and the first panel based on the ratio.

4. The method of claim 3, wherein adjusting sizes of the at least one icon and the first panel further comprises:
    in response to determining that a size of a first icon in the at least one icon is greater than a first size, displaying, in place of the first icon on the first master panel, contents of a file corresponding to the first icon.

5. The method of claim 3, wherein adjusting sizes of the at least one icon and the first panel further comprises:

in response to determining that a size of a first icon in the at least one icon is less than a second size, displaying the first icon as a single minimalistic icon on the first master panel.

6. The method of claim 3, wherein the first panel comprises a semantic header indicating a panel name, and wherein a height of the semantic header and a font size of the panel name is constant across all zoom levels.

7. The method of claim 1, further comprising:
graphically representing on the GUI:
 a second folder in the folder hierarchy of the computer system by a second master panel of the visual file manager,
 at least one file in the second folder by at least one other icon on the second master panel, and
 a nested folder in the second folder by a second panel on the second master panel,
wherein the first master panel and the second master panel are displayed on the visual file manager concurrently.

8. The method of claim 1, further comprising:
receiving and executing a request to share the first master panel with at least one collaborating user accessing a different computer system, wherein executing the request comprises:
 transmitting the first folder to at least one storage device accessible to the different computer system; and
 transmitting, to the at least one storage device, metadata comprising icon and panel layout information, access rights, and grid system configurations of the first master panel on the computer system.

9. The method of claim 8, wherein the at least one storage device is one or more of a cloud server and a local file server.

10. The method of claim 8, further comprising:
receiving and executing a synchronization request, wherein executing the synchronization request comprises:
 retrieving changes to the first master panel made on the second computer system via metadata transmitted to the at least one storage device by the second computer system; and
 implementing the changes to the first master panel on the computer system.

11. A computer system for operating a visual file manager on a graphical user interface (GUI), comprising:
a memory storing instructions; and
one or more processors coupled to the memory, wherein the one or more processors and the memory are configured to execute the instructions to:
graphically represent on the GUI:
 a first folder in a folder hierarchy of the computer system by a first master panel of the visual file manager,
 at least one file in the first folder by at least one icon on the first master panel, and
 a nested folder in the first folder by a first panel on the first master panel,
wherein contents of the master panel is organized in a first grid system and contents of the first panel is organized in a second grid system, wherein a unit size indicative of a smallest size possible for an icon in the first grid system is different than a unit size of the second grid system;
receive and execute a request to configure a layout of a plurality of icons in the first panel, wherein the request indicates a relative size and position for each of the plurality of icons in the layout; and
receive and execute a request to adjust a size of the first panel, wherein executing the request to adjust the size of the first panel comprises changing a grid system of the first panel to a third grid system such that the layout of the plurality of icons is not changed.

12. The computer system of claim 11, wherein the request to adjust the size of the first panel comprises changing an aspect ratio of the first panel such that the layout of the plurality of icons will be disturbed in the second grid system.

13. The computer system of claim 11, wherein the one or more processors are further configured to execute the instructions to:
receive and execute a request to zoom into a portion of the first master panel at a first zoom level, wherein executing the request to zoom comprises:
 determining a ratio between a total screen size associated with a default graphical representation of the first master panel and an adjusted screen size associated with a graphical representation of the first master panel at the first zoom level; and
 adjusting sizes of the at least one icon and the first panel based on the ratio.

14. The computer system of claim 13, wherein adjusting sizes of the at least one icon and the first panel further comprises:
in response to determining that a size of a first icon in the at least one icon is greater than a first size, displaying, in place of the first icon on the first master panel, contents of a file corresponding to the first icon.

15. The computer system of claim 13, wherein adjusting sizes of the at least one icon and the first panel further comprises:
in response to determining that a size of a first icon in the at least one icon is less than a second size, displaying the first icon as a single minimalistic icon on the first master panel.

16. The computer system of claim 13, wherein the first panel comprises a semantic header indicating a panel name, and wherein a height of the semantic header and a font size of the panel name is constant across all zoom levels.

17. The computer system of claim 11, wherein the one or more processors are further configured to execute the instructions to:
graphically represent on the GUI:
 a second folder in the folder hierarchy of the computer system by a second master panel of the visual file manager,
 at least one file in the second folder by at least one other icon on the second master panel, and
 a nested folder in the second folder by a second panel on the second master panel,
wherein the first master panel and the second master panel are displayed on the visual file manager concurrently.

18. The computer system of claim 11, wherein the one or more processors are further configured to execute the instructions to:
receive and execute a request to share the first master panel with at least one collaborating user accessing a different computer system, wherein executing the request comprises:
 transmitting the first folder to at least one storage device accessible to the different computer system; and
 transmitting, to the at least one storage device, metadata comprising icon and panel layout information, access rights, and grid system configurations of the first master panel on the computer system.

19. The computer system of claim 18, wherein the one or more processors are further configured to execute the instructions to:
receive and execute a synchronization request, wherein executing the synchronization request comprises:
retrieving changes to the first master panel made on the second computer system via metadata transmitted to the at least one storage device by the second computer system; and
implementing the changes to the first master panel on the computer system.

20. A non-transitory computer-readable medium storing computer executable code for operating a visual file manager on a graphical user interface (GUI) of a computer system, comprising:
code for graphically representing on the GUI:
a first folder in a folder hierarchy of the computer system by a first master panel of the visual file manager,
at least one file in the first folder by at least one icon on the first master panel, and
a nested folder in the first folder by a first panel on the first master panel,
wherein contents of the master panel is organized in a first grid system and contents of the first panel is organized in a second grid system, wherein a unit size indicative of a smallest size possible for an icon in the first grid system is different than a unit size of the second grid system;
code for receiving and executing a request to configure a layout of a plurality of icons in the first panel, wherein the request indicates a relative size and position for each of the plurality of icons in the layout; and
code for receiving and executing a request to adjust a size of the first panel, wherein executing the request to adjust the size of the first panel comprises changing a grid system of the first panel to a third grid system such that the layout of the plurality of icons is not changed.

* * * * *